United States Patent
Lee et al.

(10) Patent No.: US 10,950,205 B2
(45) Date of Patent: Mar. 16, 2021

(54) ELECTRONIC DEVICE, AUGMENTED REALITY DEVICE FOR PROVIDING AUGMENTED REALITY SERVICE, AND METHOD OF OPERATING SAME

(71) Applicant: Samsung Electronics Co., Ltd., Suwon-si (KR)

(72) Inventors: Jueun Lee, Suwon-si (KR); Choonkyoung Moon, Suwon-si (KR); Shinjae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/682,595

(22) Filed: Nov. 13, 2019

(65) Prior Publication Data

US 2020/0168177 A1 May 28, 2020

(30) Foreign Application Priority Data

Nov. 26, 2018 (KR) ........................ 10-2018-0147788

(51) Int. Cl.
*G09G 5/14* (2006.01)
*G02B 27/01* (2006.01)
(Continued)

(52) U.S. Cl.
CPC .......... *G09G 5/14* (2013.01); *G02B 27/0172* (2013.01); *G06F 3/0488* (2013.01);
(Continued)

(58) Field of Classification Search
CPC combination set(s) only.
See application file for complete search history.

(56) References Cited

U.S. PATENT DOCUMENTS 9,256,283 B2   2/2016   Kang
9,990,036 B2   6/2018   Cho et al.
(Continued)

FOREIGN PATENT DOCUMENTS

KR   10-2014-0146889 A   12/2014
KR      10-1804884 B1   12/2017
WO      2017/072616 A1    5/2017

OTHER PUBLICATIONS

International Search Report dated Feb. 25, 2020, issued in International Application No. PCT/KR2019/015455.
(Continued)

*Primary Examiner* — Deeprose Subedi
(74) *Attorney, Agent, or Firm* — Jefferson IP Law, LLP

(57) ABSTRACT

An electronic device is provided. The electronic device comprises a touchscreen, a communication module, and at least one processor operatively connected with the touchscreen and the communication module. The at least one processor is configured to establish a communication connection with an augmented reality (AR) device using the communication module, transmit data for display of a first content to the AR device using the communication module, display a first user interface for controlling the first content on the touchscreen, transmit data for display of the first content varied by a first input received through the first user interface to the AR device using the communication module, transmit data for display of a second content different from the first content to the AR device using the communication module, display a second user interface for controlling the second content on the touchscreen, and transmit data for display of the second content varied by a second input received through the second user interface to the AR device using the communication module. Other various embodiments are possible as well.

19 Claims, 38 Drawing Sheets

(51) Int. Cl.
  *G06F 3/0484*  (2013.01)
  *G06F 3/0488*  (2013.01)
  *G06T 7/73*    (2017.01)
  *G09G 5/38*    (2006.01)
  *G06F 3/041*   (2006.01)

(52) U.S. Cl.
  CPC ............ *G06F 3/04845* (2013.01); *G06T 7/73* (2017.01); *G09G 5/38* (2013.01); *G02B 2027/014* (2013.01); *G02B 2027/0178* (2013.01); *G06F 3/041* (2013.01); *G06F 2203/04803* (2013.01); *G09G 2354/00* (2013.01); *G09G 2356/00* (2013.01); *G09G 2370/06* (2013.01); *G09G 2370/20* (2013.01)

(56) References Cited

U.S. PATENT DOCUMENTS

2012/0302289 A1* 11/2012 Kang .................. G06F 3/013
                                                    455/557
2018/0275834 A1   9/2018 Yao et al.

OTHER PUBLICATIONS

Written Opinion dated Feb. 25, 2020, issued in International Application No. PCT/KR2019/015455.

* cited by examiner

ELECTRONIC DEVICE, AUGMENTED REALITY DEVICE FOR PROVIDING AUGMENTED REALITY SERVICE, AND METHOD OF OPERATING SAME

CROSS-REFERENCE TO RELATED APPLICATION(S)

This application is based on and claims priority under 35 U.S.C. 119(a) of a Korean patent application number 10-2018-0147788, filed on Nov. 26, 2018, in the Korean Intellectual Property Office, the disclosure of which is incorporated by reference herein in its entirety.

BACKGROUND

1. Field

The disclosure relates to electronic devices and augmented reality devices. More particularly, the disclosure relates to electronic devices and augmented reality devices for providing augmented reality services and methods of operating the same.

2. Description of Related Art

Augmented reality (AR) is technology for overlaying three-dimensional (3D) (or two-dimensional (2D)) virtual images on the real-world image or background and displaying overlaid images. AR technology which combines the real-world environment with virtual objects enables the user to view the real-world environment, thereby providing a better real-life feel and additional information.

AR-based wearable AR devices may allow images provided through a projector to be incident through a prism to the input grating surface. The user may then view the image passing the output grating surface with his or her eyes. The user may observe the image together with the real-world environment and identify information about a target object in the environment that he or she is currently viewing.

A user who receives an AR service may control images (e.g., objects) provided from an AR device. For example, when the AR device displays an object configured to provide particular information, the user may enter a command to designate the object to the AR device and, if the command is detected, the AR device may provide the particular information. For example, the user may make a gesture set to control the object, and the AR device may detect the gesture via various sensors and provide the particular information. However, the AR device is hard to precisely control due to its poor perception rate for gestures in the air.

A touchscreen-equipped electronic device may display images through the touchscreen. The electronic device may receive a request for providing several pieces of information. For example, the electronic device may receive a multi-window execution request to provide the execution screen of a plurality of applications. In this case, the electronic device may split the touchscreen and display the respective execution screens of the plurality of applications. Thus, the execution screens may be shrunken.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an augmented reality (AR) device for displaying content received from an electronic device in a position identified based on the position of the electronic device and a method for operating the AR device as well as an electronic device for transmitting data for displaying content and information about the position of display to the AR device and a method for operating the electronic device. According to various embodiments, there may be provided an electronic device for transmitting content to an AR device and providing a user interface for control on the touchscreen and a method for operating the electronic device and an AR device for receiving content from an electronic device and displaying the content and then receiving content reflecting a control command from the electronic device and displaying the content and an AR device and a method for operating the AR device.

Additional aspects will be set forth in part in the description which follows and, in part, will be apparent from the description, or may be learned by practice of the presented embodiments.

In accordance with an aspect of the disclosure, an electronic device is provided. The electronic device comprises a touchscreen, a communication module, and at least one processor operatively connected with the touchscreen and the communication module, wherein the at least one processor is configured to establish a communication connection with an AR device using the communication module, transmit data for display of a first content to the AR device using the communication module, display a first user interface for controlling the first content on the touchscreen, transmit data for display of the first content varied by a first input received through the first user interface to the AR device using the communication module, transmit data for display of a second content different from the first content to the AR device using the communication module, display a second user interface for controlling the second content on the touchscreen, and transmit data for display of the second content varied by a second input received through the second user interface to the AR device using the communication module.

In accordance with another aspect of the disclosure, an AR device is provided. The augmented reality device comprises at least one sensor, a display device configured to display an image while transmitting at least part of light incident from an outside, a communication module, and at least one processor operatively connected with the least one sensor, the display, and the communication module, wherein the at least one processor is configured to identify a position of an electronic device relative to the AR device based on sensing data obtained through the at least one sensor, establish a communication connection with the electronic device using the communication module, receive data for display of at least one content from the electronic device using the communication module, identify a position of display of the at least one content on the display device based on the position of the electronic device, and display the at least one content in the identified position of display on the display device.

In accordance with yet another aspect of the disclosure, an electronic device is provided. The electronic device comprises a touchscreen, a communication module, and at least one processor operatively connected with the touchscreen and the communication module, wherein the at least one processor may be configured to establish a communication connection with an AR device using the communication module, and transmit data for display of at least one content and information about a position of display of each of the at least one content to the AR device. The information about the position of display of each of the at least one content may be information indicating at least one of a plurality of display areas set relative to the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects features, and advantages of certain embodiments of the disclosure will be more apparent from the following description taken in conjunction with the accompanying drawings, wherein.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
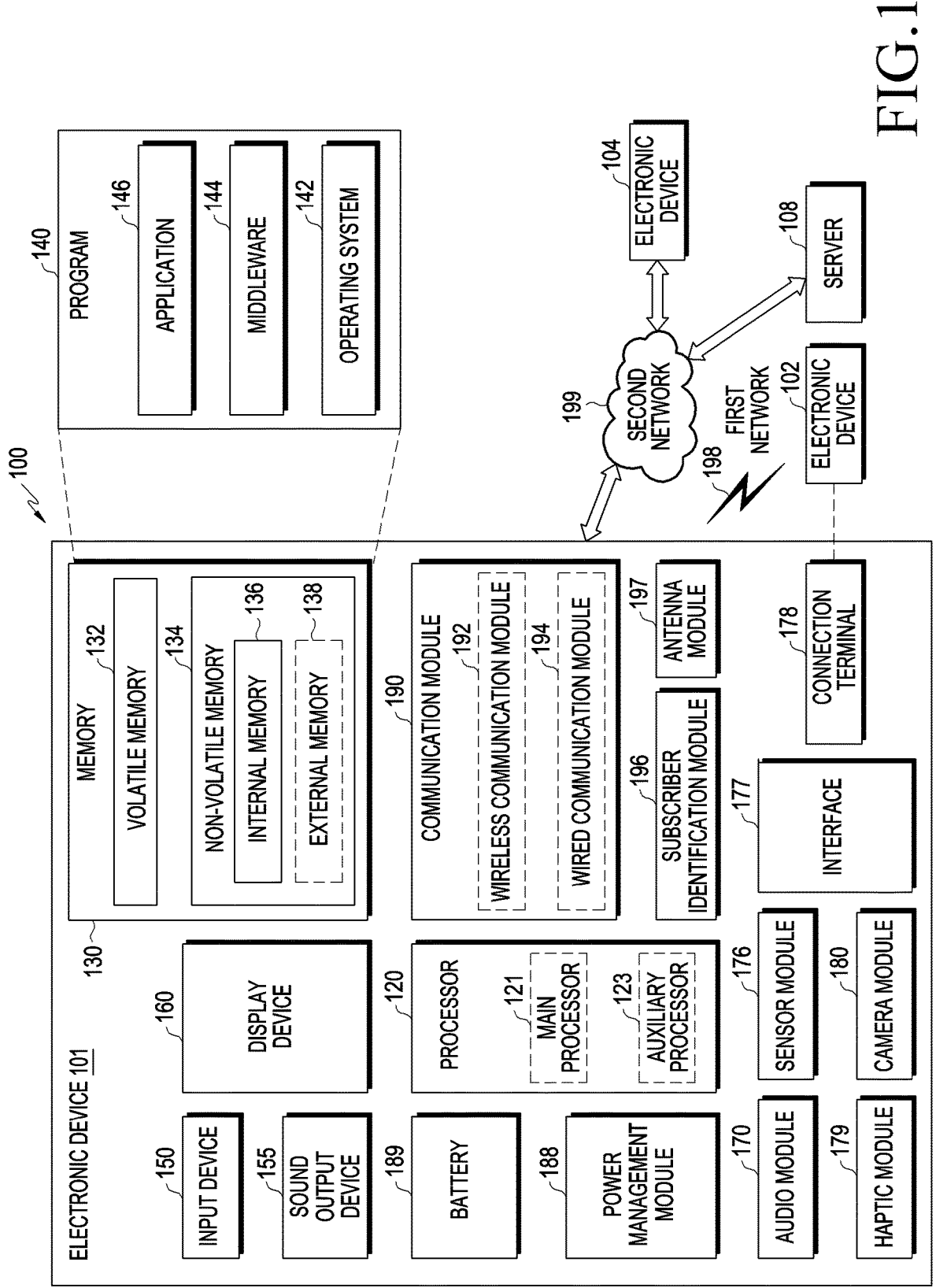
FIG. 1 is a block diagram illustrating an electronic device in a network environment according to an embodiment of the disclosure.

FIG. 1 is a block diagram 1 illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network) or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include at least one of the volatile memory 132 or the non-volatile memory 134. The non-volatile memory 134 may include at least one of internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a recording, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone)) directly or wirelessly connected with the electronic device 101.

The sensor module 176 may detect an operational state (e.g., power or temperature) of the electronic device 101 or an environmental state (e.g., a state of a user) external to the electronic device 101 and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are independently operable from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technique may be used, for example.

Figure 2:
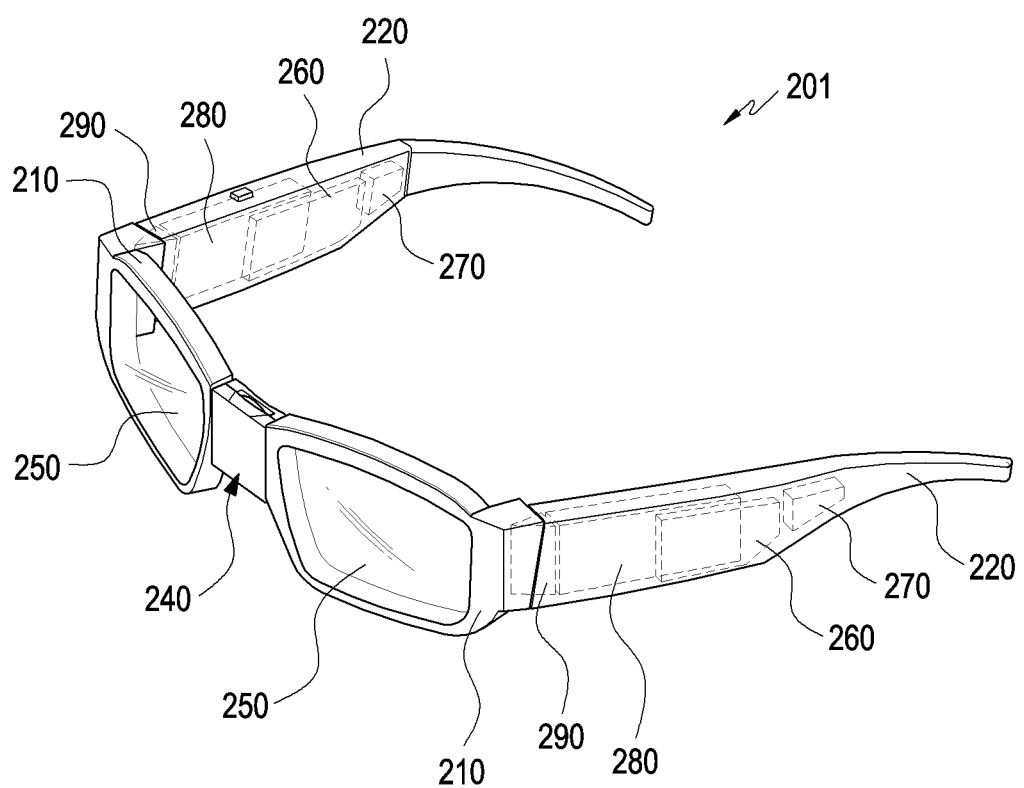
FIG. 2 is a view illustrating an augmented reality (AR) device according to an embodiment of the disclosure.

FIG. 2 is a view illustrating an augmented reality (AR) device according to an embodiment of the disclosure.

Referring to FIG. 2, an AR device 201 may include a pair of display devices 250 and a pair of housings 210. The pair of display devices 250 may be individually equipped and fastened to the pair of housings 210 which are frame-shaped. A plurality of wearing members 220 may extend in parallel from the pair of housings 210. The AR device 201 may be a head-mounted electronic device. The head-mounted wearable AR device 201 is merely an example, and it will readily be appreciated by one of ordinary skill in the art that the AR device 201 is not limited to a particular limitation.

The AR device 201 may include an interval adjusting structure 240 for adjusting the distance between the pair of housings and circuit boards 260 and batteries 270 disposed inside the wearing members 220. As another example, a light output device 280 (e.g., a projector), a light refracting module 290 (e.g., a prism), or a display module (not shown) may be included in each wearing member 220 of the electronic device 101.

According to an embodiment, the display device 250 may include a display module, a projector, or a touch circuitry-mounted sensor, and the display of the display module may be a transparent or semi-transparent display. As another example, the display device 250 may include a window member (e.g., a transparent member), and the window member may include a light adjusting member which is disposed in at least a portion of the window member. The light adjusting member may be a semi-transparent glass or a member the light transmittance of which may be adjusted as the coloring concentration is adjusted. As another example, the display device 250 may include a lens including a waveguide or a reflective lens, and each lens may transmit light from an output device to the user's eyes.

According to an embodiment, the pair of housings 210 are shaped as frames to at least partially surround the display devices 250 and may play a role as the rims of regular glasses or sunglasses.

According to an embodiment, the pair of wearing members 220 each may have a circuit board 260 placed there inside, and circuit lines for connecting the circuit boards may be disposed inside or outside the pair of housings 210. The pair of wearing members 220 may play a role as the temples of regular glasses. For example, the pair of housings 210 may be positioned over the user's face to position the display devices 250 to correspond to the user's eyes, and the pair of wearing members 220 may be hung on the user's ears on both sides of the user's head.

According to an embodiment, the pair of wearing members 220 may be used in placing the circuit boards 260, the batteries 270, the light output devices 280, and light refracting modules 290. For example, the pair of wearing members 220 each may have a housing structure to receive the circuit board 260, the battery 270, the light output device 280, or the light refracting module 290. As another example, the electronic device 101 may include the circuit board 260, the battery 270, the light output device 280, and the light refracting module 290 in each wearing member 220. As another example, the circuit boards 260, batteries 270, light output devices 280, or light refracting modules 290 may be placed in various arrangements considering the weight distribution of the electronic device 101 and wearability.

According to an embodiment, there may be a plurality of circuit boards 260 one of which may be provided as a board including a driving circuit of the display device 250, a processor for processing image information, and a communication module for communication with the electronic device 101. The processor may output images using the projector. For example, the processor may receive data for display of content from the electronic device 101 through the communication module. The processor may display content on at least part of the display device 250 based on received data. As described below in detail, the processor may identify a position where to output an image based on at least a relative position of the electronic device 101 relative to the AR device 201. The processor may receive information about the position of display along with data for display of content through the communication module. The processor may identify the position where to output an image based on the received information about the position of display and the relative position of the electronic device 101 relative to the AR device 201. The configuration in which the processor identifies the relative position of the electronic device 101 relative to the AR device 201 and the configuration of identifying the position of display of content in various manners are described below in greater detail. The processor may display content in the identified position on the display device 250. For example, content may be displayed in a position where the user perceives as if the content is displayed near the display device 160 of the electronic device 101.

The processor of the AR device may be implemented to be at least partially identical to the processor 120 of the electronic device 101 of FIG. 1. The communication module of the AR device may be implemented to be at least partially identical to the communication module of the electronic device 101 of FIG. 1. The communication module of the AR device may transmit and receive data to/from the communication module 190 of the electronic device 101 through at least one of a first network 198 or a second network 199.

Another one of the circuit boards 260 may be provided as a circuit board equipped with an interface with the user, a communication module for providing access to other electronic device or commercial communication network, and various connectors, or sensor modules. As another example, a microphone or speaker for sound input or output may be placed in one of the circuit boards 260 or may be positioned adjacent one of the circuit boards 260. The arrangement and functions of the circuit boards 260 are not limited thereto and various modifications may be made thereto as necessary.

According to an embodiment, the circuit boards 260 may be individually placed in the wearing members 220. As another example, the sensor module may include a proximity sensor, illuminance sensor, gyro sensor, camera module, gaze tracker, geo-magnetic sensor, or accelerometer, and various sensors constituting the sensor module are not necessarily placed in one of the circuit boards 260. For example, the camera module may be placed in a proper position on the pair of housings 210 to come close to the user's gaze. The sensor module may detect information about the ambient environment used for setting the optimal use environment while monitoring the use environment of the AR device 201. For example, the processor may analyze the image of the external environment obtained through the camera module and identify a relative position of the electronic device 101 relative to the AR device 201 based on at least the result of analysis.

According to an embodiment, there may be provided one or more batteries 270 to provide power to the circuit boards 260 or display module, and the batteries may be arranged in at least one of the pair of wearing members 220 or arranged individually in the pair of wearing members 220.

According to an embodiment, there may be a plurality of light output devices 280 and a plurality of light refracting modules 290 which may be arranged in at least one of the pair of wearing members 220 or arranged individually in the wearing members 220. Light emitted from the light output device 280 may pass through the light refracting module 290 and reach the display device 250. The AR device 201 using the light output device 280 may be of wave guide type or reflective mirror type. For example, in the wave guide type, light emitted from a side light output device, e.g., projector, is reflected to the user's eyes by the grating area formed in the display device using a wave guide, e.g., prism. As another example, in the reflective mirror type, light emitted from the light output device may be reflected directly to the display device ahead of the user's eyes, thereby providing visual information to the user's eyes.

According to an embodiment, the circuit boards 260 individually disposed in the pair of housings 210 may be connected together via circuit lines (not shown). The circuit lines may provide a transmission/reception path for various control signals and data between the circuit boards. The circuit lines may be formed of coaxial cables and have various transmission line structures, e.g., flexible printed circuit boards (FPCBs).

According to an embodiment, the AR device 201 may have an input device with physical keys or touch pad. For example, the input module, such as a power key or touch pad, is a device that uses the user's direct contact and may be exposed to the outside of the AR device 201.

Figure 3:
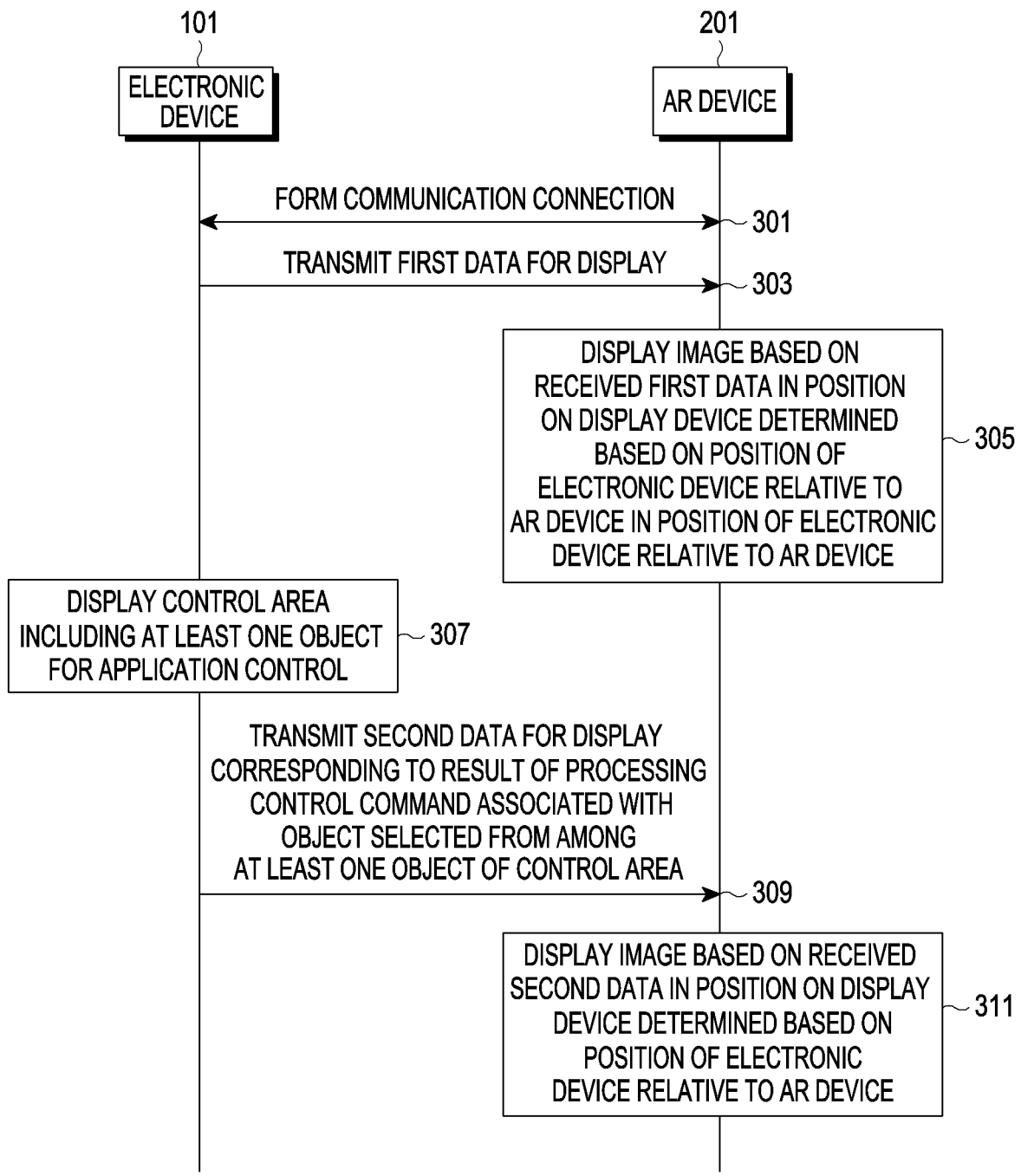
FIG. 3 is a flowchart illustrating a method for operating an electronic device and an AR device according to an embodiment of the disclosure.

FIG. 3 is a flowchart illustrating a method for operating an electronic device and an AR device according to an embodiment of the disclosure.

Referring to FIG. 3 is described in further detail with reference to FIGS. 4A to 4D.

Figure 4A:
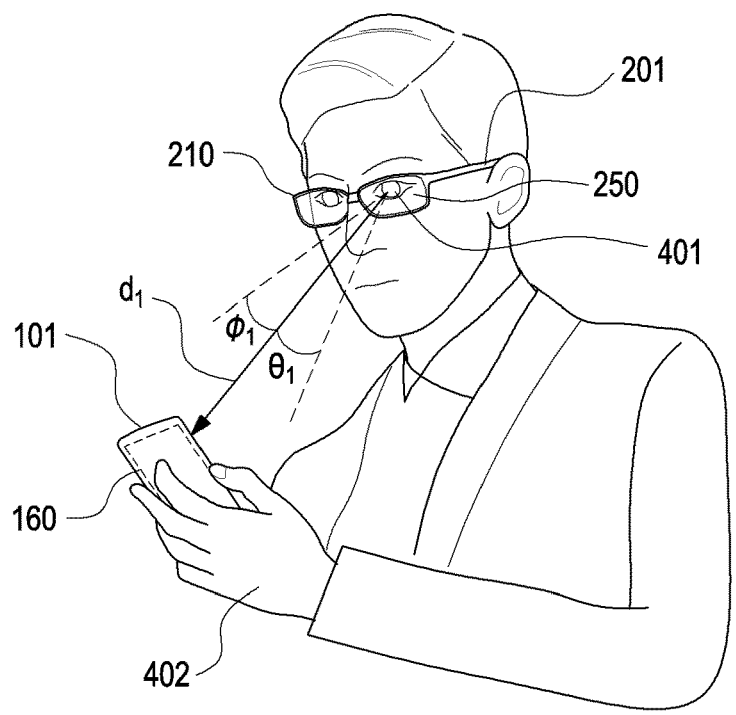
FIG. 4A is a view illustrating an example in which a user wearing an AR device uses an electronic device according to an embodiment of the disclosure.

FIG. 4A is a view illustrating an example in which a user wearing an AR device uses an electronic device according to an embodiment of the disclosure.

Figure 4B:
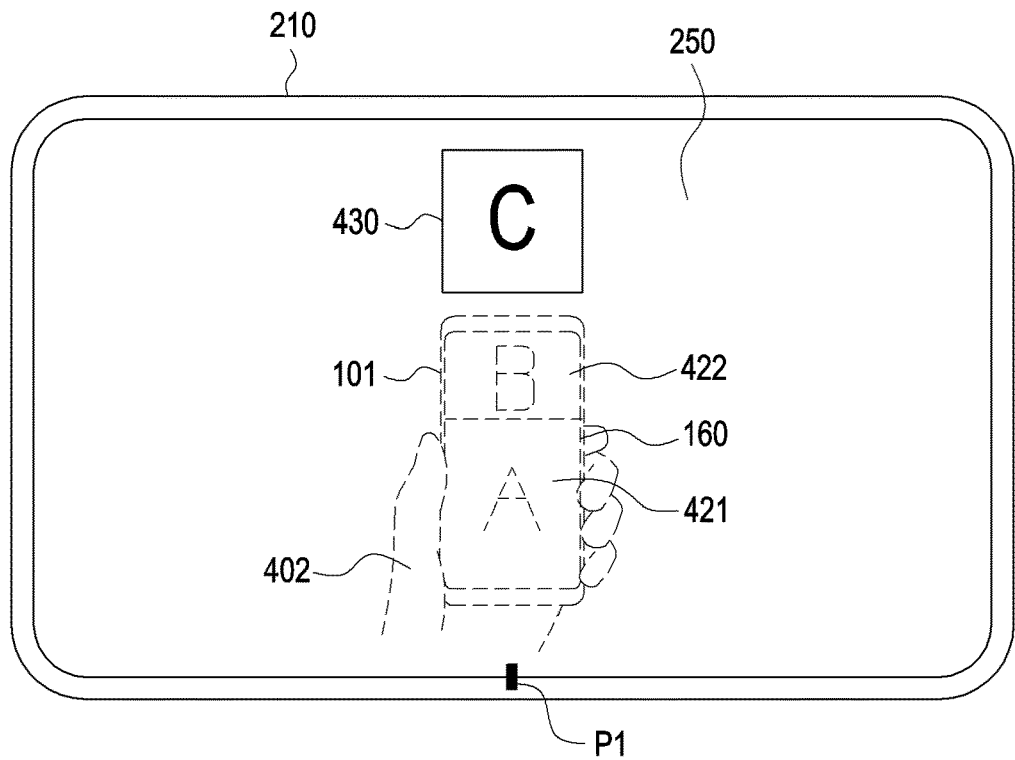
FIGS. 4B, 4C, and 4D are views illustrating an electronic device observed through a display device of an AR device and content displayed on the display device according to various embodiments of the disclosure.
Figure 4C:
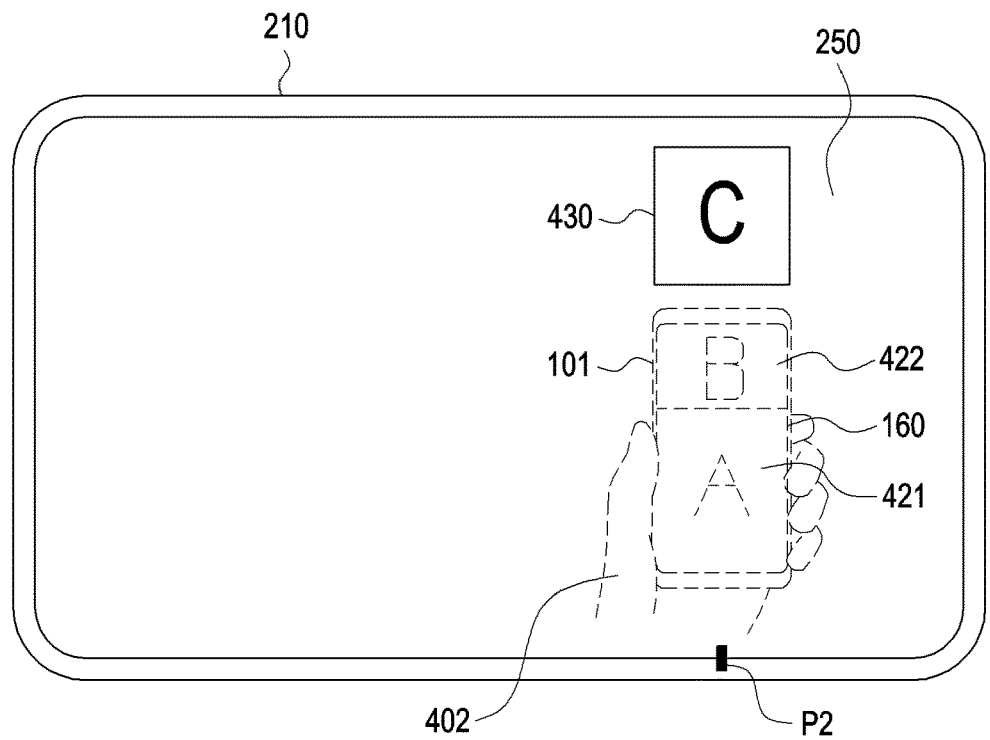
Figure 4D:
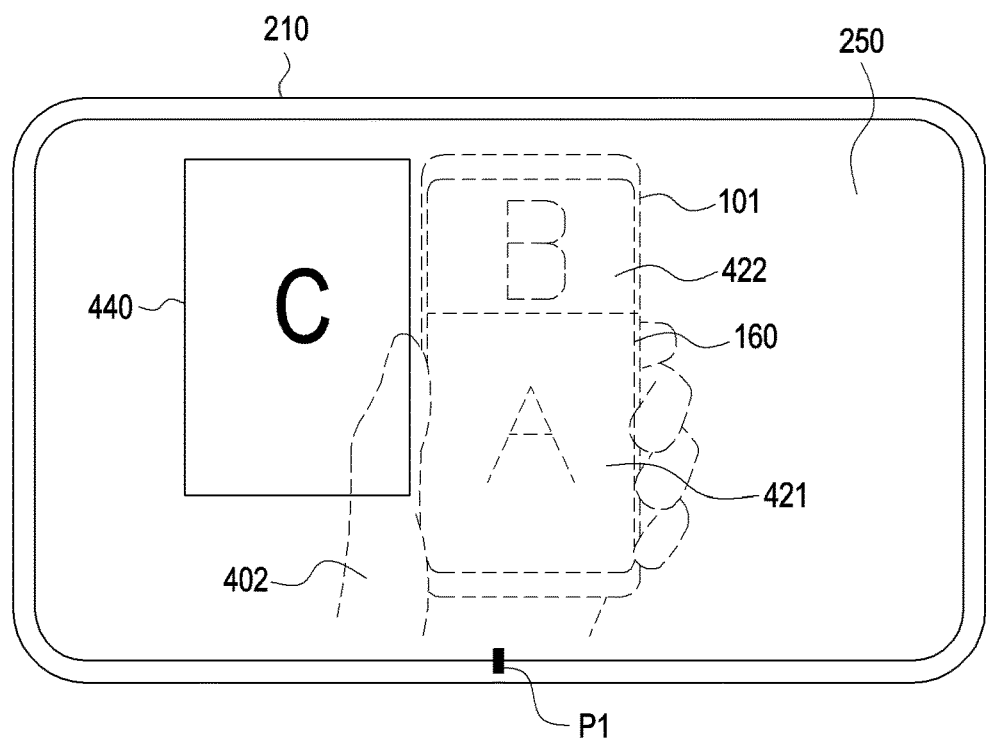

FIGS. 4B, 4C, and 4D are views illustrating an electronic device observed through a display device of an AR device and content displayed on the display device according to various embodiments of the disclosure.

According to an embodiment, the electronic device 101 and the AR device 201 may form a communication connection in operation 301. For example, the electronic device 101 and the AR device 201 may form a communication connection based on short-range communication, such as Bluetooth. The electronic device 101 and the AR device 201 may be connected wiredly. When the electronic device 101 and the AR device 201 are wiredly connected together, the electronic device 101 and the AR device 201 may grasp an electrical signal to identify the connection state and, when connected, may perform a pairing operation similar to when connected wirelessly. In other words, the electronic device 101 may pair with the AR device 201. The electronic device 101 and the AR device 201 may form a communication connection by performing a procedure used by the short-range communication standards. The electronic device 101 may transmit and receive data to/from the AR device 201 via wireless LAN communication in which case at least part of the pairing process, such as discovery of peripheral device may be omitted. As used herein, "electronic device 101 or AR device 201 performs a particular operation" may mean, e.g., that a processor included in the electronic device 101 or AR device 201 performs a particular operation or controls other hardware (e.g., the communication module) to perform a particular operation. As used herein, "electronic device 101 or AR device 201 performs a particular operation" may mean, e.g., that a processor performs a particular operation or controls other hardware to perform a particular operation as per execution of at least one command stored in a memory included in the electronic device 101 or the AR device 201.

In operation 303, the electronic device 101 may transmit first data for display. For example, the electronic device 101 may identify a request for display of a second content while displaying the first content. According to an embodiment, the first content may be a content by a first application, and the second content may be a content by a second application. The first application and the second application may be applications independent from each other. In other words, whether the first application runs may not influence whether the second application runs. The second application may be an application dependent on the first application. For example, the second application may be a soft input panel (SIP) application and may be an application that may be invoked when the first application runs. The first content and the second content may be contents by a single application. For example, the application may be configured to provide contents which may be split into a plurality of window units. The electronic device 101 may split the execution screen of an application which is unable to provide content divided into a plurality of window units into a first portion and a second portion and create the first content and the second content. The electronic device 101 may identify a first group among a plurality of objects constituting the execution screen of application as the first content and a second group as the second content. For example, the SIP may be implemented as an independent application and may be implemented as an object of an application.

In operation 305, the AR device 201 may display an image, which is based on the received first data, in a position on the display which is determined based on the position of the electronic device 101 relative to the AR device 201.

Referring to FIG. 4A, the user may wear the AR device 201 on his or her head. The user may hold the electronic device 101 with his or her hand 402. Light from the display device 160 of the electronic device 101 and light from the display device 250 of the AR device 201 may be incident onto the user's eye 401. As described above in connection with FIG. 2, the AR device 201 may include a housing 210 and a display device 250. The AR device 201 may identify that the electronic device 101 is d1 away from the AR device 201 and that the orientation of the electronic device 101 is ($\theta 1, \Phi 1$) in the coordinate system of the AR device 201. Although the AR device 201 has been described to identify the position of the electronic device 101 in the spherical coordinate system, this is merely an example, and there is no limitation to the type of coordinate system.

The AR device 201 may identify the position of the electronic device 101 based on at least sensing data obtained through various sensors. For example, the AR device 201 may obtain an image of external environment through the camera module and recognize an object representing the electronic device 101 from the obtained image. The AR device 201 may identify the position of the electronic device 101 relative to the AR device 201 based on at least one of the size or shape of the object representing the electronic device 101. The AR device 201 may identify the position of the electronic device 101 by comprehensively using various types of sensing data from a plurality of sensors or may identify the position of the electronic device 101 based on the sensing data obtained through various sensors (e.g., an ultrasonic sensor or proximity sensor). The AR device 201 may receive information associated with the position of the AR device 201 from the electronic device 101 and identify the position of the electronic device 101 based on the received information.

Referring to FIG. 4B, the AR device 201 may display a third image 430 created based on the received data on the display device 250. The user may view the electronic device 101 through the display device 250. Accordingly, the user may simultaneously view the electronic device 101 and the third image 430. Since the user's hand 402 and the electronic device 101 are not images displayed on the display device 250 but images transmitted and observed through the display device 250, they are denoted in dashed lines to distinguish from the displayed third image 430 and it will be appreciated that they are not indeed shown in dashed lines. The AR device 201 may identify the position of display of the third image 430 based on the position of the electronic device 101. For example, as shown in FIG. 4B, the AR device 201 may identify that the electronic device 101 is in the position corresponding to a first point P1 of the housing 210. The AR device 201 may display the third image 430 in a first position corresponding to the first point P1. The AR device 201 may identify the size of the third image 430 based on at least the distance to the electronic device 101. The AR device 201 may store the association information between the position of the electronic device 101 and at least one of the size or position of display of the third image 430. The AR device 201 may identify at least one of the size or position of display of the third image 430 so that the user perceives as if the third image 430 is positioned around the electronic device 101. Although FIG. 4B illustrates that the third image 430 is positioned over the electronic device 101, this is merely an example, and the position of the third image 430 is not limited thereto. The electronic device 101 may transmit information about the position of display along with the data for display of content to the AR device 201, and the AR device 201 may identify the position of display of the third image 430 further using the received image about the position of display.

Referring to FIG. 4C, the AR device 201 may identify that the electronic device 101 is in the position corresponding to the second point P2 of the housing 210. For example, the user may move the electronic device 101 to the right in the circumstance of FIG. 4B. The AR device 201 may identify the position of the third image 430 so that the user perceives as if the third image 430 is positioned over the electronic device 101.

Referring to FIG. 4D, the AR device 201 may identify that the electronic device 101 is in the position corresponding to the first point P1 of the housing 210. The AR device 201 may identify that the distance to the electronic device 101 has been reduced as compared with the embodiment of FIG. 4B. For example, in the circumstance of FIG. 4B, the user may move the electronic device 101 to come closer to the user. The AR device 201 may identify the position of the image 440 so that the user perceives as if the image 440 is positioned on the left side of the electronic device 101. According to an embodiment, the AR device 201 may identify that the size of the image 440 corresponds to the size (e.g., the size of the display device 160) of the electronic device 101 depending on the user's settings. Although there are no separate user settings, the AR device 201 may be configured to change the size of the image 440. For example, when determining that the display over the electronic device 101 is impossible or receiving a display-on-left-side request from the electronic device 101, the AR device 201 may identify the position of display of the image 440 so that the user perceives as if the image 440 is positioned on the left side of the electronic device 101 as shown in FIG. 4D.

According to the user's settings, the AR device 201 may identify the position of display of the image 440 based on context information identified as a result of analysis of the captured image. Even without user settings, the AR device 201 may identify the position of display of the image 440 based on context information identified as a result of analysis of the captured image. For example, as a result of analysis of the captured image, the AR device 201 may identify a position (e.g., on the white background) where the display of content may be more noticeable or a position (e.g., a background free from obstacles) where visibility may be secured as the position of display.

The AR device 201 may store the association information between the position of the electronic device 101 and the position of display on the display device 250. For example, the AR device 201 may store association information between a plurality of parameters defined in the coordinate system and the position of display on the display device 250. The AR device 201 may store association information between the position of display on the display device 250 and sensing data obtained through at least one sensor of the AR device 201, rather than parameters defined in the coordinate system. In this case, the AR device 201 may refrain from computation as to the position in the coordinate system of the electronic device 101 and may refrain from displaying an image in the position of display on the display device 250 mapped to the sensing data. For ease of description, "AR device 201 identifies the position of display of content based on the position of the electronic device 101" may include not only identifying the position in the coordinate system of the electronic device 101 based on sensing data and then identifying the position of display of content but also identifying the position of display of content directly from sensing data.

In operation 307, the electronic device 101 may display a control area including at least one object for control of application. As shown in FIG. 4B, the electronic device 101 may display a first image 421 on a first area of the display device 160 and a second image 422 on a second area. For example, the first image 421 may be pre-existing content displayed on the electronic device 101. The stereo image, as a control area, may include a control object for controlling the functions of the application associated with the third image 430. When the application providing the first image 421 differs from the application providing the third image 430, the second image 422 may include a control object for controlling the functions of the application different from the application providing the first image 421. The second image 422 where the first image 421 and the third image 430 are provided from one application may include a control object for controlling the function associated with the third image 430. The electronic device 101 may detect a touch for designating any one of the control objects on the third image 430. The electronic device 101 may process a control command associated with the designated object. The electronic device 101 may allocate a touch input to the application providing the third image 430, and the application may process the control command associated with the touch input.

In operation 309, the electronic device 101 may transmit, to the AR device 201, second data for display corresponding to the result of processing the control command associated with the object selected among at least one object of the control area. In operation 311, the AR device 201 may display an image, which is based on the received second data, in a position on the display device 250 which is determined based on the position of the electronic device 101 relative to the AR device 201. Accordingly, the user may control the content displayed on the AR device 201 through the touchscreen of the electronic device 101.

Figure 5:
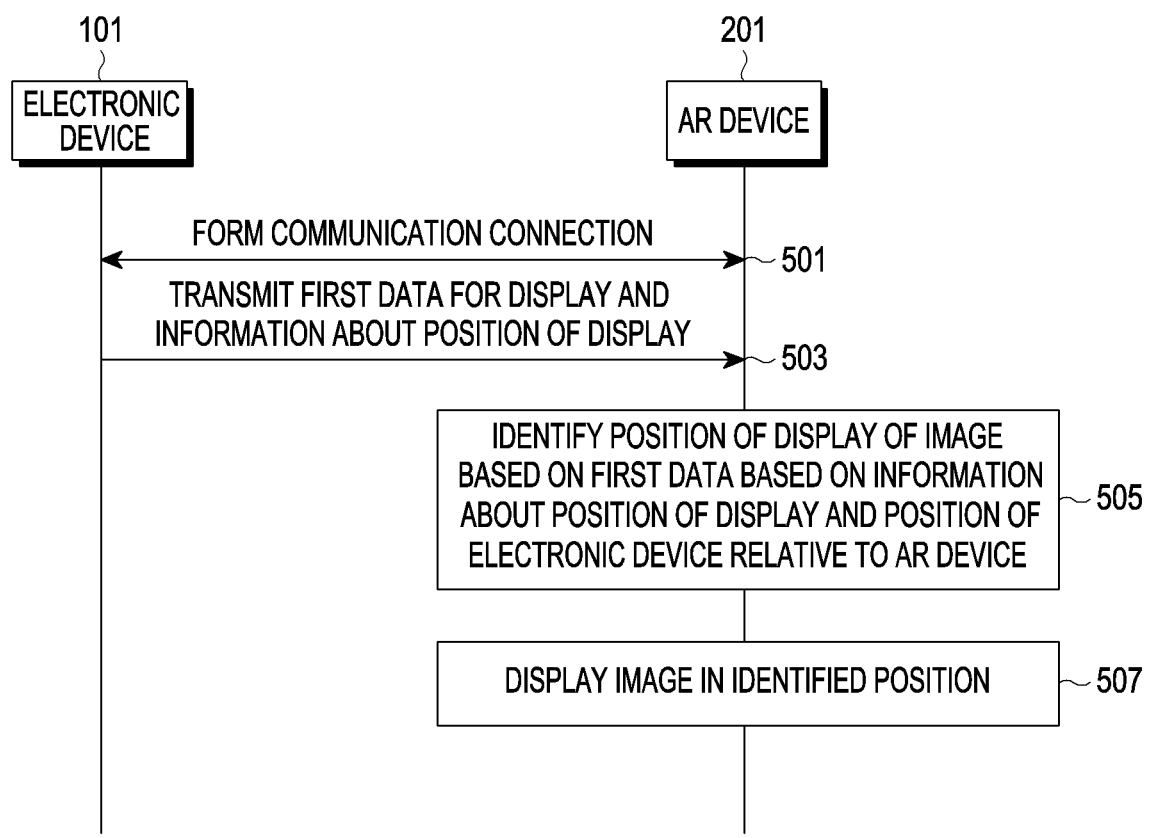
FIG. 5 is a flowchart illustrating a method for operating an electronic device and an AR device according to an embodiment of the disclosure.

FIG. 5 is a flowchart illustrating a method for operating an electronic device and an AR device according to an embodiment of the disclosure.

Referring to FIG. 5 is described in further detail with reference to FIGS. 6A, 6B, and 6C.

Figure 6A:
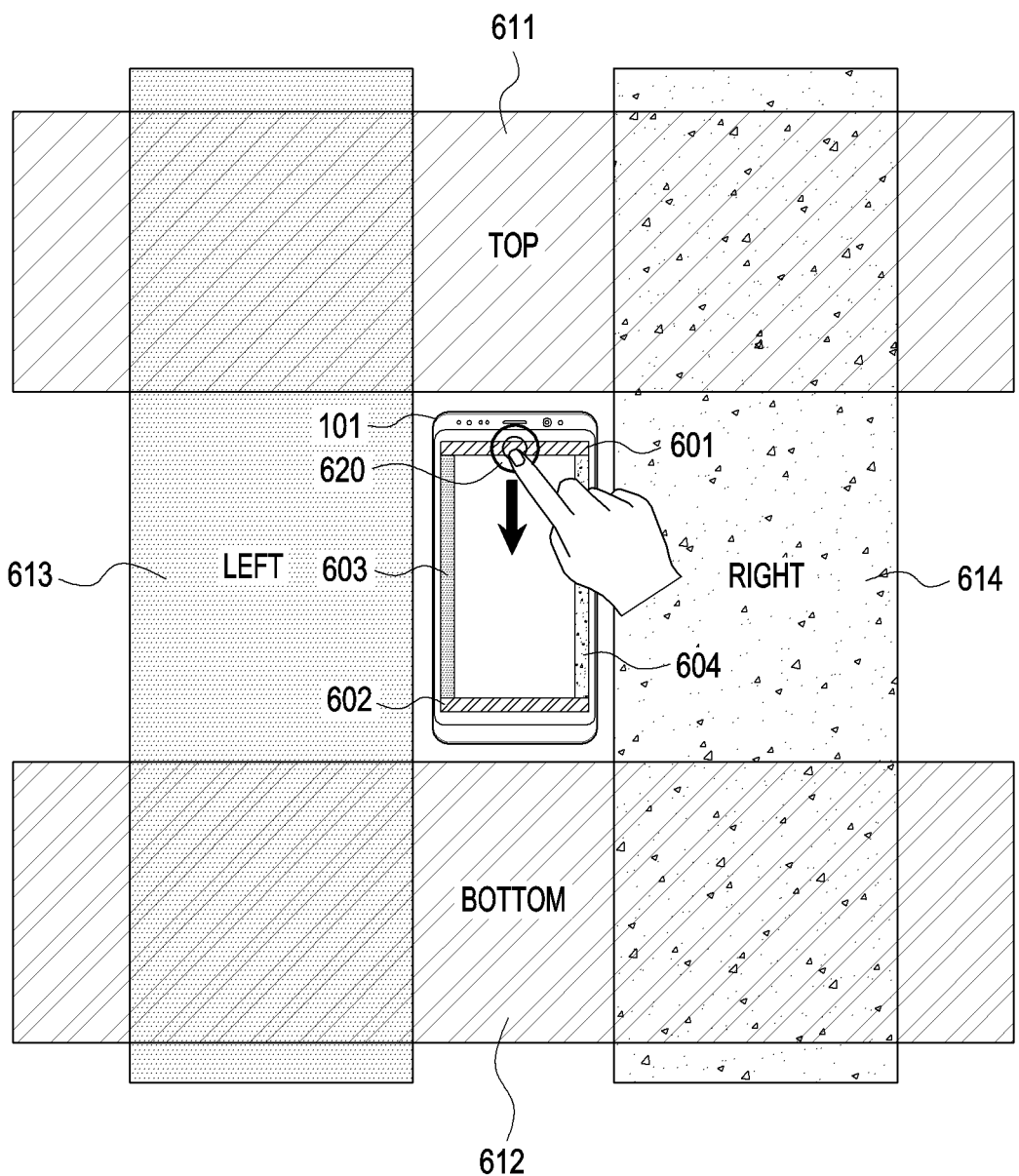
FIGS. 6A, 6B, and 6C are views illustrating a display area according to various embodiments of the disclosure.
Figure 6B:
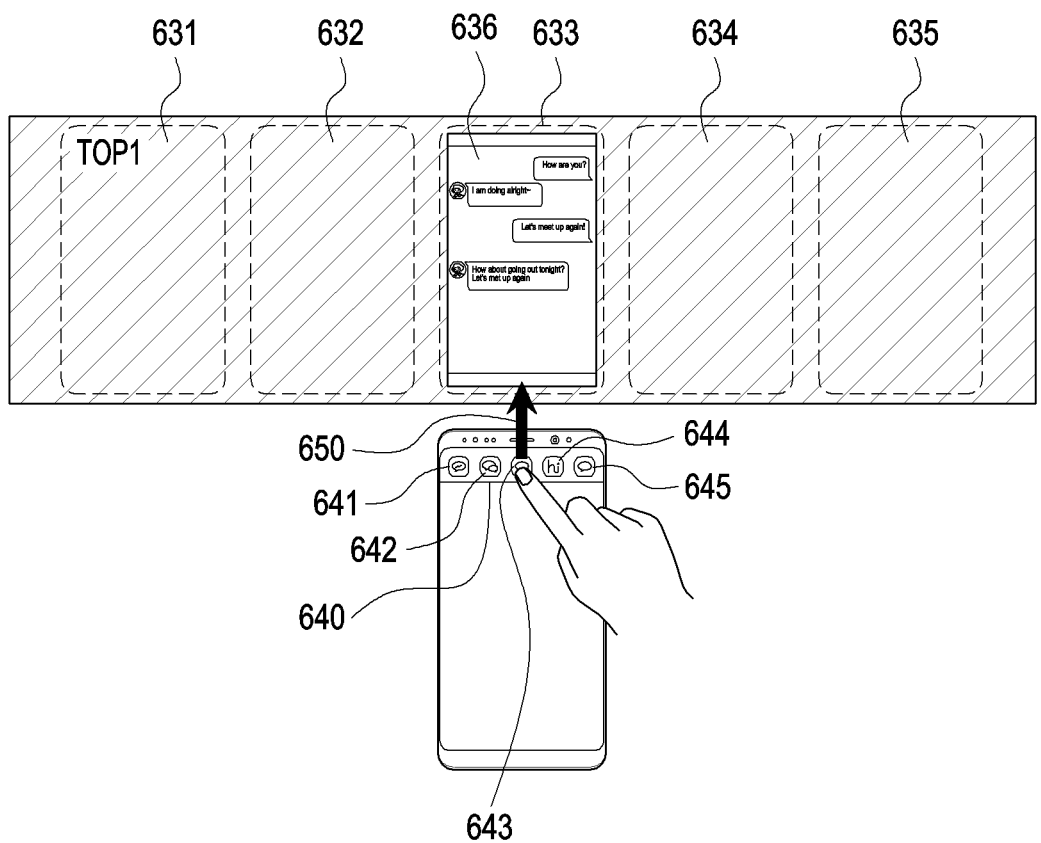
Figure 6C:
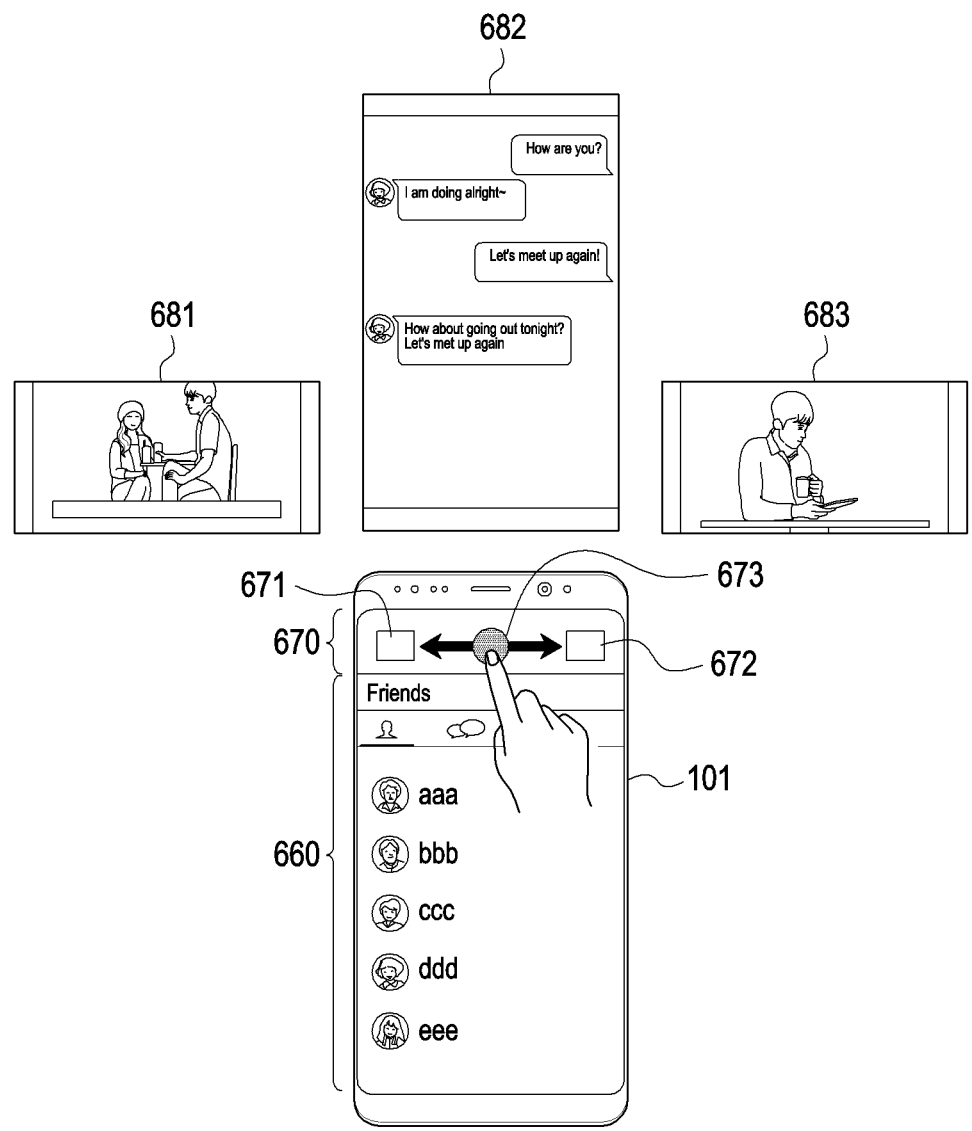

FIGS. 6A, 6B, and 6C are views illustrating a display area according to various embodiments of the disclosure.

In operation 501, the electronic device 101 and the AR device 201 may form a communication connection. In operation 503, the electronic device 101 may transmit first data for display and information about the position of display. The electronic device 101 and the AR device 201 may previously store the information about the position of display.

Referring to FIG. 6A, the electronic device 101 and the AR device 201 may previously store information indicating four display areas 611, 612, 613, and 614. The electronic device 101 may select a first display area 611 among the four display areas 611, 612, 613, and 614 based on the type (or property) of content requested by the AR device 201 or input from the user. The electronic device 101 may transmit information (e.g., index) about the position of display indicating the first display area 611 along with the first data for display to the AR device 201. For example, the user may input the information about the position of display to the electronic device 101 by inputting a drag 620 on any one of areas 601, 602, 603, and 604 adjacent four edges of the display device 160. At least one icon representing an externally displayable application (or object) may be displayed in the area where the drag 620 has been inputted among the areas 601, 602, 603, and 604. When a particular icon is selected, data for displaying the content corresponding to the selected icon may be transmitted to the AR device 201. Further, information about the designated area, as the information about the position of display, may be transmitted to the AR device 201.

In operation 505, the AR device 201 may identify the position where to display an image based on the first data based on the information about the position of display and the position of the electronic device 101 relative to the AR device 201. In operation 507, the AR device 201 may display the first image in the identified position. For example, as described above in connection with FIG. 4B, the AR device 201 may identify the position of the electronic device 101 and may identify the position of display of the image 430 so that the image 430 is displayed in the first display area 611 which is positioned over the electronic device 101. As another example, the electronic device 101 may select a third display area 613 as the position of display and may transmit the information indicating the third display area 613, as the information about the position of display, to the AR device 201. In this case, the AR device 201 may identify the position of display of the image 440 so that the user perceives as if the image 440 is positioned on the left side of the electronic device 101, e.g., as shown in FIG. 4D.

According to an embodiment, the electronic device 101 may identify the position of display of content based on the direction of a user command (e.g., drag input) for executing an icon. For example, when a designated condition is met, the electronic device 101 may display at least one icon corresponding to the content. For example, the electronic device 101 may display icons 641, 642, 643, 644, and 645 as shown in FIG. 6B which is described below in greater detail. The electronic device 101 may obtain an execution command on at least part of at least one icon. The electronic device 101 may obtain a drag input on at least part of at least one icon as the execution command. The electronic device 101 may identify the position of display of content based on the direction of drag input. For example, when the drag input is oriented up, the electronic device 101 may identify that the position of display of content is an upper side of the electronic device 101. The electronic device 101 may set information about the position of display corresponding to the four directions, i.e., up/down/left/right, described above in connection with FIG. 6A and may identify any one as the position of display based on the drag input.

Referring to FIG. 6B, the four display areas of FIG. 6A may be split further. For example, the upper display area of the electronic device may be divided into first to fifth sub display areas 631, 632, 633, 634, and 635. Although the first to fifth sub display areas 631, 632, 633, 634, and 635 are shown not to overlap each other in FIG. 6B, this is merely an example. At least two of the first to fifth sub display areas 631, 632, 633, 634, and 635 may overlap each other. According to an embodiment, the AR device 201 may display objects individually representing the first to fifth sub display areas 631, 632, 633, 634, and 635, or omit the display, so as to distinguish the first to fifth sub display areas 631, 632, 633, 634, and 635 from each other. The AR device 201 may display an image 636 created based on the data received from the electronic device 101 on, e.g., the third sub display area 633. The AR device 201 may receive information denoting the third sub display area 633, as information about the display area, from the electronic device 101 and, based thereupon, display the image 636 on the third sub display area 633. For example, the electronic device 101 may display at least one executable icons 641, 642, 643, 644, and 645 on the first area 640 as shown in FIG. 6B. For example, upon detecting a drag from the area 601 adjacent the upper edge in FIG. 6A, the electronic device 101 may display at least one icon 641, 642, 643, 644, and 645 on the first area 640. When a drag is detected from the other areas 602, 603, and 604, an icon may be displayed in the position corresponding to the corresponding area 602, 603, or 604. The same icon or a different icon may be set per area. Upon identifying a long press or force touch other than a drag, an icon may be displayed. The electronic device 101 may execute a function or application associated with the selected icon (e.g., the third icon 643) based on an execution command (e.g., drag 650) on any one icon (e.g., the third icon 643). The electronic device 101 may transmit, to the AR device 201, data for displaying the screen indicating the result of performing the function or execution screen of application associated with the selected icon. The AR device 201 may display the image 636 in the position on the display device 250 corresponding to the third sub area 633 based on the received data. For example, the AR device 201 may identify the position of the electronic device 101 and identify the position of display on the display device 250 of the image 636 so that the user perceives as if the image 636 is positioned in the third sub area 633 over the electronic device 101. The AR device 201 may receive the information indicating the third sub area 633 from the electronic device 101 and identify the position of display on the display device 250 of the image 636. Unless the AR device 201 receives the information indicating the sub areas from the electronic device 101, the AR device 201 may determine that a default area (e.g., the third sub area 633) is the position of display.

The electronic device 101 may identify at least one of the first to fifth sub display areas 631, 632, 633, 634, and 635 as the display area and transmit information indicating the identified display area to the AR device 201. For example, the electronic device 101 may request the AR device 201 to display the image 681, image 682, and image 683 in the second sub display area 632, third sub display area 633, and fourth sub display area 634, respectively, as shown in FIG. 6B.

Referring to FIG. 6C, the AR device 201 may display the image 681, image 682, and image 683 in the respective corresponding positions of the second sub display area 632, third sub display area 633, and fourth sub display area 634, respectively. The AR device 201 may substantially simultaneously initiate the display of at least two of the image 681, image 682, and image 683. The AR device 201 may start the display of each of the image 681, image 682, and image 683 at a different time. As shown in FIG. 6C, the electronic device 101 may display a control area 670 along with the existing application execution screen 660 being displayed. The user may input a drag 673 in a first direction or second direction on the control area 670. Based on the control command, the electronic device 101 may transmit information about a change in position of display to the AR device 201. The AR device 201 may change the position of at least some of the images 681, 682, and 683 based on the information about the display position change. According to an embodiment, the control area 670 may include objects 671 and 672. For example, the object 671 may be set to change the properties, e.g., size or color, of the displayed image (e.g., the focused image 683), and the object 672 may be set to execute a text input function in the displayed image (e.g., the focused image 683). The electronic device 101, upon detecting selection of at least some of the objects 671 and 672, may perform a preset function and transmit data for display of content reflecting the result of performing the function to the AR device 201. Thus, the AR device 201 may display the content reflecting the result of performing the function. For example, the electronic device 101 may change the color of the image 682 based on at least selection of the object 671 and transmit data for display of the color-changed content to the AR device 201. The AR device 201 may display the color-changed image 682 based on the received data. According to an embodiment, the electronic device 101 may change the position or properties of at least some of the images 681, 682, and 683 and transmit the corresponding information to the AR device 201. The objects 671 and 672 are not limited to particular functions. For example, the object 671 may be set to an object for moving to the left, and the object 672 may be set to an object for moving to the right. Upon detecting designation of any one of the objects 671 and 672 for changing the position of display, the electronic device 101 may transmit information about the change in the position of display to the AR device 201.

According to an embodiment, when a plurality of contents are displayed on the AR device 201 as shown in FIG. 6C, if an additional content is intended to be displayed on the AR device 201, the electronic device 101 may identify any one of the display areas other than the display area which is already in use as the display area for the additional content. The electronic device 101 may receive a command for adjusting the position of display of the additional content and, corresponding thereto, identify the position of display of the additional content.

Figure 7:
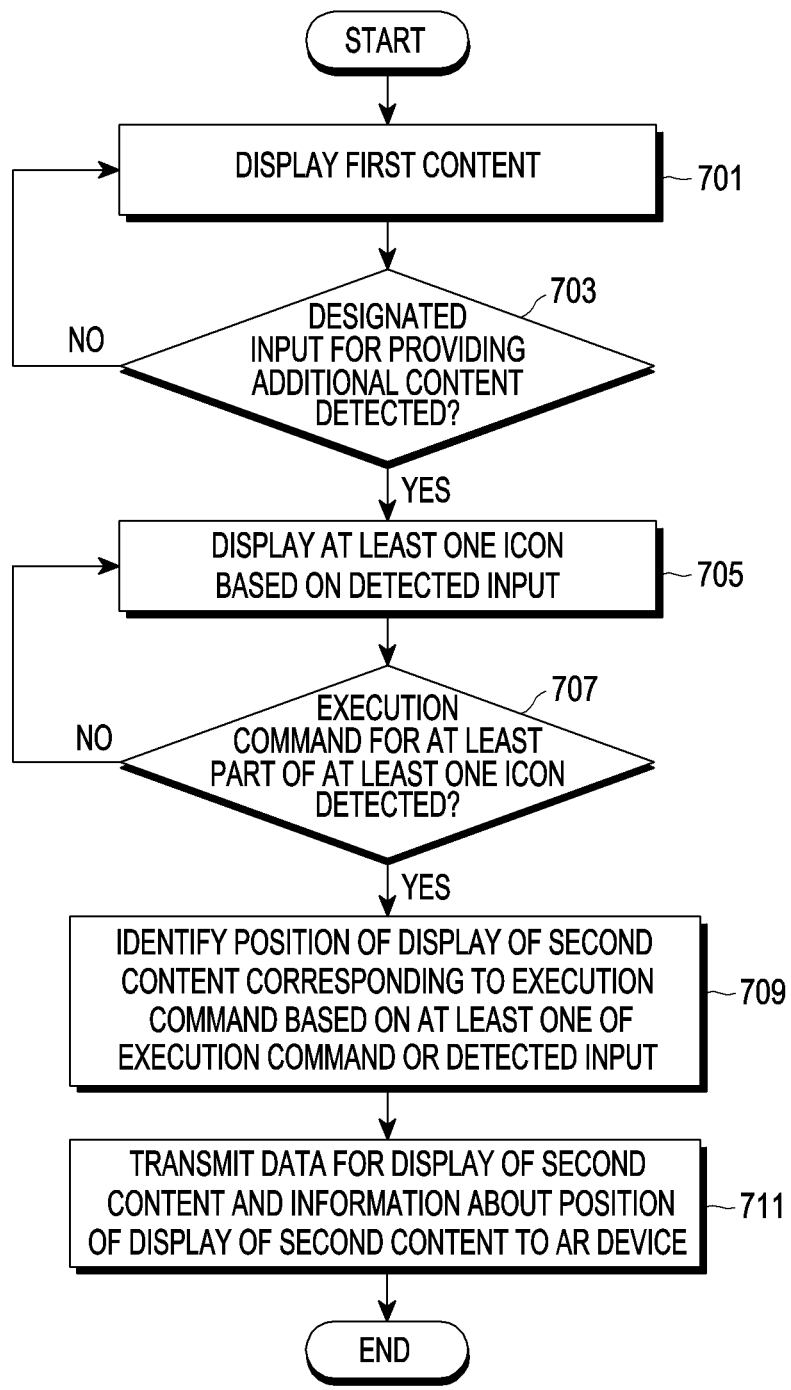
FIG. 7 is a flowchart illustrating a method for operating an electronic device according to an embodiment of the disclosure.

FIG. 7 is a flowchart illustrating a method for operating an electronic device according to an embodiment of the disclosure.

Referring to FIG. 7, the electronic device 101 may display a first content in operation 701. In operation 703, the electronic device 101 may identify whether a designated input is detected to provide an additional content. The input designated to provide the additional content may be a drag input 620 in any one of the areas near the edge of FIG. 6A but its type is not limited to a particular one. The electronic device 101 may identify whether an event for providing an additional content is detected based on the result of internal computation rather than an input from the user. For example, various events, such as a notification for displaying a received message or a notification for indicating an incoming call, may be set as the event for providing an additional content.

In operation 705, the electronic device 101 may display at least one icon based on the detected input. The at least one icon may be an icon for executing an application different from the application associated with the first content or an icon indicating the function of the application associated with the first content. In operation 707, the electronic device 101 may identify whether a command for executing at least some of the at least one icon is detected. For example, the electronic device 101 may detect a drag 650 from at least one icon (e.g., the icon 643) as shown in FIG. 6B.

In operation 709, the electronic device 101 may identify the position of display of a second content corresponding to the execution command based on at least one of the detected input or execution command. For example, the electronic device 101 may identify the position of display of the second content based on at least one of the drag 650 of FIG. 6B or the drag 620 of FIG. 6A. For example, the electronic device 101 may identify the upper display area 611 based on the position of the drag 620 and identify the third sub area 633 based on at least one of the direction or position of the drag 640. In operation 711, the electronic device 101 may transmit data for display of the second content and information about the position of display of the second content to the AR device 201. The AR device 201 may display an image 636 in a position on the display device 250 corresponding to the third sub area 633 based on the position of the electronic device 101 and the received information about the position of display.

Figure 8:
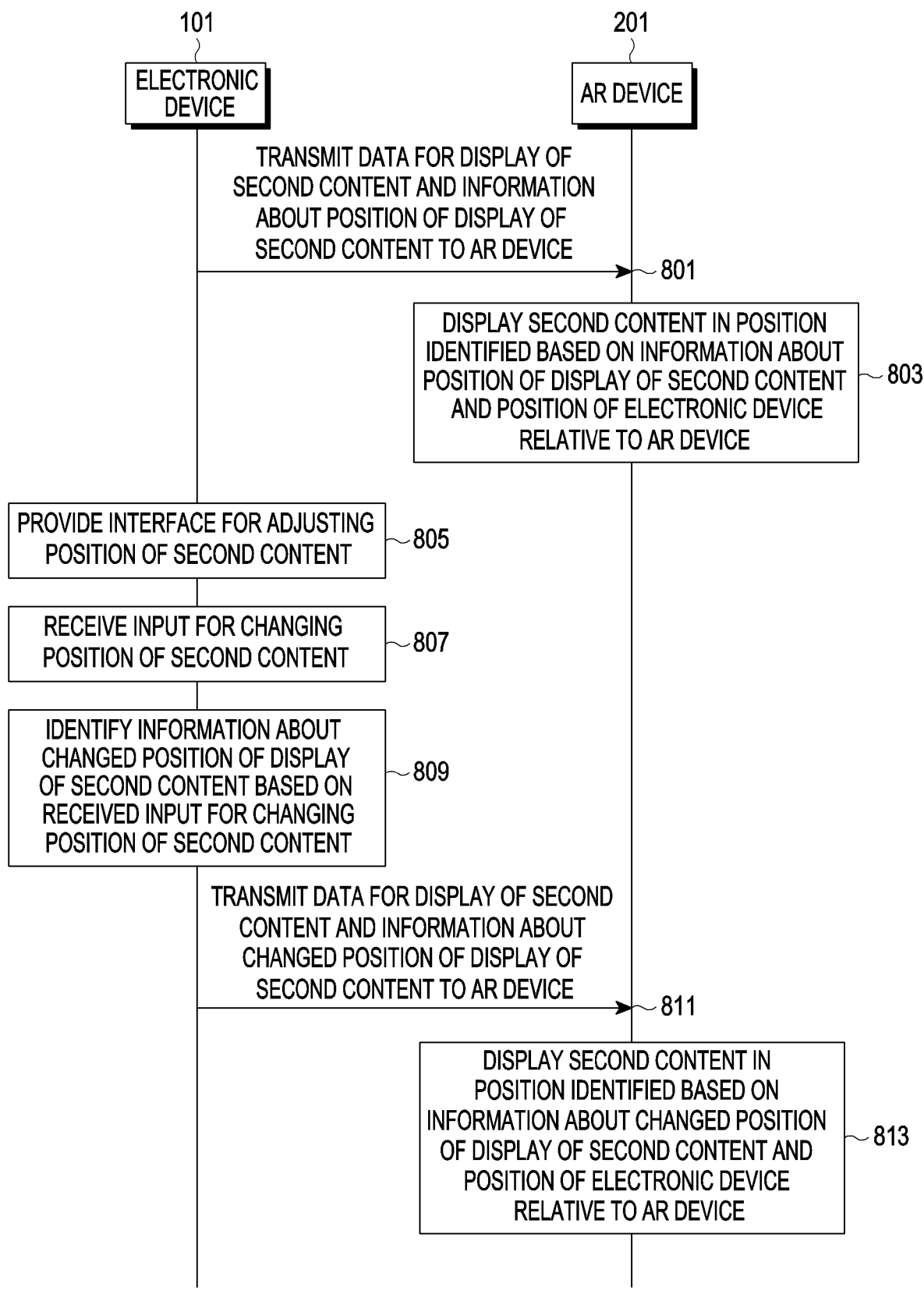
FIG. 8 is a flowchart illustrating a method for operating an electronic device and an AR device according to an embodiment of the disclosure.

FIG. 8 is a flowchart illustrating a method for operating an electronic device and an AR device according to an embodiment of the disclosure.

Referring to FIG. 8 is described in greater detail with reference to FIG. 9.

Figure 9:
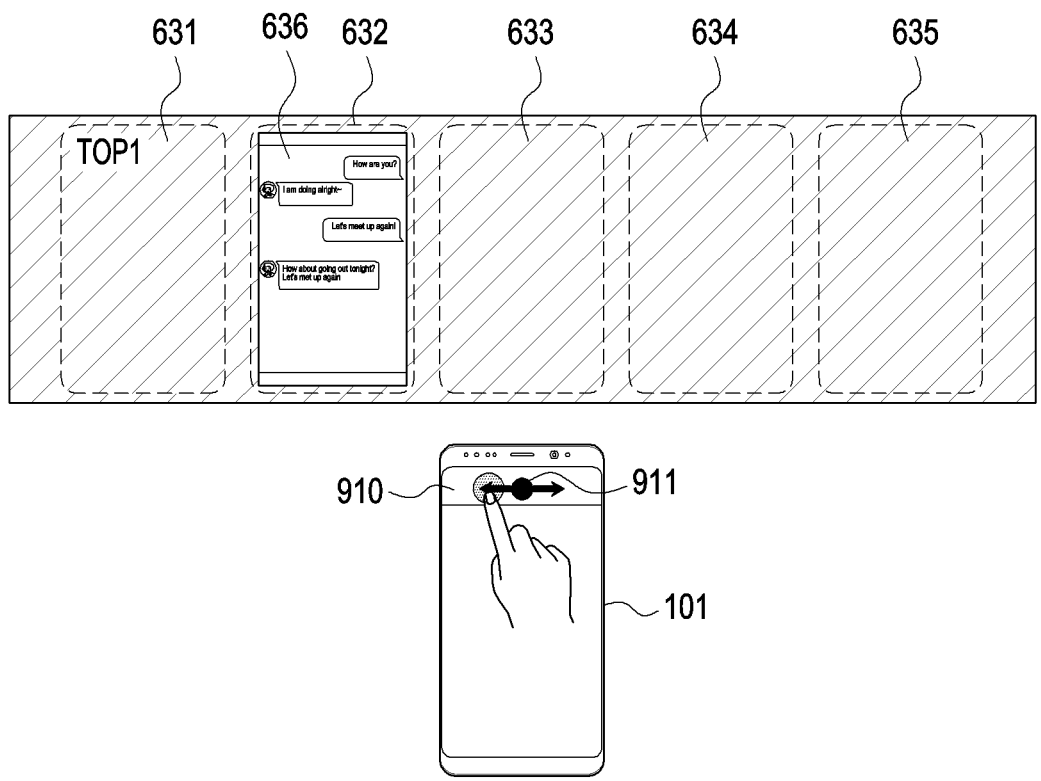
FIG. 9 is a view illustrating a movement of a display area according to an embodiment of the disclosure.

FIG. 9 is a view illustrating a movement of a display area according to an embodiment of the disclosure.

According to an embodiment, in operation 801, the electronic device 101 may transmit data for display of the second content and information about the position of display of the second content to the AR device 201. For example, the electronic device 101 may transmit information indicating the third sub display area 633 of FIG. 9, as information about the position of display of the second content, to the AR device 201. In operation 803, the AR device 201 may display the second content in the position of the electronic device 101 relative to the AR device 201 and the position identified based on the information about the position of display of the second content. In operation 805, the electronic device 101 may provide an interface for adjusting the position of the second content.

Referring to FIG. 9, the electronic device 101 may display an interface 910 for receiving an input of adjusting position. In operation 807, the electronic device 101 may receive an input for repositioning the second content. For example, the electronic device 101 may receive a drag input 911 for repositioning as shown in FIG. 9. In operation 809, the electronic device 101 may identify information about the changed position of display of the second content based on the received input for repositioning the second content. For example, the electronic device 101 may identify the repositioning direction based on the direction of the drag input 911. For example, when the direction of the drag input 911 is a left direction, the electronic device 101 may identify that the second sub display area 632 positioned on the left side of the third sub display area 633 is the display area. When the drag input 911 continues, the electronic device 101 may additionally change the display area.

In operation 811, the electronic device 101 may transmit data for display of the second content and information about the changed position of display of the second content to the AR device 201. For example, the electronic device 101 may transmit the information indicating the second sub display area 632, as the information about the changed position of display, to the AR device 201. In operation 813, the AR device 201 may display the second content in the position of the electronic device 101 relative to the AR device 201 and the position identified based on the information about the changed position of display of the second content. For example, as shown in FIG. 9, the electronic device 101 may identify the position of display of the image 636 so that the user perceives as if the image 636 is placed in the second sub display area 632 relative to the electronic device 101.

Figure 10:
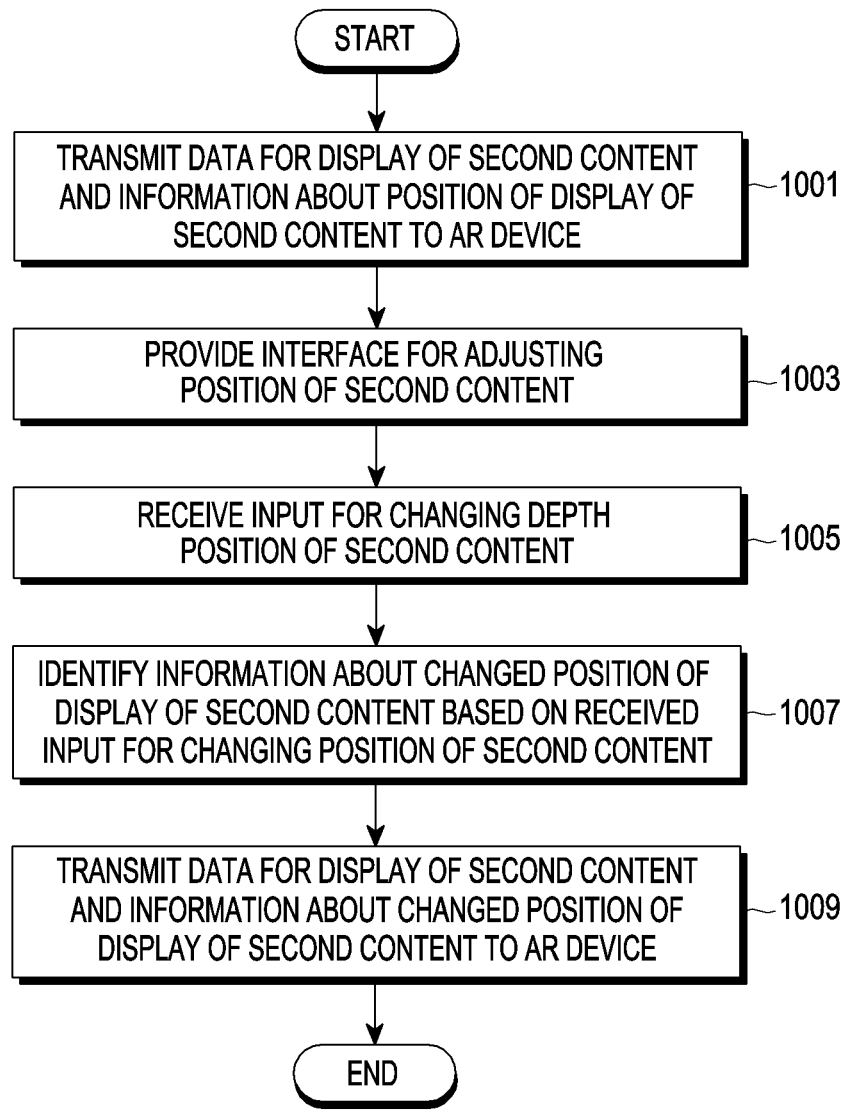
FIG. 10 is a flowchart illustrating a method for operating an electronic device according to an embodiment of the disclosure.

FIG. 10 is a flowchart illustrating a method for operating an electronic device according to an embodiment of the disclosure of the disclosure.

Referring to FIG. 10 is described in greater detail with reference to FIGS. 11A and 11B.

Figure 11A:
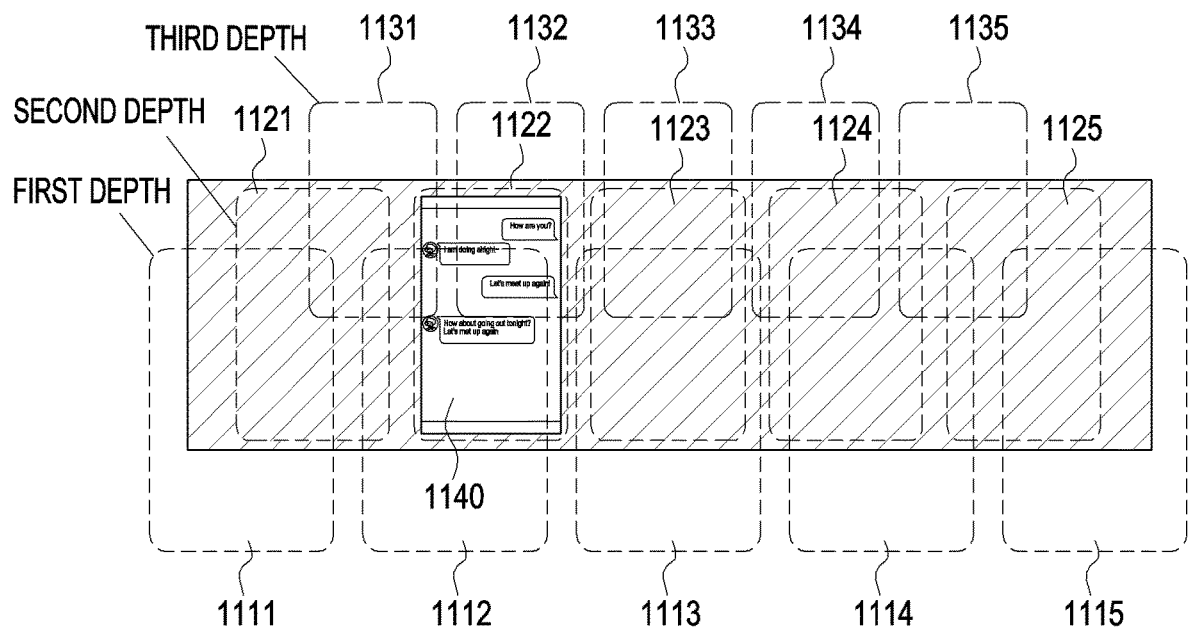
FIG. 11A is a view illustrating a depth position according to an embodiment of the disclosure.

FIG. 11A is a view illustrating a depth position according to an embodiment of the disclosure.

Figure 11B:
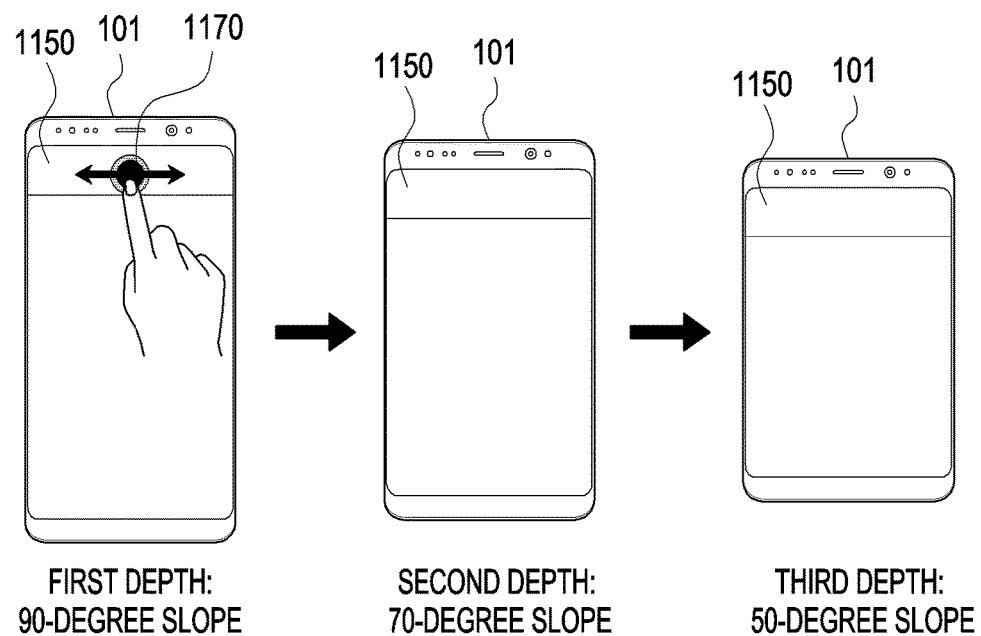
FIG. 11B is a view illustrating a change in depth position according to an embodiment of the disclosure.

FIG. 11B is a view illustrating a change in depth position according to an embodiment of the disclosure.

According to an embodiment, in operation 1001, the electronic device 101 may transmit data for display of the second content and information about the position of display of the second content to the AR device 201. In operation 1003, the electronic device 101 may provide an interface for adjusting the position of the second content. In operation 1005, the electronic device 101 may receive an input for depth repositioning of the second content. The electronic device 101 and the AR device 201 may divide and define the display area per depth.

Referring to FIG. 11A, the electronic device 101 and the AR device 201 may define sub display spaces for a first depth, a second depth, and a third depth. A first sub display space 1111, a second sub display space 1112, a third sub display space 1113, a fourth sub display space 1114, and a fifth sub display space 1115 may be positioned in the first depth. A sixth sub display space 1121, a seventh sub display space 1122, an eighth sub display space 1123, a ninth sub display space 1124, and a tenth sub display space 1125 may be positioned in the second depth. An eleventh sub display space 1131, a twelfth sub display space 1132, a thirteen sub display space 1133, a fourteenth sub display space 1134, and a fifteenth sub display space 1135 may be positioned in the third depth. Although FIG. 11A illustrates that a plurality of depths are defined at the upper side of the electronic device 101, this is merely an example. According to an embodiment, the electronic device 101 and the AR device 201 may define a plurality of depths and per-depth sub display spaces in various directions (e.g., lower side, right side, or left side) of the electronic device 101.

In operation 1007, the electronic device 101 may identify information about the changed position of display of the second content based on the received input for repositioning the second content. For example, the electronic device 101 may identify that the second sub position 1112 is the position of display. The electronic device 101 may identify that the second sub position 1112 is the position of display or that a second sub position 1112 resulting from changing the position of display in the same depth is the position of display. For example, when the third sub position 1113 is set as the default position, the electronic device 101 may first set the third sub position 1113 as the position of display and set the second sub position 1112 as the position of display based on a repositioning input received later (e.g., an input for changing the position to the left). Thereafter, the electronic device 101 may receive an input for changing depth position and, corresponding thereto, change the position of display from the second sub position 1112 to the seventh sub position 1122. According to an embodiment, the electronic device 101 may change the depth corresponding to the input for changing depth position and change the position of display with the order in the depth maintained. For example, upon receiving an input for changing depth position while the second sub display area 1112 which is the second position from the left side of the first depth is the position of display, the electronic device 101 may change the depth from the first depth to the second depth and identify that the seventh sub display area 1122 which is the second position from the left side of the second depth is the position of display Although the movement of display area from the second sub display area 1112 to the seventh sub display area 1122 has been described in connection with the above embodiment, the electronic device 101 may alternatively move the display area from the sixth sub display area 1121, eighth sub display area 1123, or twelfth sub display area 1132 to the seventh sub display area 1122.

In operation 1009, the electronic device 101 may transmit data for display of the second content and information about the changed position of display of the second content to the AR device 201. Unless there is no change in the content to be displayed on the AR device 201, the electronic device 101 may be configured to transmit only information about the changed position of display of the second content to the AR device 201 or may be configured to transmit both the data for display of the second content and the information about the position of display to the AR device 201. For example, as described above, the electronic device 101 may transmit the information indicating the seventh sub display area 1122, as the information about the changed position of display, to the AR device 201. The AR device 201 may identify the position of display on the display device 250 of the image 1140 based on the position of the electronic device 101 and the received information about the display area (e.g., the information indicating the seventh sub display area 1122). The AR device 201 may identify the position of display on the display device 250 of the image 1140 so that the user perceives as if the image 1140 is in the second position from the left side of the second depth over the electronic device 101.

Referring to FIG. 11B, the electronic device 101 may display an interface 1150 for adjusting the position of display. When a command (e.g., a drag 1170) for repositioning in the same depth is input onto the interface 1150, the electronic device 101 may change the position of display in the same depth. For example, the electronic device 101 may change the position of display from the third sub display area 1113 of FIG. 11A to the second sub display area 1112. The electronic device 101 may enter a display area change mode while displaying the interface 1150 for adjusting the position of display. When a tilting of the electronic device 101 is detected in the display area change mode, the electronic device 101 may identify the depth corresponding to the position of display based on at least the current orientation of the electronic device 101. For example, when the slope of the electronic device 101 from the ground falls within a first range (e.g., a range including 90 degrees), the electronic device 101 may identify that the depth position is a first depth. When the slope of the electronic device 101 from the ground falls within a second range (e.g., a range including 70 degrees and not overlapping the first range), the electronic device 101 may identify that the depth position is a second depth. When the slope of the electronic device 101 from the ground falls within a third range (e.g., a range including 50 degrees and not overlapping the first range and the second range), the electronic device 101 may identify that the depth position is a third depth. The number of the ranges may be the same as the number of, e.g., defined depths, and parameters to distinguish the ranges may be slopes, but not limited to slopes, and their values are not limited to particular ones. For example, upon detecting a change of the slope of the electronic device from the first range to the second range while the position of display is identified to be the second sub display area 1112, the electronic device 101 may identify that the seventh sub display area 1122 which has been changed in depth position is the position of display.

According to an embodiment, the input for changing the depth position is not limited to orientation but may rather be implemented in various forms. For example, the electronic device 101 may identify the pressure of a touch onto the interface 1150 and change the depth position based on the pressure. The electronic device 101 may identify the pressure of the touch by a pressure sensor separately implemented from the touchscreen or based on a signal output from the touchscreen, but the method for identifying the pressure is not limited to a particular one. The electronic device 101 may change the depth position based on the time of contact of touch. It will readily be appreciated by one of ordinary skill in the art that the input for changing the depth position is not limited to a particular one as long as it can be distinguished from the input for changing the position of display.

Figure 12:
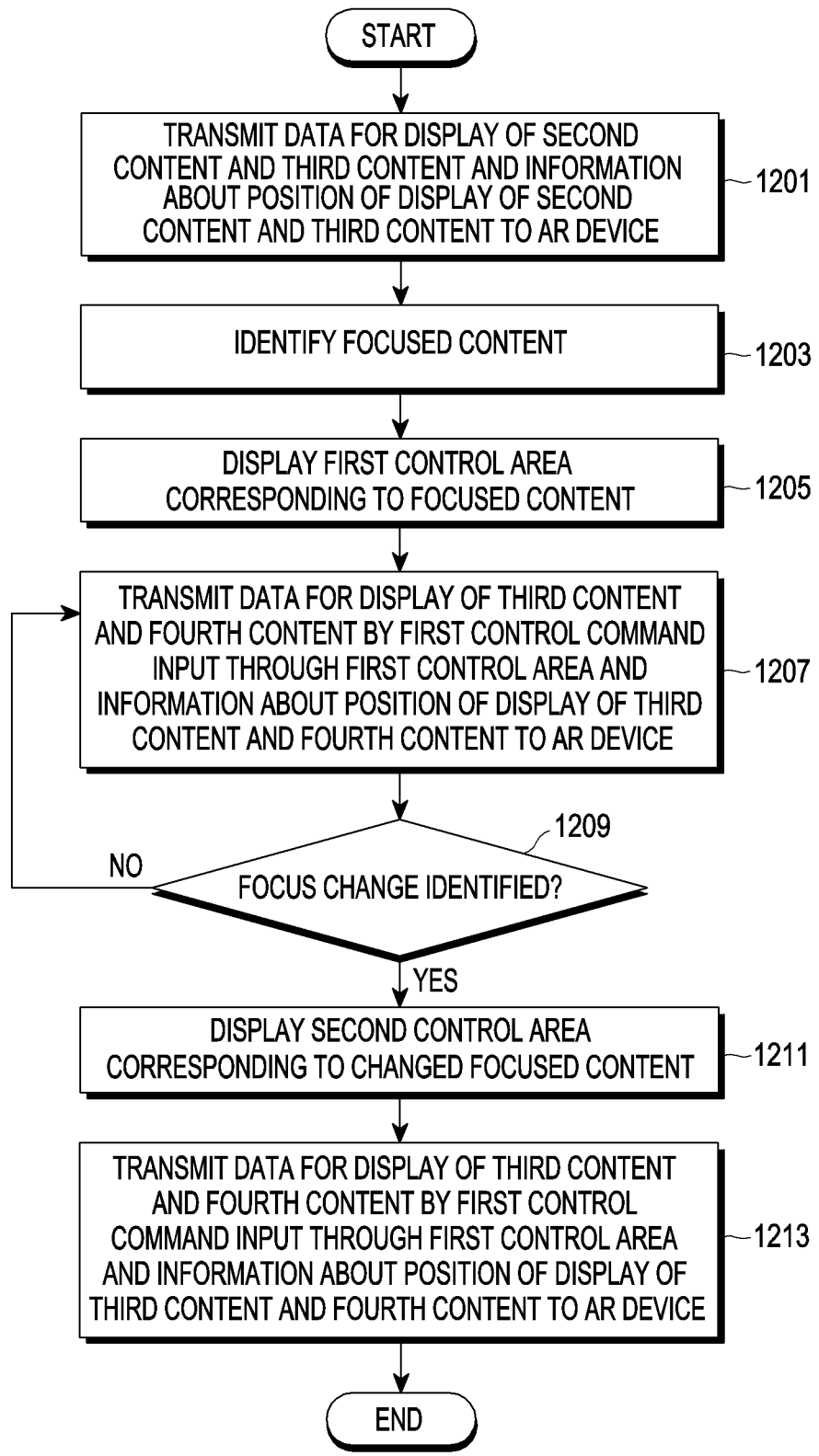
FIG. 12 is a flowchart illustrating a method for operating an electronic device according to an embodiment of the disclosure.

FIG. 12 is a flowchart illustrating a method for operating an electronic device according to an embodiment of the disclosure.

Referring to FIG. 12 is described in greater detail with reference to FIGS. 13A to 13C.

Figure 13A:
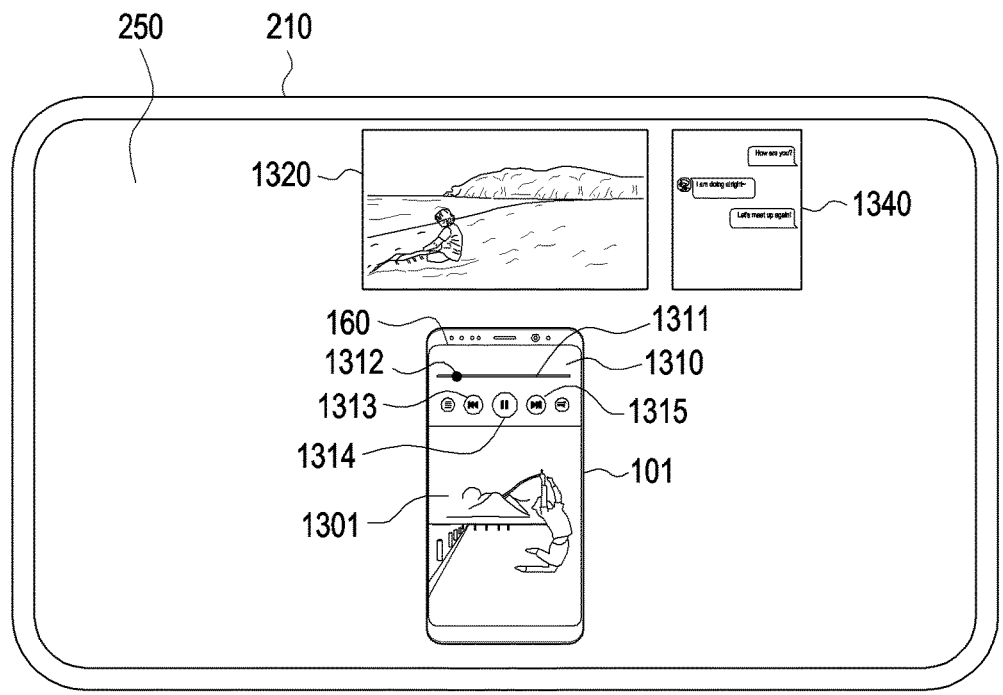
FIGS. 13A, 13B, and 13C are views illustrating an environment which is transmitted through a display device of an AR device and is observed according to various embodiments of the disclosure.
Figure 13B:
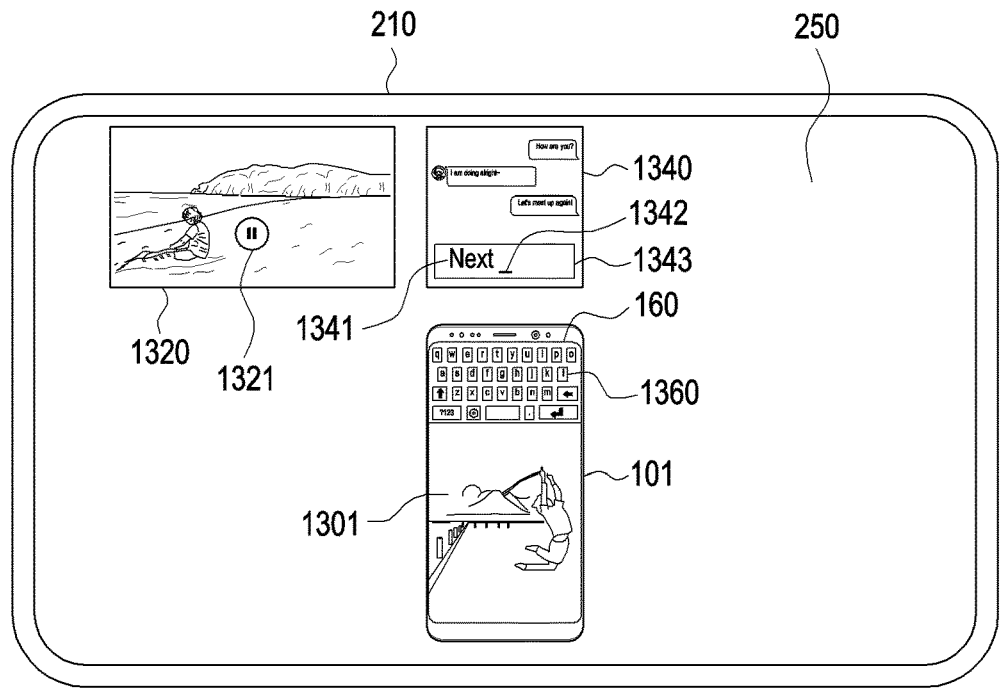
Figure 13C:
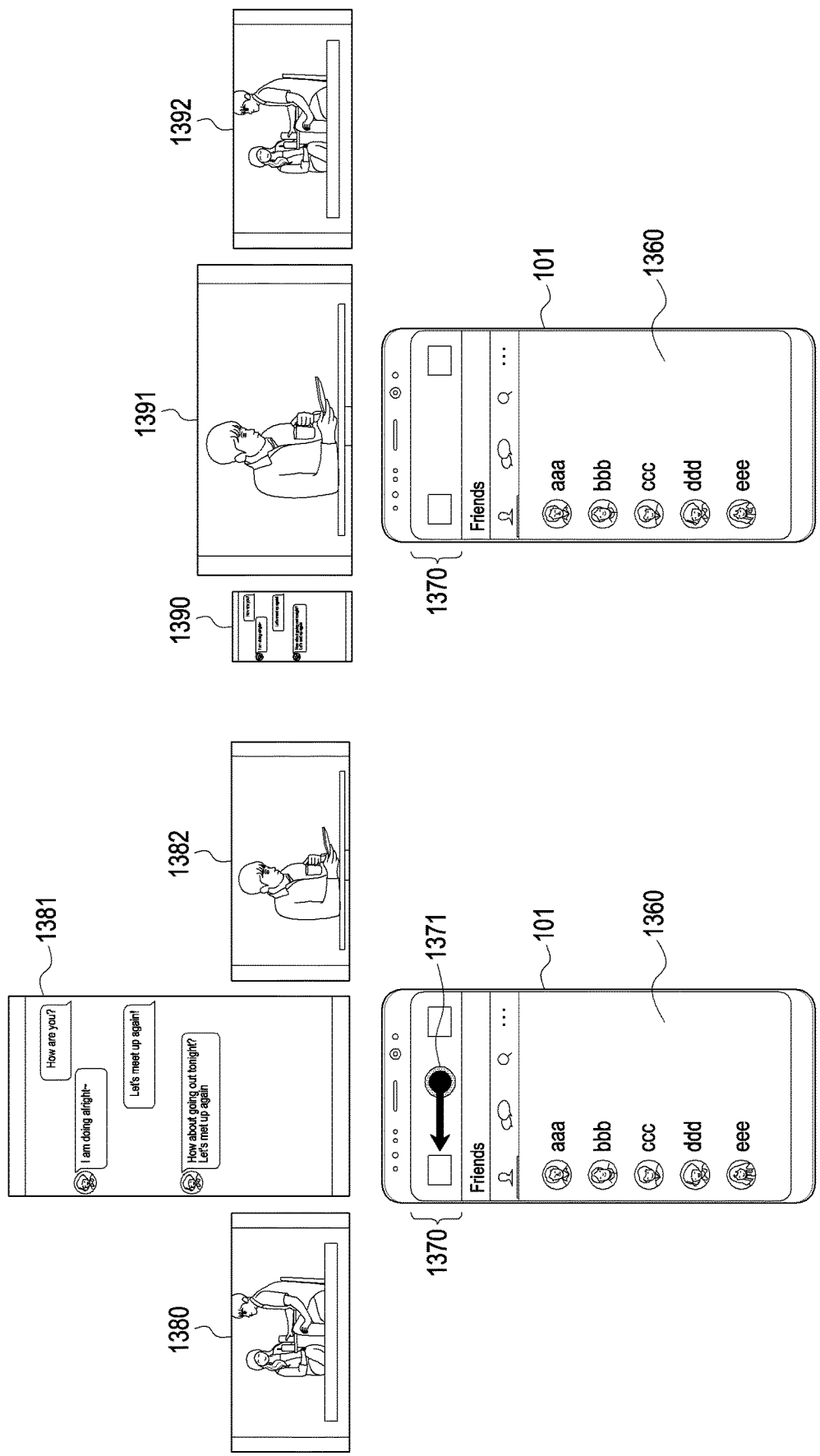

FIGS. 13A, 13B, and 13C are views illustrating an environment which is transmitted through a display device of an AR device and is observed according to various embodiments of the disclosure.

In operation 1201, the electronic device 101 may transmit data for display of the second content and third content and information about the position of display of the second content and third content to the AR device 201. For example, the electronic device 101 may transmit data for display of the execution screen of a video playback application and data for display of the execution screen of a chatting application to the AR device 201. The electronic device 101 may set the position of display of the execution screen of the video playback application to the third sub display area 1113 and the fourth sub display area 1114 among the plurality of sub display areas of FIG. 11A and transmit information thereabout to the AR device 201. The AR device 201 may display an image 1320 corresponding to the execution screen of the video playback application and an image 1340 corresponding to the execution screen of the chatting application on the display device 250 based on the received information. Light from the electronic device 101 (light reflected by the electronic device 101 and light emitted from the electronic device 101) may be transmitted through the display device 250, and the user may observe the electronic device 101 along with the images 1320 and 1340 displayed on the display device 250. The AR device 201 may identify the position of display of the images 1320 and 1340 based on the received information about the position of display and the position of the electronic device 101.

In operation 1203, the electronic device 101 may identify the focused content. In operation 1205, the electronic device 101 may display a first control area corresponding to the focused content. According to an embodiment, the electronic device 101 may identify that the content corresponding to a predesignated display area (e.g., the third sub display area 1113) is the focused content. The electronic device 101 may identify that the content for which the latest control command has been entered is the focused content or that the content for which a new event has occurred is the focused content. For example, the electronic device 101 may identify that the video playback application corresponding to a predesignated display area (e.g., the third sub display area 1113) is the focused content. The electronic device 101 may display the control area 1310 corresponding to the video playback application. The control area 1310 corresponding to the video playback application may include a progress bar 1311 indicating the video playback time, an indicator 1312 indicating the current time of play, and elements 1313, 1314, and 1315 for controlling playback. The electronic device 101 may display the existing content being played (e.g., the image 1301) in the rest of the first control area. According to an implementation, the first control area may be displayed on the overall display device 160 of the electronic device 101.

In operation 1207, the electronic device 101 may transmit data for display of the third content and fourth content by a first control command input through the first control area and information about the position of display of the third content and fourth content to the AR device 201. For example, the electronic device 101 may detect a touch on the forward element 1315 of FIG. 13A. The electronic device 101 may perform the function corresponding to the touch through the video playback application. The video playback application may execute the function corresponding to the touch, thereby providing the image a preset time after the current playback time. The electronic device 101 may transmit the image at the preset time after, as the content by the control command, to the AR device 201, and the AR device 201 may display the received content. Thus, the user may control the content through the electronic device 101 while viewing the content through the AR device 201.

In operation 1209, the electronic device 101 may identify whether the focus is changed. When a focus change is identified, the electronic device 101 may display a second control area corresponding to the content of the changed focus in operation 1211. In operation 1213, the electronic device 101 may transmit data for display of the third content and fourth content by a first control command input through the first control area and information about the position of display of the third content and fourth content to the AR device 201.

Referring to FIG. 13 B, the focused content may be changed from the video playback application to the chatting application. The electronic device 101 may receive a position-of-display move command and, thus, move the position of display of contents to the left step by step. The electronic device 101 may transmit information about the changed position of display to the AR device 201. The AR device 201 may display an image 1320 corresponding to the execution screen of the video playback application on the second sub display area 1112 and an image 1340 corresponding to the execution screen of the chatting application on the third sub display area 1113 based on the received information about the changed position of display as shown in FIG. 13B. As the chatting application is positioned in a designated display area (e.g., the third sub display area 1113), the electronic device 101 may identify that the chatting application is the focused content. The electronic device 101 may display a control area 1360 (e.g., an SIP) corresponding to the chatting application. The electronic device 101 may receive an input through the control area 1360 and form an image 1340 corresponding thereto. For example, the image 1340 may include a text input window 1343 where a text 1341 according to designation of an element for text input positioned in the control area 1360 and a cursor 1342 are positioned.

In the embodiment of FIG. 13B, the electronic device 101 may stop the execution of the application for other contents than the focused content. For example, the electronic device 101 may stop executing the video playback application which is not focused and transmit the image 1320 including the icon 1321 indicating the stopping of video playback to the AR device 201. According to an implementation, although not focused, the electronic device 101 may be configured not to stop the execution of application. In this case, the electronic device 101 may keep on executing the video playback application and may thus transmit data for video playback to the AR device 201. The AR device 201 may continuously display a plurality of images based on the data for video playback while displaying the image 1340 corresponding to the execution screen of the chatting application.

According to an embodiment, the electronic device 101 may be configured to focus a plurality of contents.

Referring to FIG. 13A, the electronic device 101 may focus both the video playback application and chatting application. When the plurality of contents are focused, the electronic device 101 may display a plurality of control areas for the plurality of contents. For example, when both the video playback application and chatting application are focused, the electronic device 101 may simultaneously display the control area 1310 as shown in FIG. 13A and the control area 1360 as shown in FIG. 13B. When a control command is input through at least one of the plurality of control areas 1310 and 1360, the electronic device 101 may transmit data for display of the image reflecting the control command to the AR device 201. According to an embodiment, although the plurality of contents are not simultaneously focused, the electronic device 101 may refrain from displaying the plurality of control areas for the plurality of contents associated with the content currently provided to the AR device 201. For example, even when the video playback application is focused as shown in FIG. 13A, the electronic device 101 may display not only the control area 1310 for control of the video playback application but also the control area 1360 for control of the chatting application. When an input is detected from the control area 1360, the electronic device 101 may focus the chatting application while allocating the detected input to the chatting application.

FIG. 13C is a view illustrating an example of changing the position of content according to an embodiment of the disclosure.

Referring to FIG. 13C, the electronic device 101 may transmit data for display of a plurality of contents and information about the position of display of each of the plurality of contents to the AR device 201. The AR device 201 may display images 1380, 1381, and 1382 corresponding to the plurality of contents (e.g., a first content, a second content, and a third content) based on the received data, information about the position of display, and the position of the electronic device 101. The electronic device 101 may focus the second content and transmit information about the focus to the AR device 201. The AR device 201 may display the image 1381 corresponding to the focused content in a larger size than the other images 1380 and 1382. Although the electronic device 101 does not provide the information about the focus, the AR device 201 may identify that the content positioned in the designated display area is the focused content and display the image 1381 corresponding to the focused content in a larger size than the other images 1380 and 1382.

The electronic device 101 may display the control area 1370 for changing the position of display of content along with the existing content 1360 being displayed. For example, the electronic device 101 may display the control area (e.g., the control area 1310 or 1360) for content control and, in response to detection of an event of entering the position-of-display change mode, display a control area 1370 for changing the position of display. The electronic device 101 may display the control area 1370 for changing the position of display along with the control area (e.g., the control area 1310 or 1360) for content control. When the position of content is changed by a motion command or voice command, the electronic device 101 may receive a position-of-display change command while keeping on displaying the control area 1310 or 1360 in which case the control area 1370 may not be displayed. Upon receiving an input (e.g., a drag input 1371) for changing the position of display, the electronic device 101 may change the position of display of contents based on the result of analysis of the input. For example, the electronic device 101 may move the position of all the contents to the left step by step based on the direction of the drag input 1371 and may change the display area of content which is positioned at the outermost side (e.g., the leftmost end) to the other outermost side (e.g., the rightmost end). In other words, the electronic device 101 may identify the position of display of content as if the position of display circulates. The AR device 201 may display the images 1390, 1391, and 1392 corresponding to the contents and may display the image 1391 corresponding to the focused content in a larger size than the other images 1390 and 1392. According to an embodiment, the AR device 201 may additionally display a separate indicator on the edge of the focused image (or at the outside of the edge of the image). Thus, the user may identify which content is being focused.

Figure 14A:
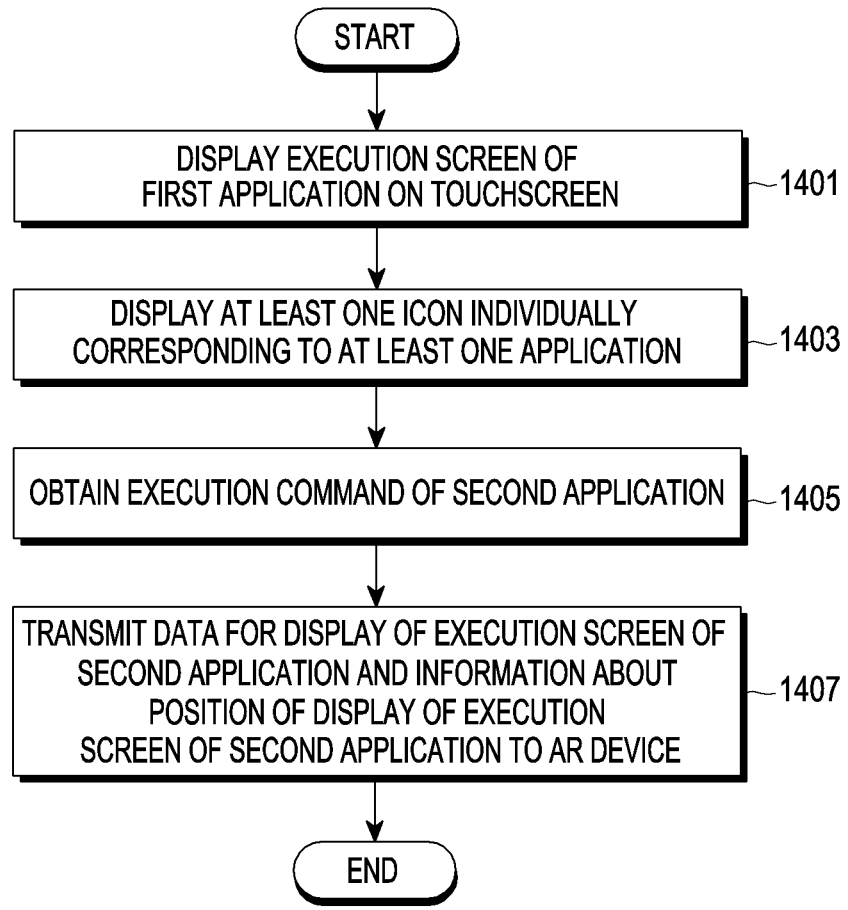
FIGS. 14A, 14B, and 14C are flowcharts illustrating a method of operating an electronic device according to various embodiments of the disclosure.
Figure 14B:
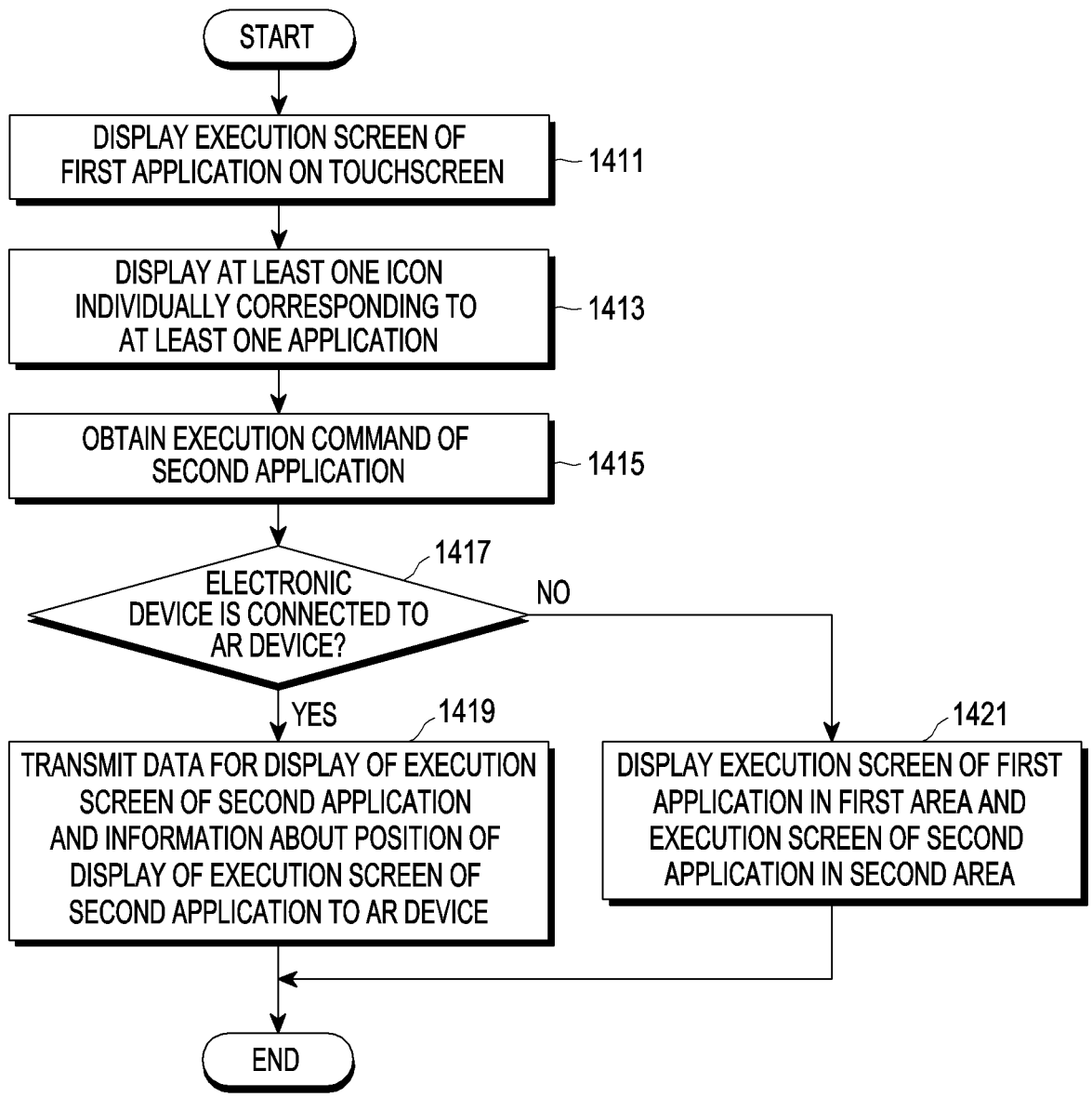
Figure 14C:
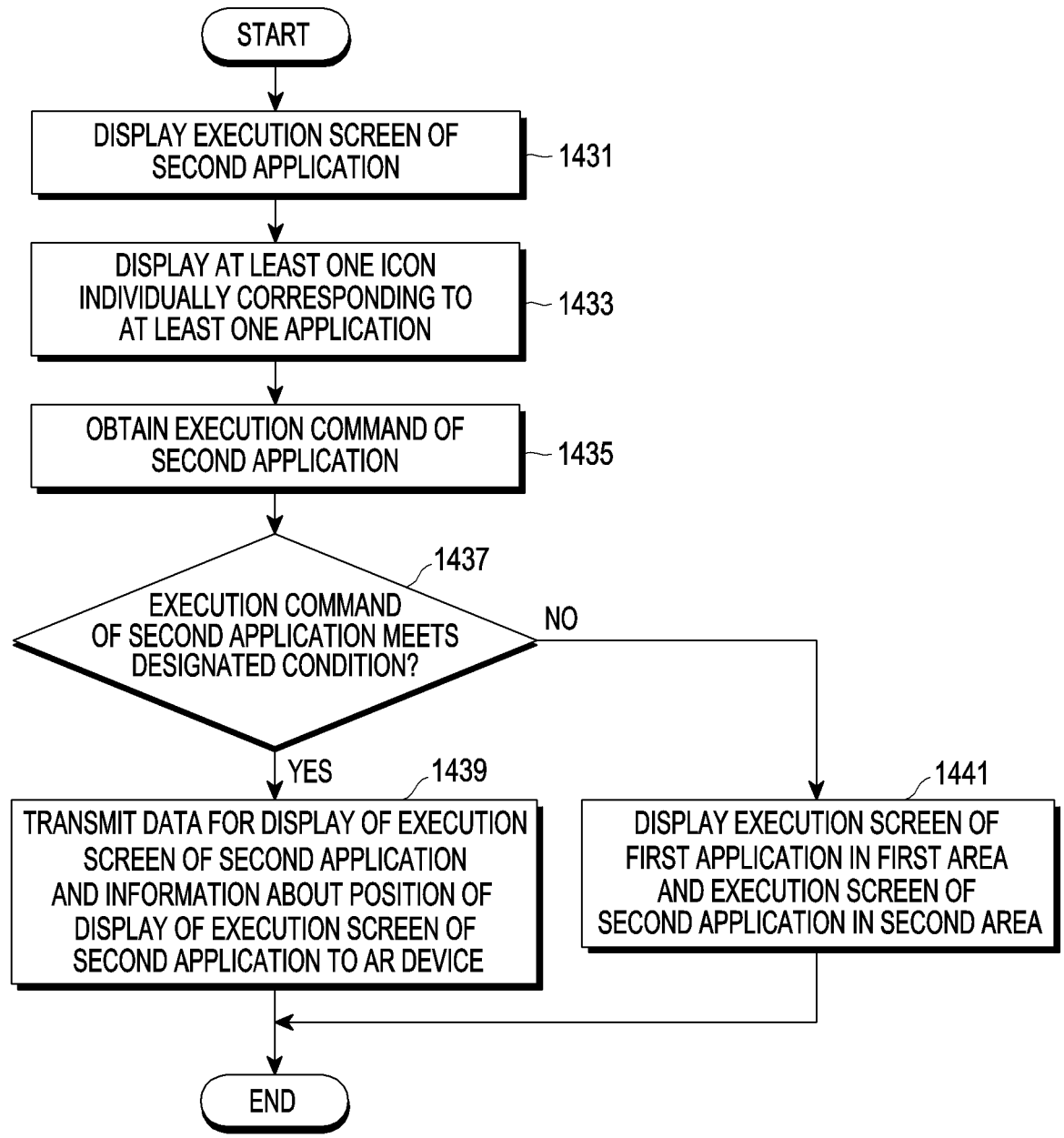

FIGS. 14A, 14B, and 14C are flowcharts illustrating a method of operating an electronic device according to various embodiments of the disclosure.

Referring to FIG. 14A, the electronic device 101 may display an execution screen of a first application on the touchscreen in operation 1401. In operation 1403, the electronic device 101 may display at least one icon each of which corresponds to at least one application. According to an embodiment, the electronic device 101 may detect an additional application execution command while displaying the execution screen of the first application and, correspondingly thereto, display the icon corresponding to an application which may additionally be executed.

In operation 1405, the electronic device 101 may obtain an execution command of a second application. For example, the electronic device 101 may obtain the execution command of the second application by detecting a touch (or drag input) to the icon corresponding to the second application. In operation 1407, the electronic device 101 may transmit data for display of the execution screen of the second application and information about the position of display of the execution screen of the second application to the AR device 201. The AR device 201 may display an image, which is based on the received data, in the position of display on the display device 250 identified based on the position of the electronic device 101 and the information about the position of display.

Referring to FIG. 14B, according to an embodiment, the electronic device 101 may display the execution screen of the first application on the touchscreen in operation 1411. In operation 1413, the electronic device 101 may display at least one icon each of which corresponds to at least one application. In operation 1415, the electronic device 101 may obtain an execution command of a second application. In operation 1417, the electronic device 101 may identify whether the electronic device 101 is connected to the AR device 201. The electronic device 101 may previously form a communication connection with the AR device 201 in which case, in operation 1419, the electronic device 101 may transmit data for display of the execution screen of the second application and information about the position of display of the execution screen of the second application to the AR device 201. The AR device 201 may display an image, which is based on the received data, in the position of display on the display device 250 identified based on the position of the electronic device 101 and the information about the position of display. Unless the electronic device 101 is identified to be connected with the AR device 201, the electronic device 101 may, in operation 1421, display the execution screen of the first application in the first area and the execution screen of the second application in the second area. In other words, the electronic device 101 may split the entire area of the touchscreen and simultaneously display the execution screens in their respective areas.

Referring to FIG. 14C, according to an embodiment, the electronic device 101 may display the execution screen of the first application on the touchscreen in operation 1431. The embodiment related to FIG. 14C is described in greater detail with reference to FIG. 15.

Figure 15:
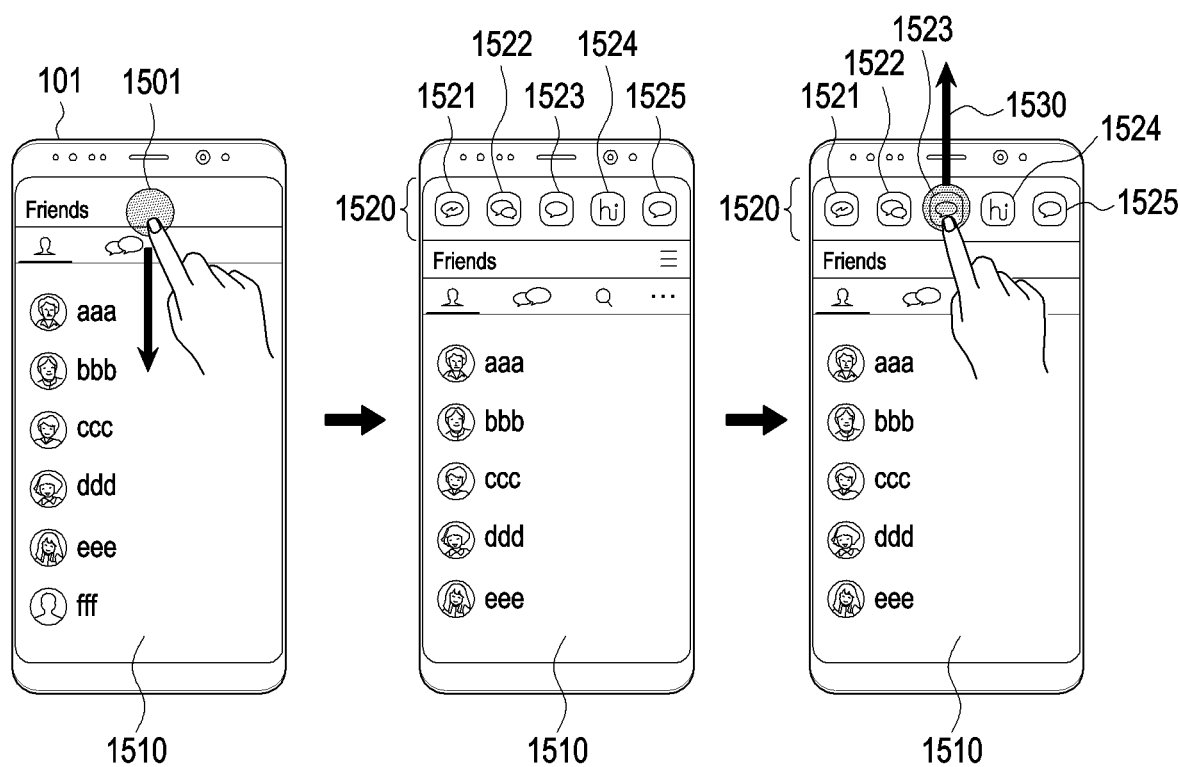
FIG. 15 is a view illustrating a data transmission condition of an electronic device according to an embodiment of the disclosure.

FIG. 15 is a view illustrating a data transmission condition of an electronic device according to an embodiment of the disclosure. In operation 1433, the electronic device 101 may display at least one icon each of which corresponds to at least one application.

Referring to FIG. 15, the electronic device 101 may receive an additional application execution command (e.g., a drag input 1501) while displaying the execution screen 1510 of the first application. Corresponding thereto, the electronic device 101 may display an area 1520 including at least one icon 1521, 1522, 1523, 1524, and 1525.

In operation 1435, the electronic device 101 may obtain an execution command of a second application. In operation 1437, the electronic device 101 may identify whether the execution command of the second application meets a designated condition. The designated condition may be a condition for determining whether to transmit the execution screen of the second application to an external device, i.e., the AR device 201. Upon identifying that the execution screen of the second application meets the designated condition, the electronic device 101 may, in operation 1439, transmit data for display of the execution screen of the second application and information about the position of display of the execution screen of the second application to the AR device 201. For example, as shown in FIG. 15, the electronic device 101 may receive a drag input 1530 for the third icon 1523. According to the direction of the drag input 1530, the electronic device 101 may be configured to determine whether to display the execution screen of the second application on the electronic device 101 or to transmit the execution screen to the AR device 201. The electronic device 101 may detect that the direction of the drag input 1530 is a first direction (e.g., the upper direction) and, corresponding thereto, transmit data for display of the execution screen of the second application to the AR device 201. Unless the execution screen of the second application is identified to meet the designated condition, the electronic device 101 may, in operation 1441, display the execution screen of the first application in the first area and the execution screen of the second application in the second area. For example, the electronic device 101 may detect that the direction of the drag input is a second direction (e.g., the lower direction) and, corresponding thereto, display the execution screen of the second application on at least part of the touchscreen. The electronic device 101 may display the execution screen of the second application on the first area of the touchscreen and the execution screen of the second application on the second area.

Figure 16:
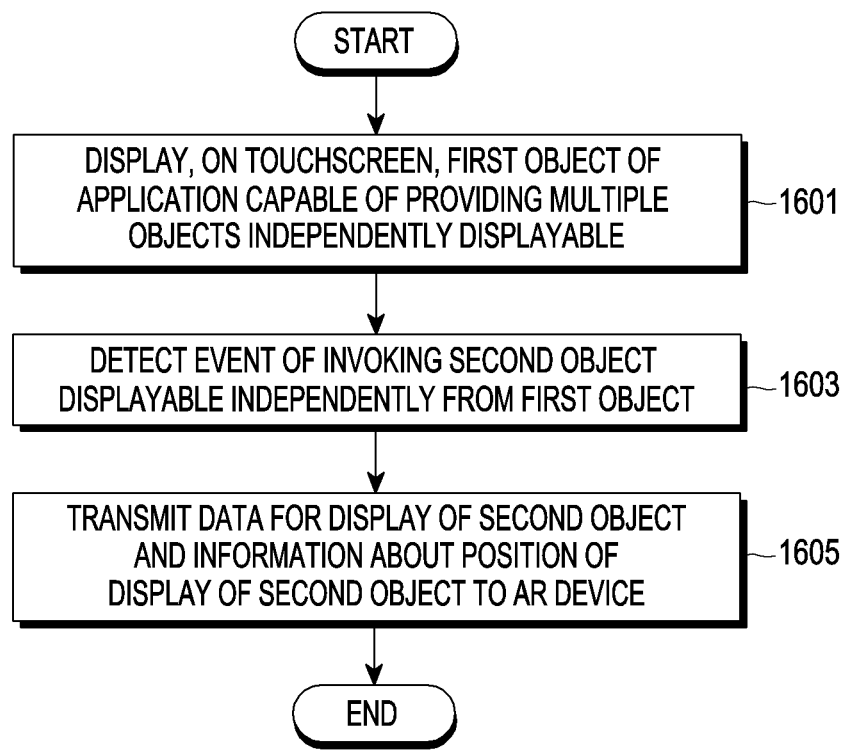
FIG. 16 is a flowchart illustrating a method for operating an electronic device according to an embodiment of the disclosure.

FIG. 16 is a flowchart illustrating a method for operating an electronic device according to an embodiment the disclosure.

Referring to FIG. 16, according to an embodiment, the electronic device 101 may display, on the touchscreen, a first object of an application which may provide a plurality of objects independently displayable, in operation 1601. For example, the application may provide a plurality of objects individually displayable on a plurality of windows. In operation 1603, the electronic device 101 may detect an event of invoking a second object independently displayable from the first object. In operation 1605, the electronic device 101 may transmit data for display of the second object and information about the position of display of the second object to the AR device 201. The AR device 201 may display the image, which is based on the received data, in the position of display identified based on the position of the electronic device 101 and the position of display of the second object. For example, the application may be configured to provide a video list as the first object while simultaneously providing the playback screen of a particular video as the second object. In this case, the electronic device 101 may detect designation of any one of the video list as an event of invoking the second object. The electronic device 101 may keep on displaying the video list on the touchscreen while transmitting the data for video playback to the AR device 201, and the AR device 201 may play the video.

Figure 17:
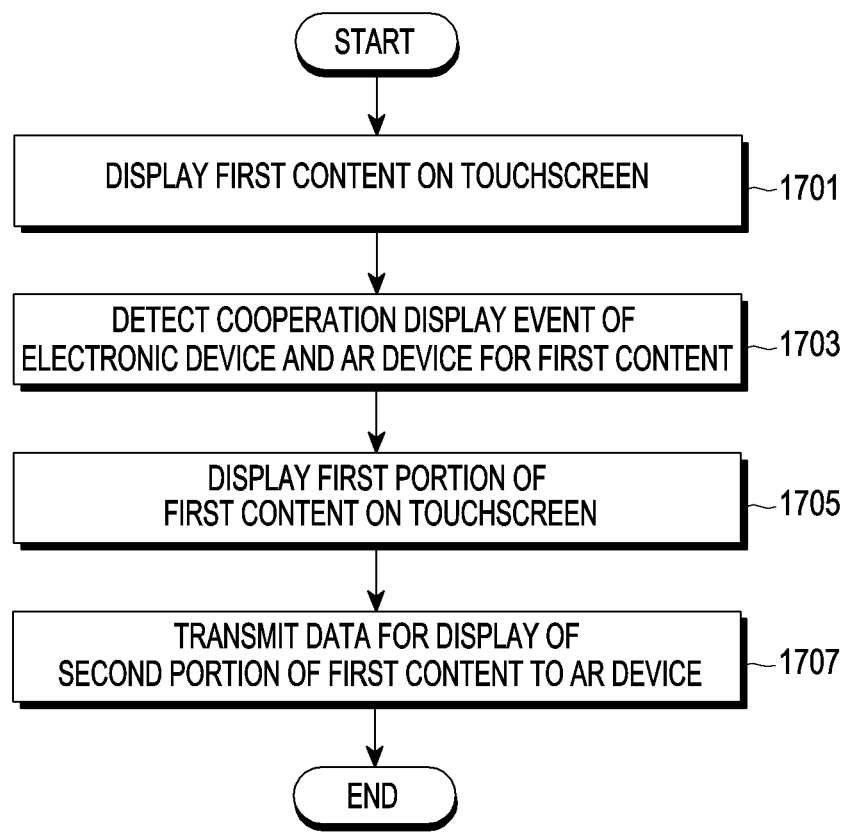
FIG. 17 is a flowchart illustrating a method for operating an electronic device according to an embodiment of the disclosure.

FIG. 17 is a flowchart illustrating a method for operating an electronic device according to an embodiment the disclosure. The embodiment related to FIG. 17 is described in greater detail with reference to FIGS. 18A and 18B.

Figure 18A:
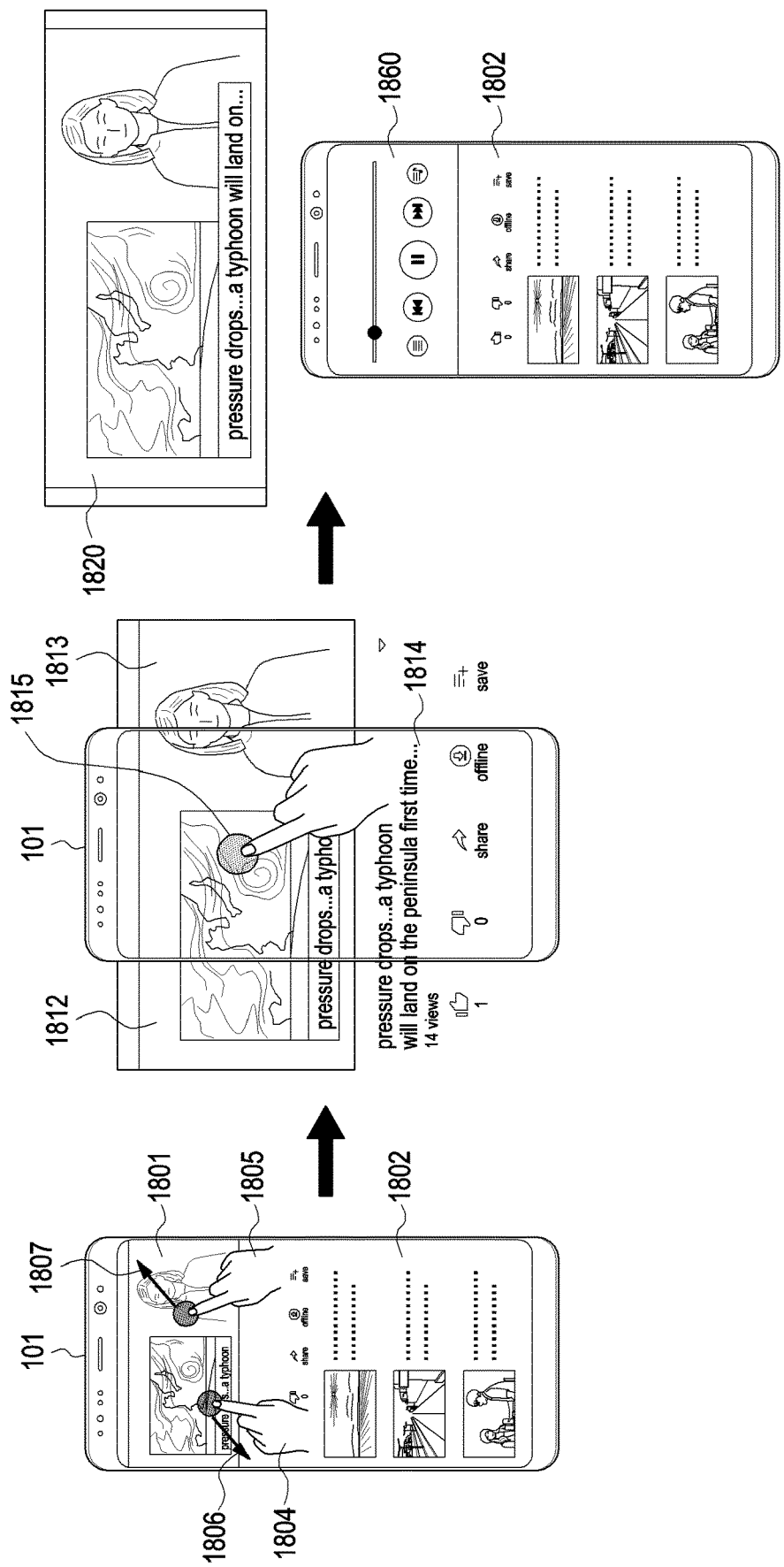
FIG. 18A is a view illustrating a screen transmitted through an AR device and an electronic device and viewed according to an embodiment of the disclosure.

FIG. 18A is a view illustrating a screen transmitted through an AR device and an electronic device and viewed according to various embodiments of the disclosure.

Figure 18B:
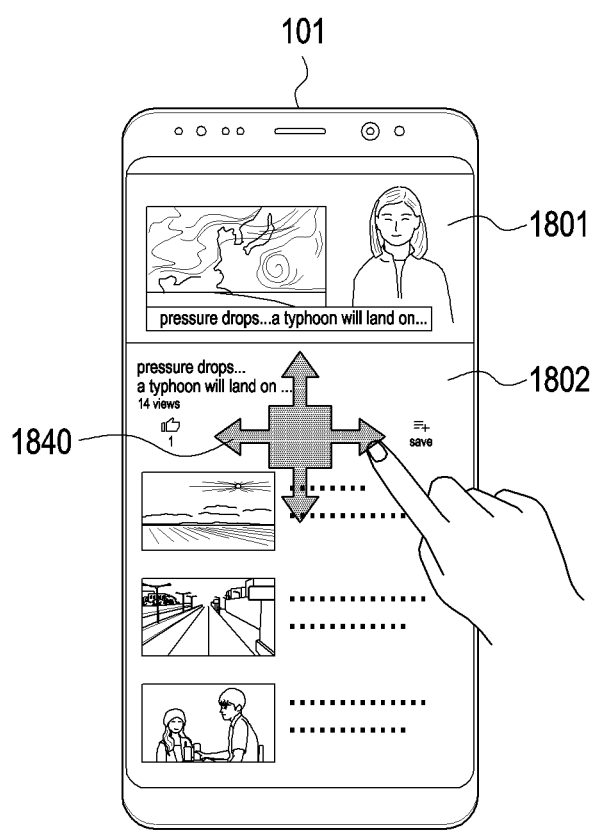
FIG. 18B is a view illustrating an electronic device according to an embodiment of the disclosure.

FIG. 18B is a view illustrating an electronic device according to an embodiment of the disclosure.

Referring to FIG. 17, according to an embodiment, the electronic device 101 may display a first content on the touchscreen in operation 1701. For example, as shown in FIG. 18A, the electronic device 101 may execute a video providing application and display an application execution screen. The application execution screen may include a video playback screen 1801 and a video list 1802.

In operation 1703, the electronic device 101 may detect a cooperation display event of the electronic device 101 and the AR device 201 for the first content. For example, the electronic device 101 may detect an enlarge command for the first content as the cooperation display event.

Referring to FIG. 18A, the electronic device 101 may detect a plurality of drag inputs 1806 and 1807 constituting a pinch-out gesture by both hands 1804 and 1805.

In operation 1705, the electronic device 101 may display a first portion of the first content on the touchscreen. The electronic device 101 may transmit data for display of a second portion of the first content to the AR device 201 in operation 1707. Thus, as shown in FIG. 18A, the electronic device 101 may display the first portion 1814 of the application execution screen on the touchscreen and transmit data for display of the second portion 1812 and 1813 to the AR device 201. The AR device 201 may display the second portion 1812 and 1813 of the application execution screen based on the received data. The AR device 201 may identify the position of display of the second portion 1812 and 1813 so that the user perceives as if the second portion 1812 and 1813 is positioned next to the first portion 1814. According to an embodiment, the electronic device 101 may enlarge the application execution screen and, upon identifying that additional enlargement in the display device 160 is impossible, transmit data for display of the second portion 1812 and 1813 to the AR device 201.

The electronic device 101 may additionally receive an input (e.g., a touch 1815) for externally displaying a particular object. In this case, the electronic device 101 may transmit data for the video playback screen 1820 to the AR device 201, and the AR device 201 may display the data. The electronic device 101 may display the video list 1802 and may also display a control area 1860 for video playback.

Referring to FIG. 18B, the electronic device 101 may display an object 1840 for changing the position of display. For the object 1840, the user may receive various directions of drag inputs and, corresponding thereto, the electronic device 101 may adjust the position of display of the content displayed on the AR device 201. The electronic device 101 may transmit information about the changed position of display to the AR device 201, and the AR device 201 may identify the position of display of content based on the received information.

Figure 19A:
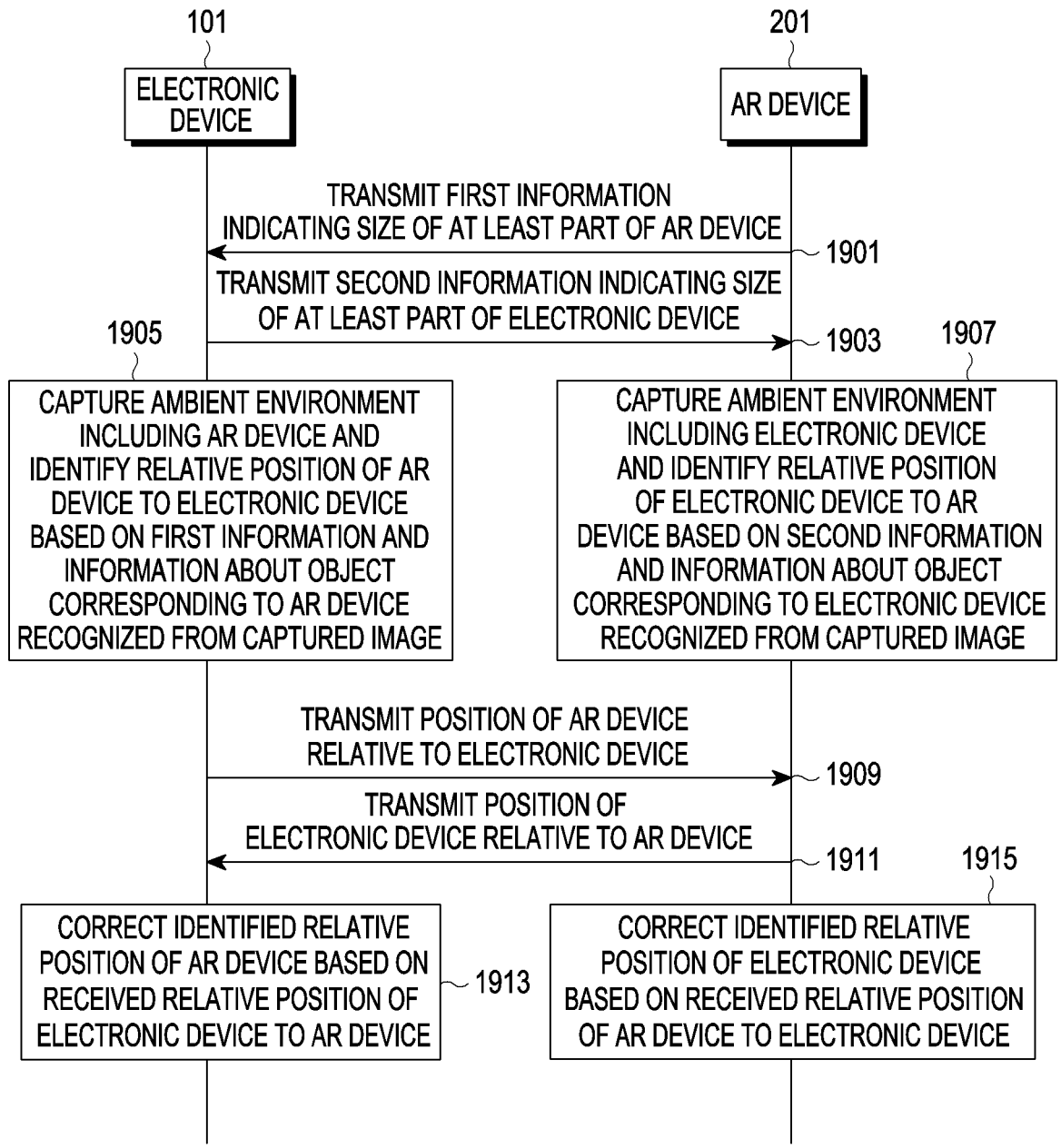
FIGS. 19A and 19B are flowcharts illustrating a method of operating an AR device and an electronic device according to various embodiments of the disclosure.
Figure 19B:
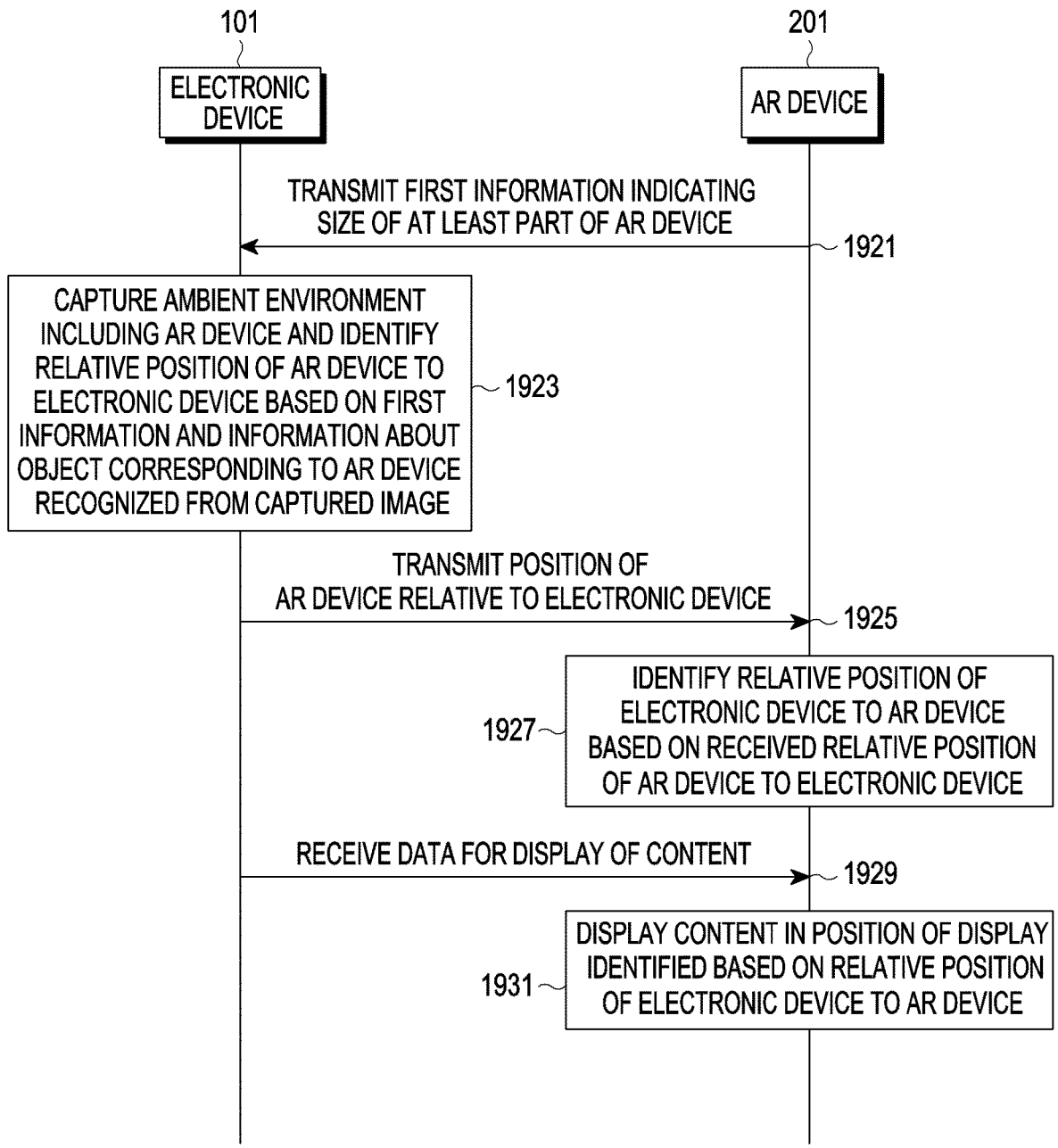

FIGS. 19A and 19B are flowcharts illustrating a method of operating an AR device and an electronic device according to various embodiments of the disclosure.

Referring to FIG. 19A, the AR device 201 may transmit first information indicating the size of at least a portion of the AR device 201 in operation 1901. For example, the AR device 201 may transmit the information indicating the size of the housing 210 of the AR device 201 to the electronic device 101, and the information is not limited as long as it may allow the size of the at least portion of the AR device 201 to be identified. The AR device 201 may transmit information about the shape of at least a portion to the electronic device 101. The AR device 201 may transmit information for identifying the AR device 201 to the electronic device 101. The AR device 201 may transmit a plurality of pieces of the above-described information to the electronic device 101.

In operation 1903, the electronic device 101 may transmit second information indicating the size of at least a portion of the electronic device 101 to the AR device 201. The electronic device 101 may transmit at least one of the information indicating the size of at least the portion, the information indicating the shape of at least the portion, or the identification information to the AR device 201.

In operation 1905, the electronic device 101 may capture the ambient environment including the AR device 201 and identify a relative position of the AR device 201 from the electronic device 101 based on the first information and information about the object corresponding to the AR device 201 recognized from the captured image. The electronic device 101 may recognize the object corresponding to the AR device 201 in the image. The electronic device 101 may identify the distances to the electronic device 101 and the AR device 201 based on the received first information about the size of the AR device 201 and the size of the object corresponding to the AR device 201. The electronic device 101 may identify the direction in which the AR device 201 is positioned based on the position of the object corresponding to the AR device 201 in the image. The electronic device 101 may identify the orientation of the AR device 201 based on the shape of the object corresponding to the AR device 201. Upon receiving identification information about the AR device 201, the electronic device 101 may identify information associated with a preset size based on the identification information and compare the associated information with the sensed information.

In operation 1907, the AR device 201 may capture the ambient environment including the electronic device 101 and identify a relative position of the electronic device 101 from the AR device 201 based on second information and information about the object corresponding to the electronic device 101 recognized from the captured image. The AR device 201 may recognize the object corresponding to the electronic device 101 in the image. The AR device 201 may identify at least one of the orientation of the electronic device 101, the direction in which the electronic device 101 is positioned, and the distance between the AR device 201 and the electronic device 101 based on at least one of the shape, position, and size of the object.

In operation 1909, the electronic device 101 may transmit the relative position of the AR device 201 from the electronic device 101 to the AR device 201. In operation 1911, the AR device 201 may transmit the relative position of the electronic device 101 from the AR device 201 to the electronic device 101. In operation 1913, the electronic device 101 may correct the identified relative position of the AR device 201 based on the received relative position of the electronic device 101 from the AR device 201. In operation 1915, the AR device 201 may correct the identified relative position of the electronic device 101 based on the received relative position of the AR device 201 from the electronic device 101. For example, unless the AR device 201 is able to identify the position of the electronic device 101, the AR device 201 may identify the position of the electronic device 101 from the AR device 201 which has been received from the electronic device 101. Depending on the arrangement of the electronic device 101 and the AR device 201, the AR device 201 may be positioned with the camera view angle of the electronic device 101, and the electronic device 101 may be positioned off the camera view angle of the AR device 201. In this case, the AR device 201 may fail to recognize the object corresponding to the electronic device 101 in the captured image. The AR device 201 may identify the relative position of the electronic device 101 to the AR device 201 from the relative position of the AR device 201 to the electronic device 101. The AR device 201 may identify the relative position of the electronic device 101 to the AR device 201 using both the identified position and the received position. For example, the AR device 201 may identify the relative position of the electronic device 101 to the AR device 201 based on the weighted sum based on the respective reliabilities of the identified position and the received position. The AR device 201 may identify the position of display of content on the display device 250 based on the identified relative position of the electronic device 101 to the AR device 201.

Referring to FIG. 19B, the AR device 201 may transmit first information indicating the size of at least a portion of the AR device 201 to the electronic device 101 in operation 1921. In operation 1923, the electronic device 101 may capture the ambient environment including the AR device 201 and identify a relative position of the AR device 201 from the electronic device 101 based on the first information and information about the object corresponding to the AR device 201 recognized from the captured image. In operation 1925, the electronic device 101 may transmit the relative position of the AR device 201 from the electronic device 101. In operation 1927, the AR device 201 may identify the relative position of the electronic device 101 to the AR device 201 based on the received relative position of the AR device 201 to the electronic device 101. In operation 1929, the AR device 201 may receive data for display of content from the electronic device 101. In operation 1931, the AR device 201 may display content in the position of display on the display device 250 identified based on the relative position of the electronic device 101 to the AR device 201.

Figure 20:
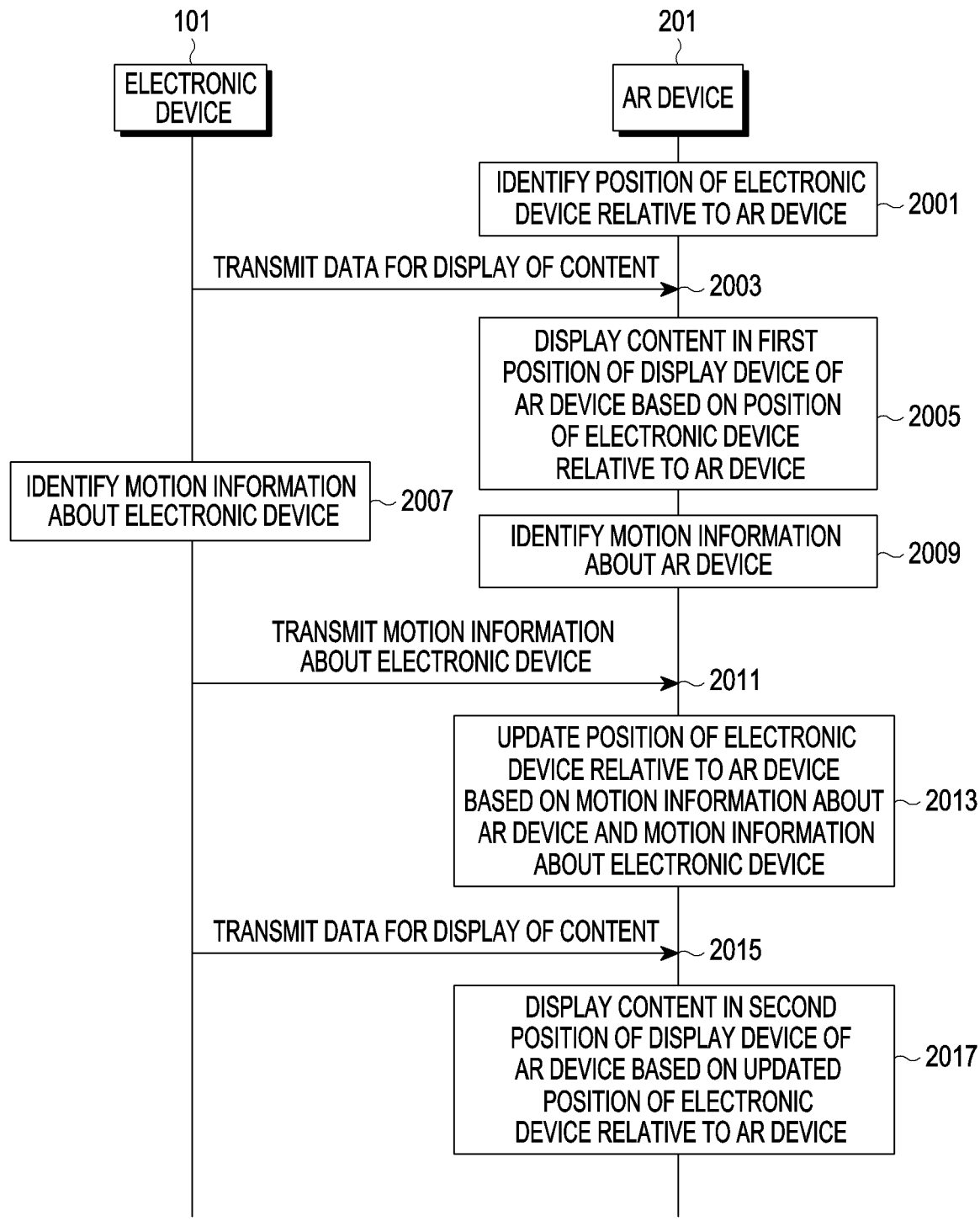
FIG. 20 is a flowchart illustrating a method for operating an electronic device and an AR device according to an embodiment of the disclosure.

FIG. 20 is a flowchart illustrating a method for operating an electronic device and an AR device according to an embodiment of the disclosure.

Referring to FIG. 20, the AR device 201 may identify the position of the electronic device 101 relative to the AR device 201 in operation 2001. In operation 2003, the electronic device 101 may transmit data for display of content to the AR device 201. In operation 2005, the AR device 201 may display content in the first position of the display device 250 of the AR device 201 which is based on the position of the electronic device 101 relative to the AR device 201.

In operation 2007, the electronic device 101 may identify motion information about the electronic device 101. The electronic device 101 may identify motion information based on sensor data identified through at least one sensor. The motion information may include at least one of a position change or orientation change in the electronic device 101. In operation 2009, the AR device 201 may identify the motion information about the AR device 201. The electronic device 101 may transmit the motion information about the electronic device 101 to the AR device 201 in operation 2011. In operation 2013, the AR device 201 may update the position of the electronic device 101 relative to the AR device 201 based on the motion information about the AR device 201 and the motion information about the electronic device 101. In operation 2015, the electronic device 101 may transmit data for display of content to the AR device 201. In operation 2017, the AR device 201 may display content in the second position of the display device of the AR device 201 which is based on the updated position of the electronic device 101 relative to the AR device 201. Thus, although the user moves the electronic device 101 or the AR device 201 moves, the AR device 201 may change the position of display of content so that the user perceives as if the content is positioned around the electronic device 101. According to an embodiment, when the size of motion of at least one of the electronic device 101 or the AR device 201 is a threshold or more, the AR device 201 may be configured to update the position of the electronic device 101, i.e., the position of display of content.

Figure 21:
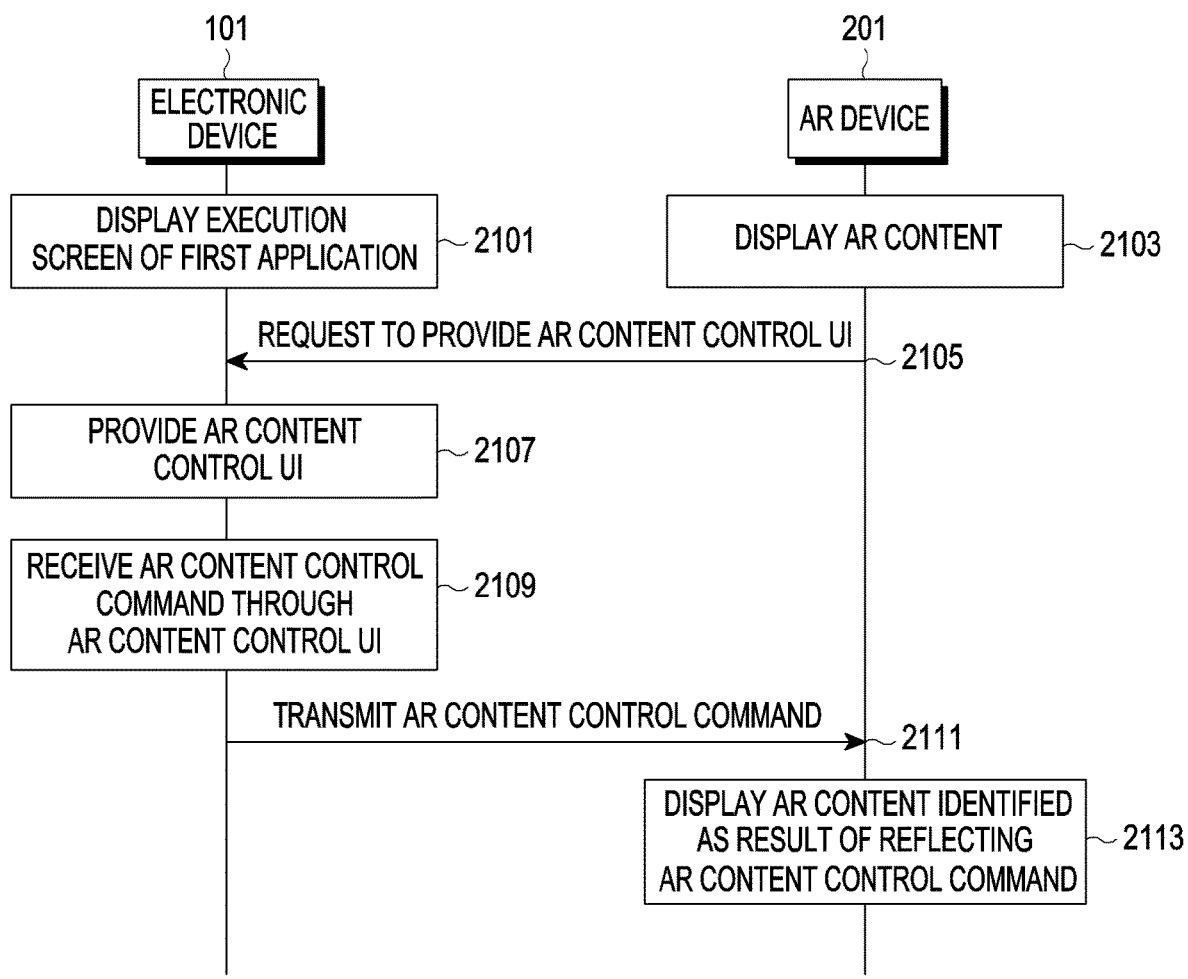
FIG. 21 is a flowchart illustrating a method for operating an electronic device and an AR device according to an embodiment of the disclosure.

FIG. 21 is a flowchart illustrating a method for operating an electronic device and an AR device according to an embodiment of the disclosure. The embodiment related to FIG. 21 is described in greater detail with reference to FIG. 22.

Figure 22:
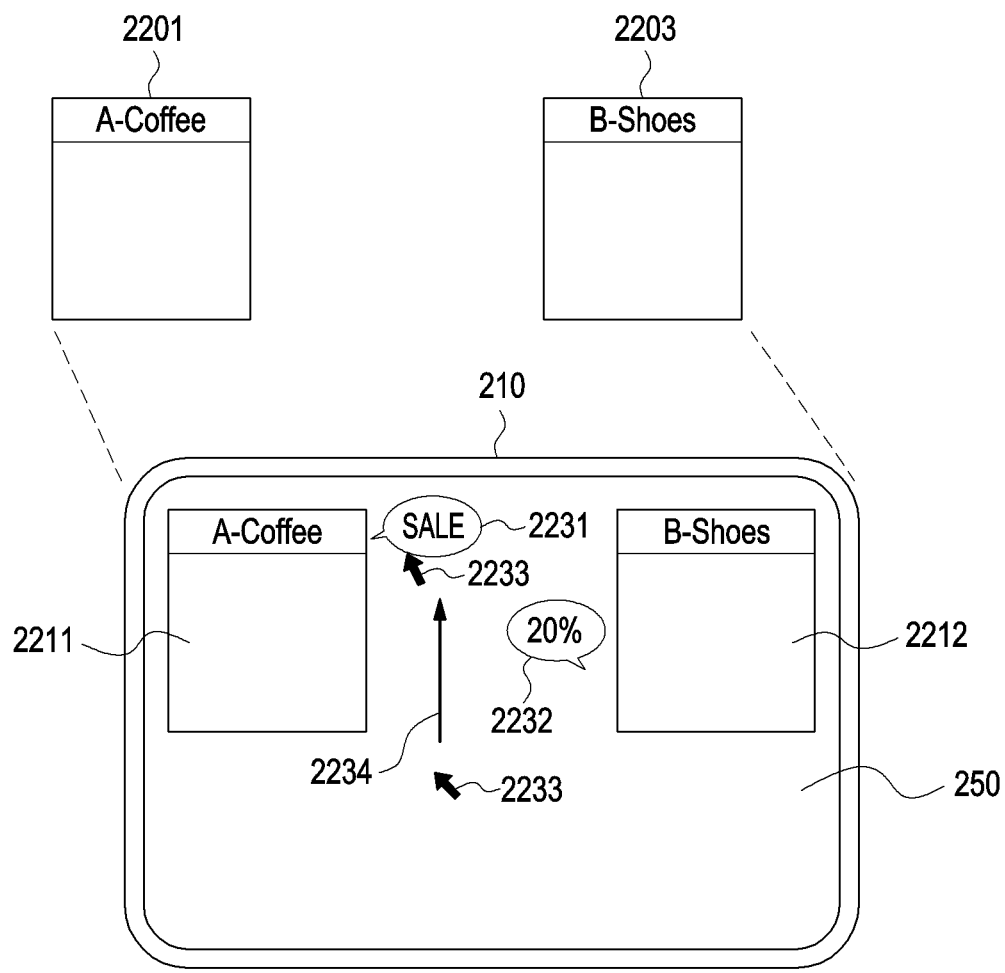
FIG. 22 is a view illustrating an AR device and an electronic device according to an embodiment of the disclosure.
Figure 22:
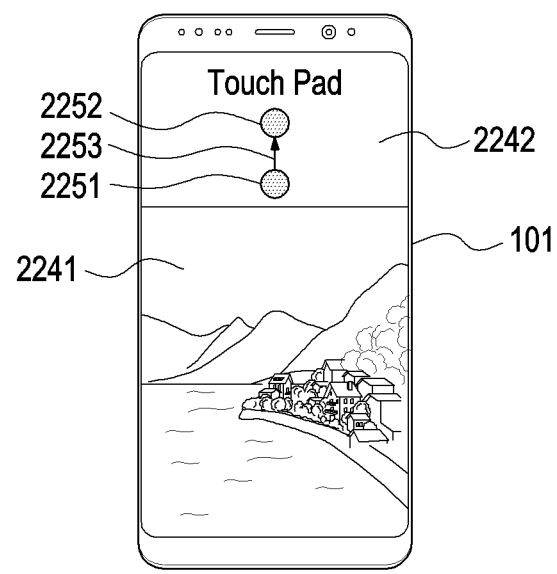

FIG. 22 is a view illustrating an AR device and an electronic device according to an embodiment of the disclosure.

Referring to FIG. 21, in operation 2101, the electronic device 101 may display the execution screen of a first application. In operation 2103, the AR device 201 may display AR content. For example, the user may observe external buildings 2201 and 2203 through the display device 250 of the AR device 201. The AR device 201 may capture the landscape and recognize the object corresponding to the landscape from the captured image. The AR device 201 may display additional information 2231 and 2232 associated with the object on the display device 250. The AR device 201 may identify the position of the additional information 2231 and 2232 to be positioned adjacent the positions 2211 and 2212 corresponding to the buildings 2201 and 2203 on the display device 250. For example, upon detecting designation of the additional information 2231 and 2232, the AR device 201 may be configured to further provide other extra information.

In operation 2105, the AR device 201 may request the electronic device 101 to provide an AR content control user interface. In operation 2107, the electronic device 101 may provide the AR content control user interface. In operation 2109, the electronic device 101 may receive an AR content control command through the AR content control user interface. In operation 2111, the electronic device 101 may transmit the AR content control command to the AR device 201. In operation 2113, the AR device 201 may display AR content identified as a result of reflecting the AR content control command.

Referring to FIG. 22, the electronic device 101 may display a user interface 2242 through which the AR content control command may be entered. According to an embodiment, the electronic device 101 may display the user interface 2242 along with the existing screen 2241 being displayed. According to an implementation, the user interface 2242 may be displayed in the substantially entire area of the display device 160 of the electronic device 101.

The electronic device 101 may receive a drag input 2253 from the second point 2252 from the first point 2251 of the user interface 2242. The electronic device 101 may transmit information about the drag input 2253, as the AR content control command, to the AR device 201. The AR device 201 may display a screen which is based on the received content control command. For example, the AR device 201 may move (2234) the cursor 2233 as shown in FIG. 22. Thus, the AR device 201 may adjust the electronic device 101 to move the cursor 2233 to a position the user desires, thereby enabling more accurate control of AR content.

Figure 23:
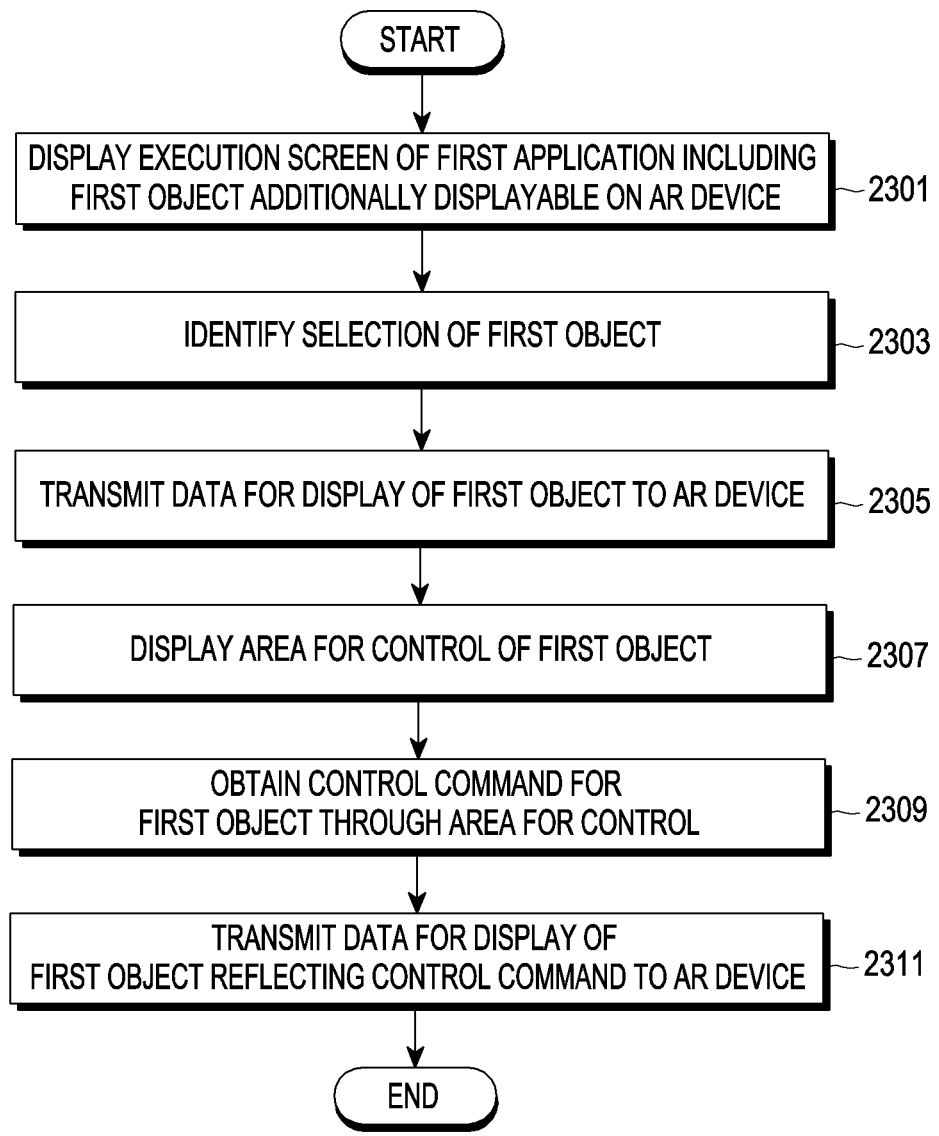
FIG. 23 is a flowchart illustrating a method for operating an electronic device according to an embodiment of the disclosure.

FIG. 23 is a flowchart illustrating a method for operating an electronic device according to an embodiment of the disclosure. The embodiment related to FIG. 23 is described in greater detail with reference to FIGS. 24A to 24D.

FIGS. 24A, 24B, 24C, and 24D are views illustrating an electronic device and content observed through an AR device according to various embodiments of the disclosure.

According to an embodiment, the electronic device 101 may display the execution screen of a first application including a first object additionally displayable on the AR device 201 in operation 2301.

Figure 24A:
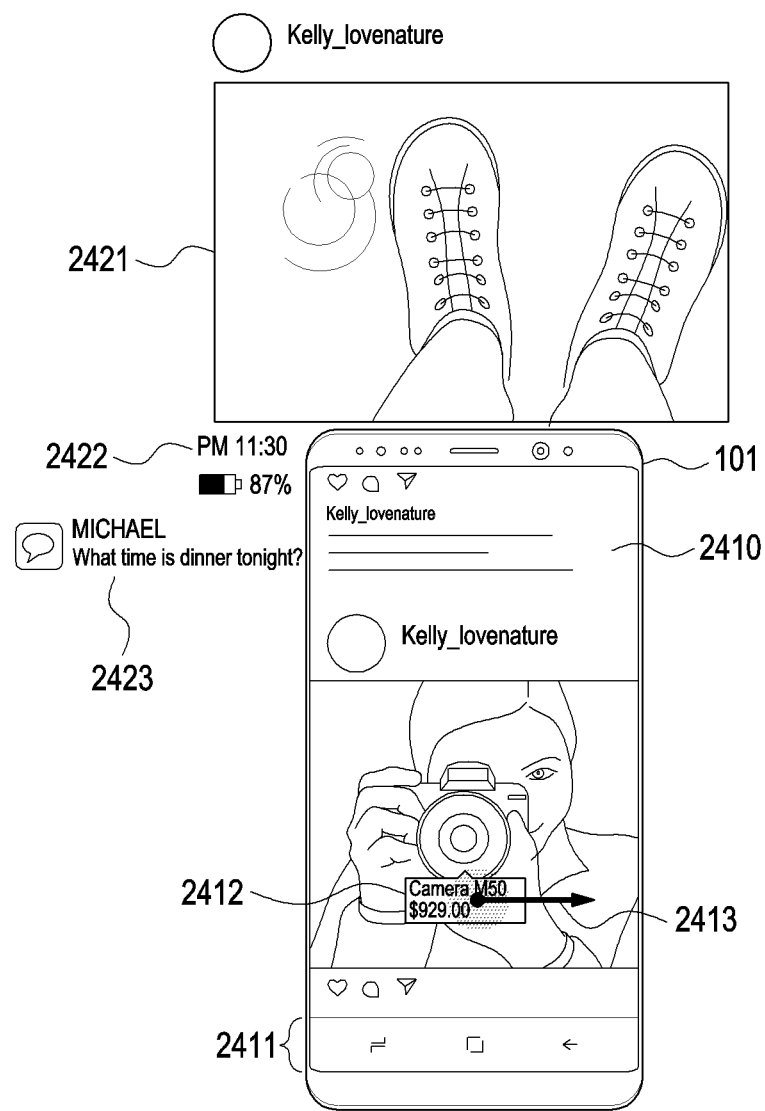
FIGS. 24A, 24B, 24C, and 24D are views illustrating an electronic device and content observed through an AR device according to various embodiments of the disclosure.

Referring to FIG. 24A, the electronic device 101 may display the execution screen 2410 of the first application (e.g., a web browsing application). The objects positioned outside the electronic device 101 in FIGS. 24A to 24D and 25A to 25C may be displayed by the AR device 201, and FIGS. 24A to 24D and 25A to 25C may illustrate screens and landscape that the user may observe through the display device 250 of the AR device 201.

Although in the embodiment of FIG. 24A, the AR device 201 may display contents 2421, 2422, and 2423 based on data received from the electronic device 101, this is merely an example, and the AR device 201 may be in the state of displaying no content. The electronic device 101 may distinctively display the first object (e.g., a camera object) which is additionally displayable (i.e., displayed on the external AR device). For example, the electronic device 101 may display the object 2412 indicating that additional display is possible as shown in FIG. 24A. The object 2412 may include a text indicating information about the first object (e.g., a camera object) additionally displayable, but this is merely an example. The content or format of information contained in the object 2412 are not limited to particular ones. The electronic device 101 may provide a visual effect (e.g., distinguishing colors or highlighting the edge) to distinguish the additionally displayable object from other objects without displaying an additional object. The electronic device 101 may refrain from displaying the additionally displayable object distinctively from the other objects in which case the electronic device 101 may display a normal application execution screen (e.g., the execution screen of a normal web browsing application).

According to an embodiment, the application may provide the function of enabling additional display (i.e., display on an external AR device) on a particular object. The application may distinctively provide the content for display on the display device 160 of the electronic device 101 and the content of display on the display device 250 of the external AR device 201. According to an implementation, the application may refrain from providing the function of externally displaying the particular object. In this case, the electronic device 101 may determine internal display (i.e., display on the display device 160) or external display (i.e., display on the AR device 201) of the content of application on the framework (or operating system) layer. As the web browsing application runs as in the embodiment of FIG. 24A, the electronic device 101 may receive an HTML file from the storage corresponding to the access site URL and display the HTML file. In this case, the HTML file creator (i.e., the website operator) may set the property of a particular content in the HTML file to external display or internal display. The electronic device 101 may receive a normal HTML file (i.e., an HTML file without distinction in position of display) and determine internal display (i.e., display on the display device 160) or external display (i.e., display on the AR device 201) of the content of application on the framework layer. The above-described external/internal display method is merely an example and is not limited to particular implementations. The electronic device 101 may display an area 2411 to display a functional key for invoking the home screen, a functional key for going back, and a functional key for invoking the list of latest applications executed.

In operation 2303, the electronic device 101 may identify selection of the first object. For example, the electronic device 101 may identify selection (e.g., a drag input 2413) of the object 2412 indicating that additional display is possible in FIG. 24A. The electronic device 101 may identify the position of display of content based on the direction of the drag input 2413. For example, based on the right direction of the drag input 2413, the electronic device 101 may identify that the position of display of content is the right side of the electronic device 101.

In operation 2305, the electronic device 101 may transmit data for display of the first object to the AR device 201. According to an embodiment, the electronic device 101 may also transmit information about the position of display to the AR device 201.

Figure 24B:
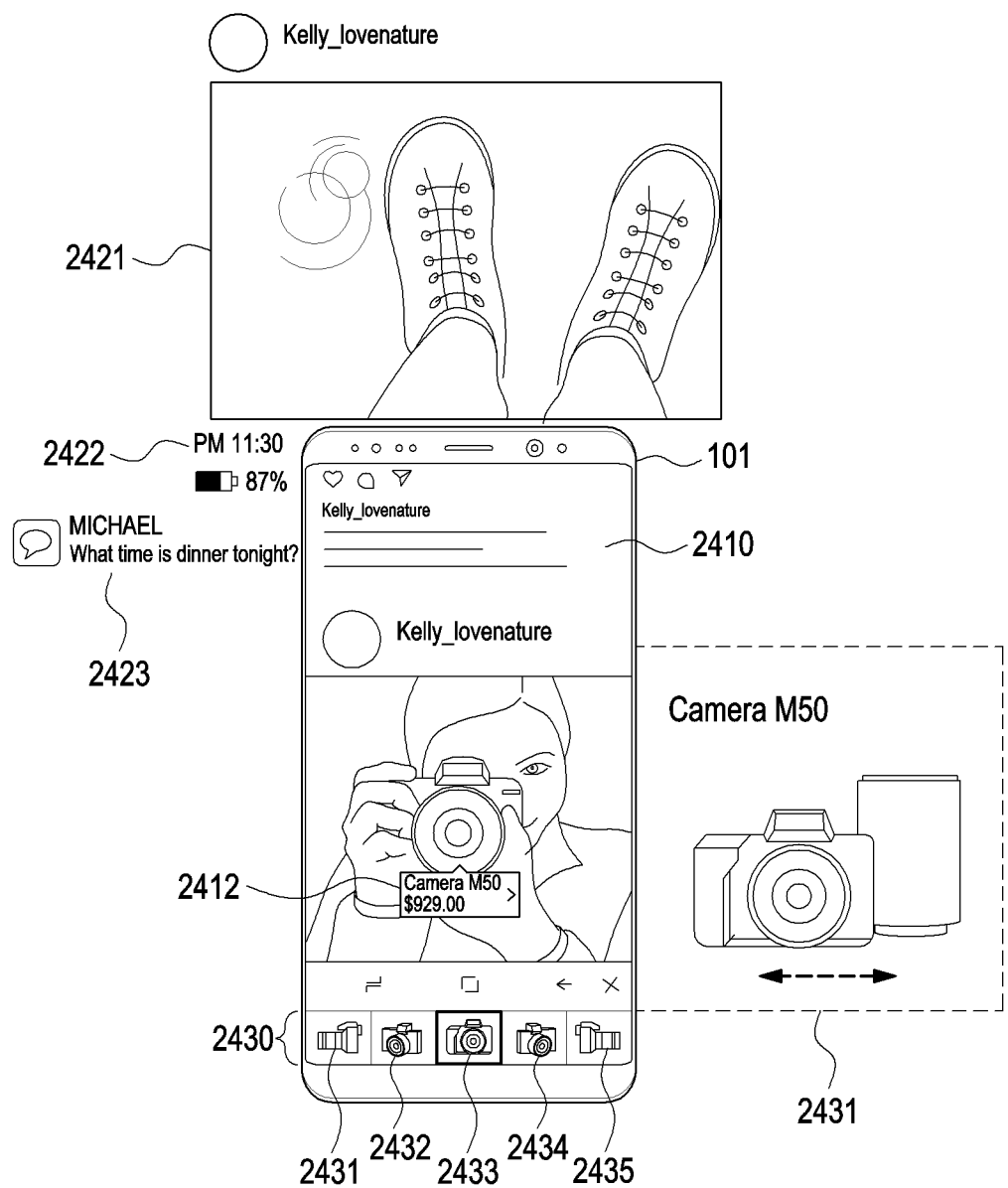

Referring to FIG. 24B, based on the received data, the AR device 201 may identify and display the position of display of the content 2431 so that the user perceives as if the content is positioned on the right side of the electronic device 101. The content 2431 may include information associated with, e.g., a designated object and be a three-dimensional (3D) model of the camera object in the embodiment of FIG. 24B.

In operation 2307, the electronic device 101 may display the area for controlling the first object. For example, the electronic device 101 may display a control area 2430 including at least one icon 2431, 2432, 2433, 2434, and 2435. In operation 2309, the electronic device 101 may obtain a control command for the first object through the area for control. In operation 2311, the electronic device 101 may transmit data for display of the first object reflecting the control command to the AR device 201. The AR device 201 may display the content corresponding to the control command-reflected first object. For example, upon receiving a rotate command, the electronic device 101 may transmit date for display of the rotated image of the 3D model to the AR device 201. The electronic device 101 may transmit data for display of the image enlarged based on the enlarge command to the AR device 201. This is described below in greater detail with reference to FIGS. 25A to 25C.

According to an embodiment, at least one icon 2431, 2432, 2433, 2434, and 2435 may be implemented as icons to control the change of the direction of placement. For example, the at least one icon 2431, 2432, 2433, 2434, and 2435 each may correspond to a particular placement angle. When any one of the at least one icon 2431, 2432, 2433, 2434, and 2435 is selected, the electronic device 101 may transmit data for display of the perspective view corresponding to the placement angle to the AR device 201. The at least one icon 2431, 2432, 2433, 2434, and 2435 may be used as an indicator to indicate the current state of placement. For example, when a drag input is obtained, the electronic device 101 may rotate the 3D model based on at least one of the direction or size of the drag input so that the 3D model may be placed in a particular direction of placement. The electronic device 101 may display the icon (e.g., the icon 2433) corresponding to the current direction of placement to be distinguished from the other icons.

Figure 24C:
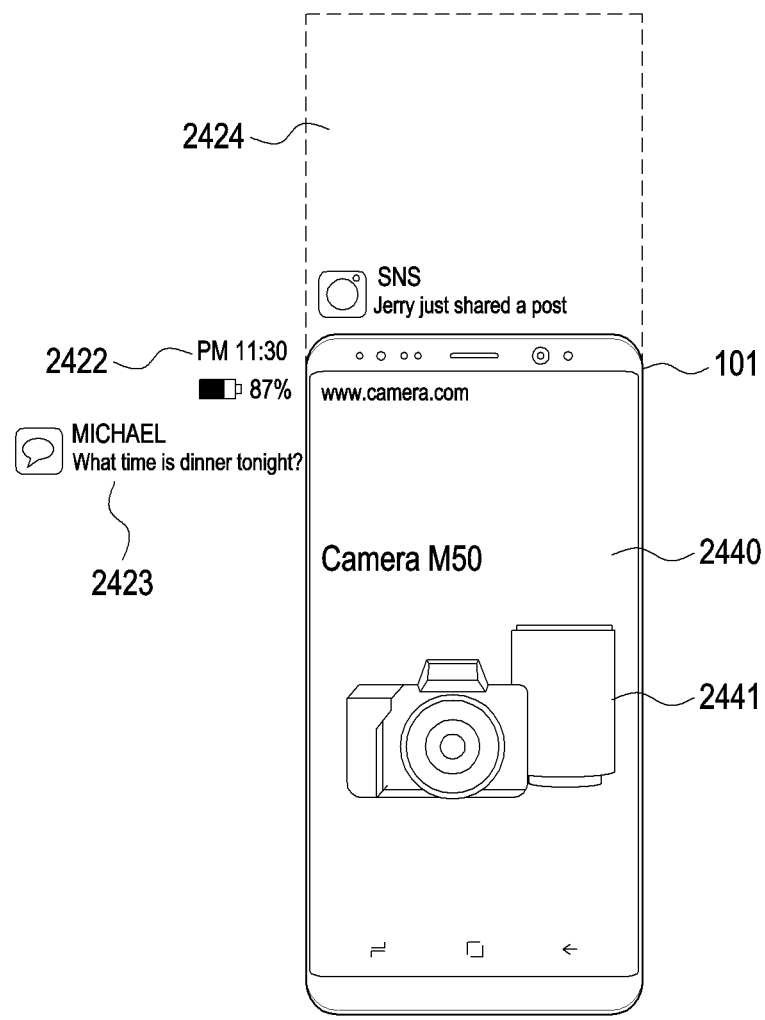

Referring to FIG. 24C, the electronic device 101 may display a screen 2440 obtained as a result of accessing the website for the additionally displayable object. The screen 2440 may be provided from the website operated by the manufacturer of the additionally displayable object. For example, upon detecting a different type of input (e.g., a double-tap) on the object 2412, the electronic device 101 may access the website. The website may provide data for additional display. According to an embodiment, the electronic device 101 may transmit, to the AR device 201, data for display of information about the notification which has been function-reduced or the application activated before. The AR device 201 may display the content 2424 instead of the existing content (e.g., the content 2421 of FIG. 24B) using the data for display of the information about the function-reduced notification or the application activated before.

Figure 24D:
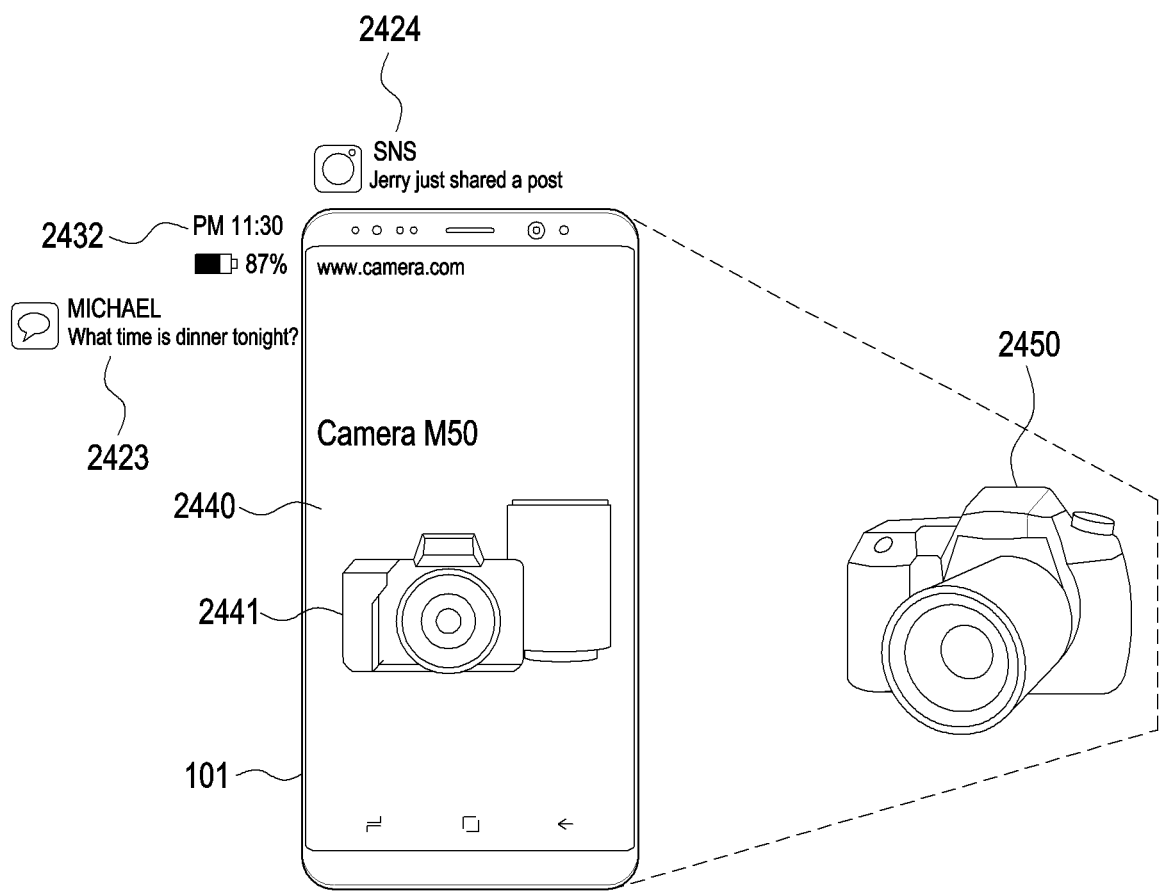

When the object 2441 is selected, the electronic device 101 may transmit data for display of an additional object for the object 2441 to the AR device 201. Referring to FIG. 24D, the AR device 201 may display the additional content 2450 based on the received data. In this case, the additional content 2450 may be, e.g., a rotatable 3D model.

Figure 25A:
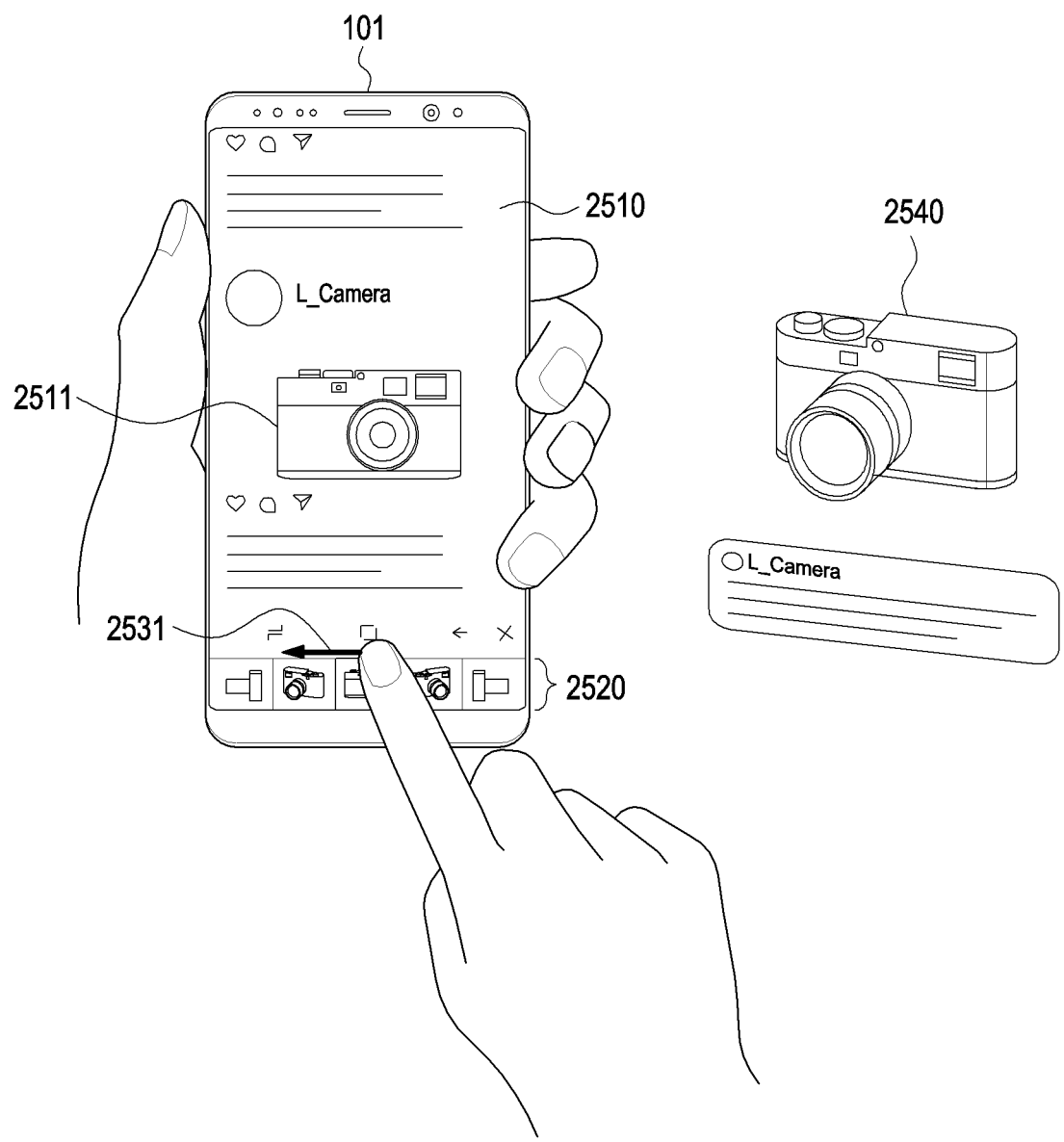
FIGS. 25A, 25B, and 25C are views illustrating an electronic device and content observed through an AR device according to various embodiments of the disclosure.
Figure 25B:
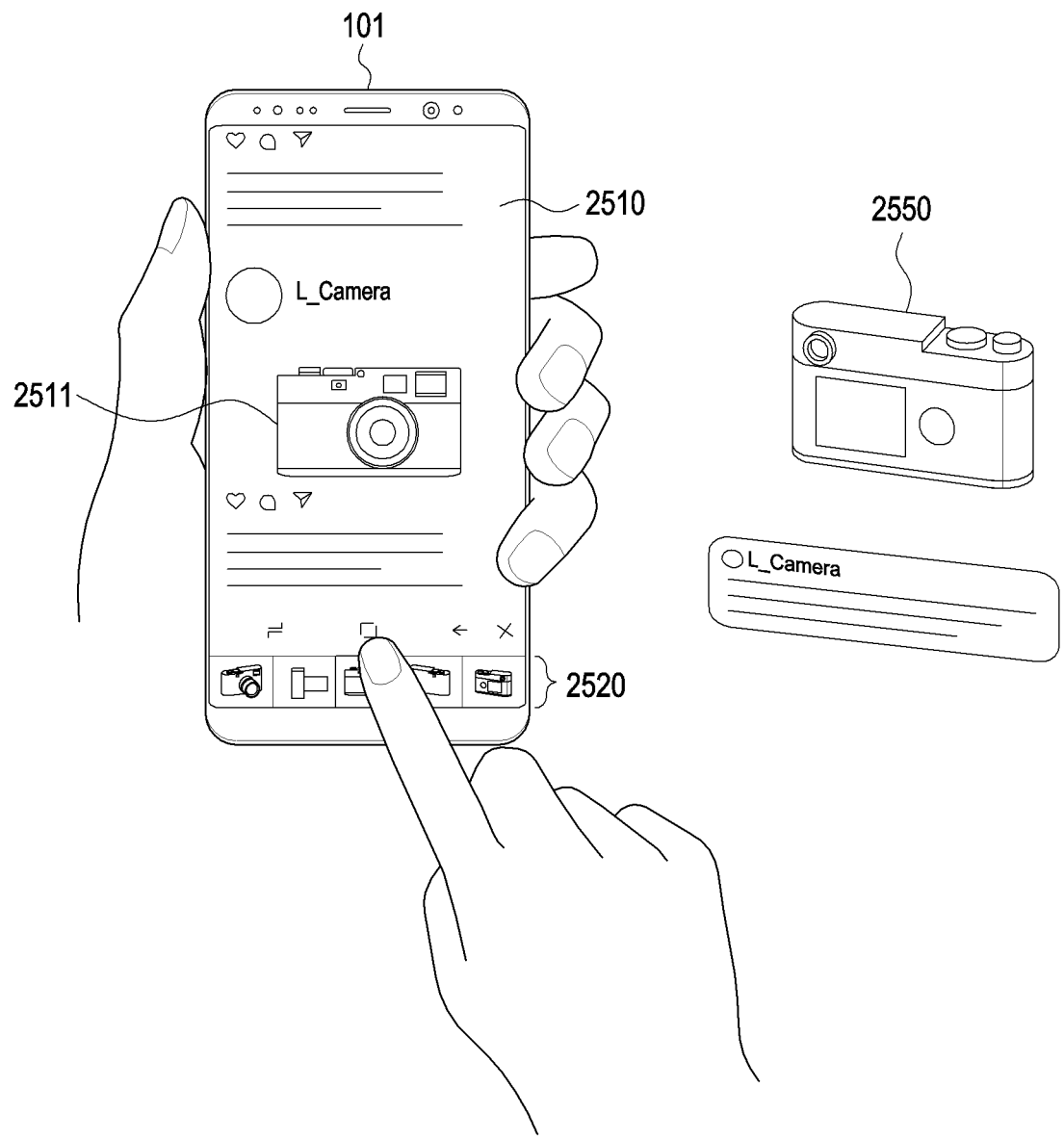
Figure 25C:
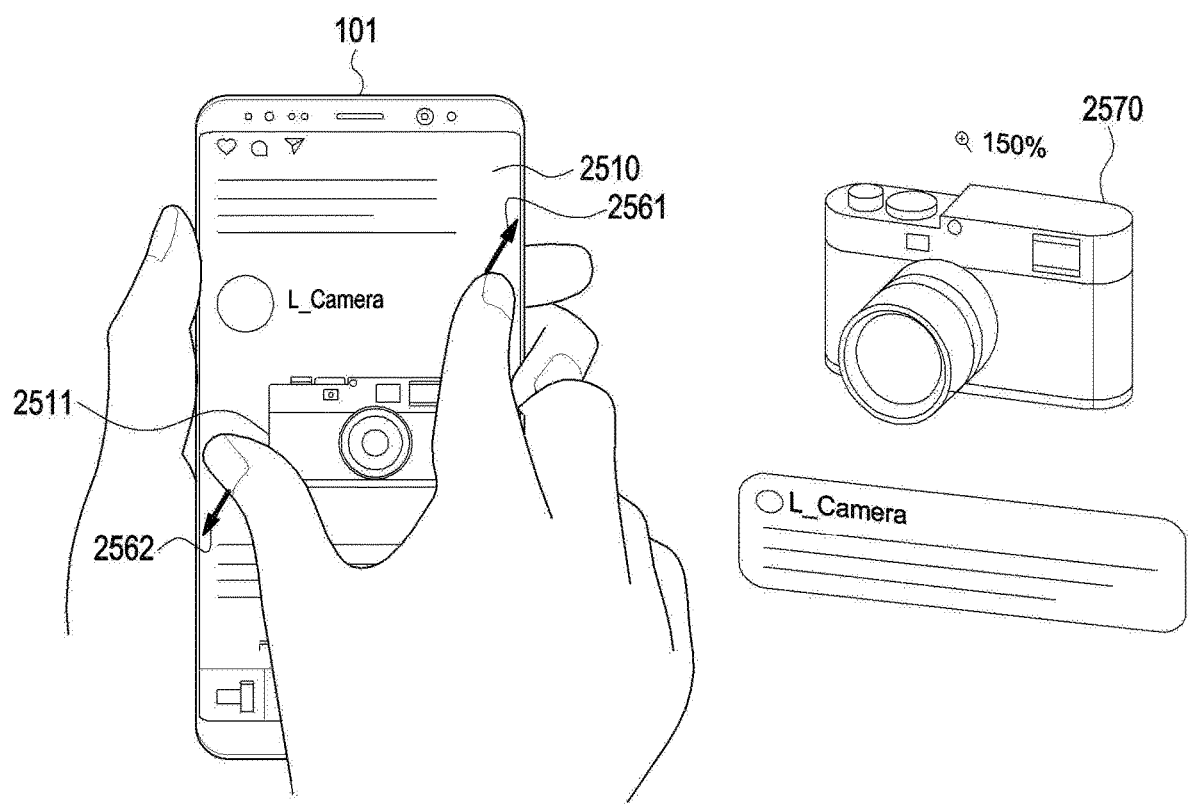

FIGS. 25A, 25B, and 25C are views illustrating an electronic device and content observed through an AR device according to various embodiments of the disclosure.

Referring to FIG. 25A, the electronic device 101 may display an execution screen 2510 of a first application including an additionally displayable object 2511. The electronic device 101 may identify a control command (e.g., a drag input 2531) in the control area 2520. The electronic device 101 may identify an additional object based on at least one of the direction or size of the control command. For example, the electronic device 101 may identify the direction of rotation based on the direction of the drag input 2531. The electronic device 101 may identify the degree of rotation based on the distance of the drag input 2531. The electronic device 101 may identify the image after rotation based on the drag input 2531 and transmit data for display of the identified image to the AR device 201. For example, as shown in FIG. 25A, the electronic device 101 may transmit data for display of a first image which is placed first in a 45-degree direction to the left to the AR device 201, and the electronic device 101 may display the first image 2540 based on the received data. Thereafter, when the image according to the drag input 2531 is identified, the electronic device 101 may transmit data for display of the image identified according to the drag input 2531 to the AR device 201.

Referring to FIG. 25B, the AR device 201 may display a second image 2550 the direction of placement of which has been changed as compared with the initial direction.

Referring to FIG. 25C, the electronic device 101 may obtain a resize command for the object. For example, the electronic device 101 may identify that a multi-touch drag input 2561 or 2562 constituting a pinch-out input is the resize command. The electronic device 101 may be configured to detect the multi-touch drag input 2561 or 2562 not from the control area but from the application execution screen. The electronic device 101 may enlarge the screen 2510, which is being displayed, based on the multi-touch drag input 2561 or 2562. The electronic device 101 may transmit data for display of the enlarged content to the AR device 201. The AR device 201 may display the image 2570 enlarged as compared with the prior one based on the received data. According to an embodiment, the electronic device 101 may transmit only information indicating that the content has enlarged to the AR device 201, and the AR device 201 itself may adjust the size of the image based on the information.

According to an embodiment, an electronic device comprises a touchscreen, a communication module, and at least one processor operatively connected with the touchscreen and the communication module, wherein the at least one processor is configured to establish a communication connection with an AR device using the communication module, transmit data for display of a first content to the AR device using the communication module, display a first user interface for controlling the first content on the touchscreen, transmit the data for display of the first content varied by a first input received through the first user interface to the AR device using the communication module, transmit data for display of a second content different from the first content to the AR device using the communication module, display a second user interface for controlling the second content on the touchscreen, and transmit the data for display of the second content varied by a second input received through the second user interface to the AR device using the communication module.

According to an embodiment, as at least part of displaying the second user interface for controlling the second content on the touchscreen, the at least one processor may be configured to change a focused content from the first content to the second content and display the second user interface for controlling the second content according to the change in the focused content.

According to an embodiment, as at least part of changing the focused content from the first content to the second content, the at least one processor may be configured to detect the focus change event from the first content to the second content or detect a display position change event set to change a position of display of the first content or a position of display of the second content and change the focused content from the first content to the second content in response to detection of the focus change event or the position change event.

According to an embodiment, the at least one processor may be configured to, as at least part of transmitting the data for display of the first content to the AR device, transmit information about the position of display of the first content along with the data for display of the first content to the AR device and, as at least part of transmitting the data for display of the second content to the AR device, transmit information about the position of display of the second content along with the data for display of the second content to the AR device.

According to an embodiment, at least one of the information about the position of display of the first content or information about the position of display of the second content may be information indicating at least one of a plurality of display areas set relative to the electronic device. The plurality of display areas set relative to the electronic device may include a plurality of display areas each of which corresponds to a respective one of a plurality of different directions relative to the electronic device. The plurality of display areas set relative to the electronic device may include a plurality of display areas positioned in a first direction relative to the electronic device. The plurality of display areas positioned in the first direction may be distinguished by at least one of depth position information or sorting order information.

According to an embodiment, the at least one processor may be configured to, when at least one of the information about the position of display of the first content or the information about the position of display of the second content is changed, transmit at least one of information about the changed position of display of the first content or the changed position of display of the second content to the AR device using the communication module.

According to an embodiment, the at least one processor may be configured to display third content different from the first content and the second content on the touchscreen while transmitting the first content and the second content to the AR device.

According to an embodiment, the first content is associated with a first application executed on the electronic device, and the third content may be associated with a second application different from the first application, or the first content and the third content may be associated with one application executed on the electronic device.

According to an embodiment, the at least one processor may be configured to, as at least part of displaying the third content on the touchscreen, display an execution screen of the first application, obtain an enlarge command for the execution screen of the first application, and display a first portion of the enlarged execution screen of the first application, as the third content, on the touchscreen based on the enlarge command. The at least one processor may be configured to, as at least part of transmitting the data for display of the second content to the AR device, transmit data for display of a second portion of the enlarged execution screen of the first application, as the data for display of the second content, to the AR device using the communication module. The at least one processor may be configured to, as at least part of transmitting the data for display of the second content to the AR device, transmit data for display of a second portion of the enlarged execution screen of the first application, as the data for display of the second content, to the AR device using the communication module.

According to an embodiment, an AR device comprises at least one sensor, a display device configured to display an image while transmitting at least part of light incident from an outside, a communication module, and at least one processor operatively connected with the least one sensor, the display, and the communication module, wherein the at least one processor is configured to identify a position of an electronic device relative to the AR device based on sensing data obtained through the at least one sensor, establish a communication connection with the electronic device using the communication module, receive data for display of at least one content from the electronic device using the communication module, identify a position of display of the at least one content on the display device based on the position of the electronic device, and display the at least one content in the identified position of display on the display device.

According to an embodiment, the at least one processor may be configured to, as at least part of identifying the position of the electronic device relative to the AR device, compare the sensing data obtained through the at least one sensor with association information between at least one piece of sensing data and at least one position and identify the position of the electronic device relative to the AR device based on a result of the comparison.

According to an embodiment, the at least one processor may be configured to, as at least part of identifying the position of the electronic device relative to the AR device, receive information indicating at least one of a size, shape, or identification information about the electronic device from the electronic device using the communication module, obtain a captured image of the electronic device through the at least one sensor, compare at least one of a size or shape of an object corresponding to the electronic device recognized in the captured image with at least one of the received size, shape, or identification information about the electronic device, and identify the position of the electronic device relative to the AR device based on a result of the comparison.

According to an embodiment, the at least one processor may be configured to receive information about a position of the AR device relative to the electronic device from the electronic device using the communication module. The at least one processor may be configured to, as at least part of identifying the position of the electronic device relative to the AR device, identify the position of the electronic device relative to the AR device based on the information about the position of the AR device relative to the electronic device and the sensing data.

According to an embodiment, the at least one processor may be configured to receive information about a position of display of each of the at least one content using the communication module. The at least one processor may be configured to, as at least part of identifying the position of display of the at least one content on the display device, identify the position of display of the at least one content on the display device based on the information about the position of display of each of the at least one content and the position of the electronic device.

According to an embodiment, the information about the position of display of each of the at least one content may be information indicating at least one of a plurality of display areas set relative to the electronic device. The at least one processor may be configured to, as at least part of identifying the position of display of the at least one content on the display device, identify that an area corresponding to at least one of the plurality of display areas relative to an area on the display device corresponding to the electronic device is the position of display of the at least one content.

According to an embodiment, the at least one processor may be configured to receive information about a changed position of display of each of the at least one content through the communication module and display the at least one content in a position identified based on the information about the changed position of display of each of the at least one content and the position of the electronic device.

According to an embodiment, an electronic device comprises a touchscreen, a communication module, and at least one processor operatively connected with the touchscreen and the communication module, wherein the at least one processor may be configured to establish a communication connection with an AR device using the communication module and transmit data for display of at least one content and information about a position of display of each of the at least one content to the AR device. The information about the position of display of each of the at least one content may be information indicating at least one of a plurality of display areas set relative to the electronic device.

The electronic device according to various embodiments may be one of various types of electronic devices. The electronic devices may include, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a non-transitory machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an AR device for displaying content received from an electronic device in a position identified based on the position of the electronic device and a method for operating the AR device, and an electronic device for transmitting data for displaying content and information about the position of display to the AR device and a method for operating the electronic device. According to various embodiments, there may be provided an electronic device for transmitting content to an AR device and providing a user interface for control on the touchscreen and a method for operating the electronic device and an AR device for receiving content from an electronic device and displaying the content and then receiving content reflecting a control command from the electronic device and displaying the content and an AR device and a method for operating the AR device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a touchscreen;
   a communication module; and
   at least one processor operatively connected with the touchscreen and the communication module, wherein the at least one processor is configured to:
   establish, by using the communication module, a communication connection with an augmented reality (AR) device,
   transmit to the AR device by using the communication module, first data for display of a first content,
   control the touchscreen to display a first user interface for controlling the first content,
   based on receiving a first input, change a focused content from the first content to a second content and transmit to the AR device by using the communication module, second data for display of the second content, and
   control the touchscreen to display a second user interface for controlling the second content based on the change in the focused content, wherein the first user interface is different from the second user interface.

2. The electronic device of claim 1, wherein the at least one processor, as at least part of the changing of the focused content from the first content to the second content, is further configured to:
   detect a display position change event set to change a position of display of the first content or a position of display of the second content, and change the focused content from the first content to the second content in response to the detecting of the display position change event.

3. The electronic device of claim 1,
   wherein the at least one processor, as at least part of transmitting the first data for displaying the first content, is further configured to transmit information about a position of displaying the first content along with the first data, and
   wherein the at least one processor, as at least part of transmitting the second data for displaying the second content, is further configured to transmit information about a position of displaying the second content along with the second data.

4. The electronic device of claim 3, wherein at least one of the information about the position of displaying the first content or the information about the position of displaying the second content comprises information indicating at least one of a plurality of display areas set relative to the electronic device.

5. The electronic device of claim 4, wherein the plurality of display areas set relative to the electronic device include a plurality of display areas each of which corresponds to one of a plurality of different directions relative to the electronic device.

6. The electronic device of claim 4, wherein the plurality of display areas set relative to the electronic device include a plurality of display areas positioned in a first direction relative to the electronic device.

7. The electronic device of claim 6, wherein the plurality of display areas positioned in the first direction are distinguished by at least one of depth position information or sorting order information.

8. The electronic device of claim 3, wherein the at least one processor is further configured to, based on at least one of the information about the position of displaying the first content or the information about the position of displaying the second content being changed, transmit to the AR device by using the communication module, at least one of information about the changed position of displaying the first content or the changed position of displaying the second content.

9. The electronic device of claim 1, wherein the at least one processor is further configured to control the touchscreen to display third content different from the first content and the second content while transmitting the first content and the second content to the AR device.

10. The electronic device of claim 9,
wherein the first content is associated with a first application executed on the electronic device, and the third content is associated with a second application different from the first application, or
wherein the first content and the third content are associated with one application executed on the electronic device.

11. The electronic device of claim 9,
wherein the at least one processor, as at least part of the controlling of the touchscreen to display the third content, is further configured to:
display an execution screen of a first application,
obtain an enlarge command for the execution screen of the first application, and
control the touchscreen to display a first portion of the enlarged execution screen of the first application, as the third content, based on the enlarge command, and
wherein the at least one processor, as at least part of transmitting the second data for of displaying the second content, is further configured to transmit, to the AR device by using the communication module, data for displaying a second portion of the enlarged execution screen of the first application, as the second data for displaying the second content.

12. An augmented reality (AR) device, comprising:
at least one sensor;
a display device configured to display an image while transmitting at least part of light incident from an outside;
a communication module; and
at least one processor operatively connected with the at least one sensor, the display device, and the communication module, wherein the at least one processor is configured to:
identify a position of an electronic device relative to the AR device based on sensing data obtained through the at least one sensor,
establish a communication connection with the electronic device using the communication module,
receive, from the electronic device by using the communication module, first data for displaying at least one content,
identify a position of displaying the at least one content on the display device based on the position of the electronic device relative to the AR device, and
control the display device to display the at least one content at the identified position.

13. The AR device of claim 12, wherein the at least one processor, as at least part of the identifying of the position of the electronic device relative to the AR device, is further configured to:

compare the sensing data obtained through the at least one sensor with association information between at least one piece of sensing data and at least one position, and
identify the position of the electronic device relative to the AR device based on a result of the comparison.

14. The AR device of claim 12, wherein the at least one processor, as at least part of the identifying of the position of the electronic device relative to the AR device, is further configured to:
receive, from the electronic device by using the communication module, information including at least one of a size, shape, or identification information about the electronic device,
obtain a captured image of the electronic device through the at least one sensor,
compare information including at least one of a size or shape of an object corresponding to the electronic device recognized in the captured image with the received information including the at least one of the size, the shape, or the identification information about the electronic device, and
identify the position of the electronic device relative to the AR device based on a result of the comparison.

15. The AR device of claim 12,
wherein the at least one processor is further configured to receive, from the electronic device by using the communication module, information about a position of the AR device relative to the electronic device, and
wherein the at least one processor, as at least part of the identifying of the position of the electronic device relative to the AR device, is further configured to identify the position of the electronic device relative to the AR device based on the information about the position of the AR device relative to the electronic device and the sensing data.

16. The AR device of claim 12,
wherein the at least one processor is further configured to receive, by using the communication module, information about a position of displaying each of the at least one content, and
wherein the at least one processor, as at least part of the identifying of the position of displaying the at least one content on the display device, is further configured to identify the position of displaying the at least one content on the display device based on the information about the position of displaying each of the at least one content and the position of the electronic device.

17. The AR device of claim 16,
wherein the information about the position of displaying each of the at least one content comprises information indicating at least one of a plurality of display areas set relative to the electronic device, and
wherein the at least one processor, as at least part of the identifying of the position of displaying the at least one content on the display device, is further configured to identify that an area corresponding to at least one of the plurality of display areas relative to an area on the display device corresponding to the electronic device is the position of displaying the at least one content.

18. The AR device of claim 16, wherein the at least one processor is further configured to:
receive, by using the communication module, information about a changed position of displaying each of the at least one content, and
control the display device to display the at least one content in a position identified based on the information about the changed position of displaying each of the at least one content and the position of the electronic device.

19. An electronic device, comprising:
- a touchscreen;
- a communication module; and
- at least one processor operatively connected with the touchscreen and the communication module,
- wherein the at least one processor is configured to:
  - establish, by using the communication module, a communication connection with an augmented reality (AR) device, and
  - transmit, to the AR device by using the communication module, data for displaying at least one content and information about a position of displaying each of the at least one content,
- wherein the information about the position of displaying each of the at least one content comprises information indicating at least one of a plurality of display areas set relative to the electronic device, and
- wherein the information indicating the at least one of the plurality of display areas is determined based on a location of an input applied to the touchscreen.

* * * * *